United States Patent
Yamamoto

(10) Patent No.: US 11,931,968 B2
(45) Date of Patent: Mar. 19, 2024

(54) THREE-DIMENSIONALLY LAMINATED OBJECT MODELING APPARATUS AND THREE-DIMENSIONALLY LAMINATED OBJECT MODELING METHOD

(71) Applicant: TOYOTA JIDOSHA KABUSHIKI KAISHA, Toyota (JP)

(72) Inventor: Yasuhiro Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/697,138

(22) Filed: Mar. 17, 2022

(65) Prior Publication Data
US 2022/0314550 A1    Oct. 6, 2022

(30) Foreign Application Priority Data
Mar. 30, 2021    (JP) .................. 2021-058212

(51) Int. Cl.
*B29C 64/393*    (2017.01)
*B29C 64/118*    (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/106; B29C 64/118; B29C 64/386; B29C 64/393; B29C 48/255–2552; B29C 48/92

See application file for complete search history.

(56) References Cited

U.S. PATENT DOCUMENTS 5,121,329 A * 6/1992 Crump ............... G05B 19/4099
228/180.5
6,726,773 B1 * 4/2004 Yanagita ............ B05B 9/047
222/61
(Continued)

FOREIGN PATENT DOCUMENTS

CN    104162965 A    11/2014
CN    110667106 A    1/2020
(Continued)

OTHER PUBLICATIONS

Nov. 4, 2022 Extended Search Report issued in European Patent Application No. 22163551.9.

*Primary Examiner* — Matthew J Daniels
*Assistant Examiner* — Andrew L Swanson
(74) *Attorney, Agent, or Firm* — Oliff PLC

(57) ABSTRACT

A three-dimensionally laminated object modeling apparatus includes a cylinder configured to store a molten resin, a discharging nozzle that is communicated with the cylinder, and a piston configured to discharge the molten resin from the discharging nozzle by moving in a direction of approaching the discharging nozzle and by pressurizing the molten resin in the cylinder, and models a three-dimensionally modeled object by laminating a resin bead that is the molten resin discharged from the discharging nozzle on a table. It includes a drive device configured to relatively move the discharging nozzle with respect to the table and at least one processor configured to acquire a movement speed of the discharging nozzle and control movement of the piston based on the movement speed of the discharging nozzle.

19 Claims, 50 Drawing Sheets

(51) Int. Cl.
  *B29C 64/209* (2017.01)
  *B33Y 10/00* (2015.01)
  *B33Y 30/00* (2015.01)
  *B33Y 50/02* (2015.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,254,499 B1* | 4/2019 | Cohen | H01R 4/024 |
| 10,377,124 B2 | 8/2019 | Susnjara et al. | |
| 2014/0291886 A1* | 10/2014 | Mark | B29C 69/001 |
| | | | 264/259 |
| 2016/0114509 A1* | 4/2016 | Kawasaki | B29C 45/74 |
| | | | 425/550 |
| 2017/0008230 A1 | 1/2017 | Yuyama | |
| 2017/0326769 A1 | 11/2017 | Kawasaki | |
| 2018/0038153 A1* | 2/2018 | Vianello | B05C 11/1036 |
| 2018/0056602 A1 | 3/2018 | Susnjara et al. | |
| 2019/0322044 A1 | 10/2019 | Susnjara et al. | |
| 2020/0164589 A1 | 5/2020 | Yuwaki et al. | |
| 2021/0154916 A1* | 5/2021 | Kazmer | B29C 64/118 |
| 2022/0126516 A1* | 4/2022 | Kutchko | B29B 7/007 |

FOREIGN PATENT DOCUMENTS

| | | | |
|---|---|---|---|
| DE | 198 82 043 T1 | 1/2000 | |
| EP | 2 998 095 A1 | 3/2016 | |
| EP | 3156216 A1 * | 4/2017 | B29C 64/106 |
| EP | 3 156 216 B1 | 9/2020 | |
| JP | H05-016195 A | 1/1993 | |
| JP | 4166746 B2 | 10/2008 | |
| JP | 5920859 B2 | 5/2016 | |
| JP | 6657550 B2 | 3/2020 | |
| JP | 2020-082558 A | 6/2020 | |
| WO | 2016/088874 A1 | 6/2016 | |

* cited by examiner

GRAPH OF RELATIONSHIP
BETWEEN NOZZLE MOVEMENT SPEED AND INDICATED FLOW RATE

GRAPH OF RELATIONSHIP
BETWEEN NOZZLE MOVEMENT SPEED AND INDICATED FLOW RATE

FIG. 17

| RESIN NAME | POWER INDEX n |
|:---:|:---:|
| ABS | 0.25 |
| PC | 0.7 |
| PP | 0.35 |
| PA6 | 0.7 |

POWER INDEX OF REPRESENTATIVE EXAMPLE OF RESIN TO BE USED

NUMERICAL TABLE USED FOR CALCULATING BULK MODULUS

| | $K = \Delta P/(\Delta V/V_0)$ | | | |
|---|---|---|---|---|
| ΔP(MPa) | PC_200°C | PC_240°C | POM_200°C | POM_240°C |
| 10.05 | 737 | 904 | 834 | 714 |
| 30 | 1320 | 1350 | 1465 | 1162 |
| 50 | 1760 | 1500 | 1886 | 1578 |
| 80 | 1760 | 1600 | 1897 | 1623 |
| 130 | 2288 | 1671 | 2158 | 1788 |

VALUE USED FOR INITIAL VALUE IN FIRST EXAMPLE (K = 834MPa)

CALCULATION OF BULK MODULUS

Diesel_20°C FROM: SAE2000-01-2046 FIG.14

L: LENGTHS OF ALL NOZZLES = 2mm     D = A*C/4L     X = 32B/(πA^3)   Y = X/A*10^6

| EXAMPLE A | EXAMPLE B | EXAMPLE C | EXAMPLE D |
|---|---|---|---|
| NOZZLE DIAMETER (mm) | FLOW RATE (mm³/s) | PRESSURE (MPa) | SHEAR STRESS (MPa) |
| 0.5 | 9 | 4.0 | 0.25 |
| 0.5 | 16 | 6.0 | 0.38 |
| 0.5 | 25 | 6.5 | 0.41 |
| 0.5 | 31 | 6.7 | 0.42 |
| 0.5 | 50 | 7.5 | 0.47 |
| 0.5 | 94 | 9.7 | 0.61 |
| 0.5 | 157 | 12.4 | 0.78 |
| 0.5 | 220 | 14.6 | 0.92 |
| 2.0 | 16 | 0.3 | 0.08 |
| 2.0 | 31 | 0.4 | 0.10 |
| 2.0 | 126 | 1.6 | 0.40 |
| 2.0 | 157 | 1.6 | 0.40 |
| 2.0 | 283 | 2.5 | 0.64 |

| X-AXIS | Y-AXIS |
|---|---|
| SHEAR VELOCITY (/s) | MELTING VISCOSITY (Pa·s) |
| 768 | 324 |
| 1,280 | 295 |
| 2,048 | 199 |
| 2,560 | 165 |
| 4,096 | 114 |
| 7,680 | 79 |
| 12,800 | 61 |
| 17,920 | 51 |
| 20 | 3979 |
| 40 | 2387 |
| 160 | 2487 |
| 200 | 2009 |
| 360 | 1768 |

EXAMPLE IN WHICH RELATIONSHIP BETWEEN PRESSURE AND FLOW RATE IS CONVERTED INTO SHEAR VELOCITY AND MELTING VISCOSITY
(RESIN NAME: ABS, TEMPERATURE: 210°C)

EXAMPLE OF OBTAINING CONSTANT k DETERMINED BY
TEMPERATURE OF EACH RESIN
(RESIN NAME: ABS, TEMPERATURE: 210°C)

FIG. 28

CALCULATION SHEET OF INDICATED SPEED FOR FIRST TO THIRD CYCLES

| A | B | C | D = N+O | E | F | G | H | I | J | K | L | M | N | O |
|---|---|---|---|---|---|---|---|---|---|---|---|---|---|---|
| | | TARGET PRESSURE (ADJUSTED) | INDICATED SPEED $V_i = Q_p/\Delta tS + \Delta P \cdot V/\Delta tK$ BY $V_i \Delta t S = Q_p + \Delta P \cdot V/K$ | POSITION | TOTAL VOLUME | PISTON MOVEMENT AMOUNT | CALCULATE PREDICTED FLOW RATE USING POWER LAW $Q_p$ '/$\Delta t$ | $\Delta V_p = \Delta V_i - Q$ (COMPRESSED VOLUME) | BULK MODULUS FOR PREDICTION | ACTUALLY MEASURED PRESSURE $P_i$ (ADJUSTED) | PRESSURIZATION AMOUNT | $K' = (P_i - P_{i-1})/(\Delta V_p/V)$ MODIFIED K | $V_q$ FLOW RATE PORTION | $V_p$ PRESSURIZED PORTION |
| | TIME(s) | $P_t$(MPa) | $V_i$(mm/s) | $X_i$(mm) | $V_i$(mm³) | $\Delta X_i$(mm) | $Q_p$(mm³) | $\Delta V_p$(mm³) | K(MPa) | $P_i$(MPa) | $\Delta P_i$(MPa) | MODIFIED K'(MPa) | mm/s | mm/s |
| CYCLE0 | 0.0 | 2.00 | | 25.00 | | | | | | 0.000 | | | | |
| CYCLE1 | 0.1 | 2.00 | 0.647 | 24.94 | 8478.1 | 20.33 | 0.00 | 20.33 | 834.0 | 1.450 | 2.00 | 834.0 | 0.000 | 0.647 |
| CYCLE2 | 0.2 | 2.00 | 0.348 | 24.90 | 8457.7 | 10.94 | 3.25 | 7.69 | 604.6 | 1.950 | 0.55 | 604.6 | 0.103 | 0.245 |
| CYCLE3 | 0.3 | 2.00 | 0.363 | 24.85 | 8446.8 | 11.39 | 10.62 | 0.77 | 549.7 | 2.020 | 0.05 | 549.7 | 0.338 | 0.024 |

FIG. 29

CALCULATION SHEET OF INDICATED SPEED FOR FIRST TO THIRD CYCLES

| A | B | C | D = N+O | E | F | G | H | I | J | K | L | M | N | O |
|---|---|---|---|---|---|---|---|---|---|---|---|---|---|---|
| | | TARGET PRESSURE $P_t$ (ADJUSTED) | INDICATED FLOW RATE $V_i = Q_P/dV/S + \Delta P^*V/K/\Delta S$ BY $V_i^*\Delta t^*S = Q_P^*\Delta t + \Delta P^*V/K$ | POSITION | TOTAL VOLUME | PISTON MOVEMENT AMOUNT | CALCULATE PREDICTED FLOW RATE USING POWER LAW $Q_p^*\Delta t$ | $\Delta V_c = \Delta V - Q$ (COMPRESSED VOLUME) | BULK MODULUS FOR PREDICTION | ACTUALLY MEASURED PRESSURE $P_r$ (ADJUSTED) | PRESSURIZATION AMOUNT | $K' = (P_r - P_{r-1})/(\Delta V_c/V)$ MODIFIED K' (MPa) | $V_q$ FLOW RATE PORTION | $V_p$ (PRESSURIZED PORTION) |
| | TIME(s) | $P_t$(MPa) | $V_i$(mm/s) | $X_t$(mm) | $V_t$(mm³) | $\Delta V$(mm³) | $Q_p$(mm³) | $\Delta V_c$(mm³) | K(MPa) | $P_r$(MPa) | $\Delta P$(MPa) | | mm/s | mm/s |
| CYCLE0 | 0.0 | 0.09 | | 25.00 | | | | | | 0.000 | | | | |
| CYCLE1 | 0.1 | 0.09 | 0.029 | 25.00 | 212049.5 | 22.88 | 0.00 | 22.88 | 834.0 | 0.046 | 0.05 | 834.0 | 0.000 | 0.029 |
| CYCLE2 | 0.2 | 0.09 | 0.178 | 24.98 | 212026.7 | 139.75 | 117.86 | 21.89 | 426.3 | 0.089 | 0.04 | 426.3 | 0.150 | 0.028 |
| CYCLE3 | 0.3 | 0.09 | 2.104 | 24.77 | 211886.9 | 1652.14 | 1651.63 | 0.51 | 416.6 | 0.090 | 0.00 | 416.6 | 2.103 | 0.001 |

FIG. 34

DEFECT POSITION OUTPUT

BULK MODULUS K = 834.000(MPa) IN DATA TABLE  $K_{DF} = -500$

| THIRD EXAMPLE | BULK MODULUS K (MPa) | $P_t$ (MPa) | $P_r$ (MPa) | $\Delta P = P_r - P_t$ (MPa) | MODIFIED K' (MPa) | K' - K | DETERMINATION RESULT |
|---|---|---|---|---|---|---|---|
| CYCLE1 | 834.000 | 2.00 | 1.40 | -0.60 | 583.800 | -250.200 | |
| CYCLE2 | 583.000 | 2.00 | 2.19 | 0.19 | 639.261 | -194.739 | |
| CYCLE3 | 639.261 | 2.00 | 1.99 | -0.01 | 636.065 | -197.935 | |
| CYCLE4 | 636.065 | 2.00 | 0.81 | -1.19 | 257.606 | -576.394 | DF2 |
| CYCLE5 | 257.606 | 2.00 | 1.24 | -0.76 | 159.716 | -674.284 | DF2 |
| CYCLE6 | 159.716 | 2.00 | 1.99 | -0.01 | 308.450 | -525.550 | DF2 |

→ RECORD XYZ POSITION

FIG. 35

COORDINATE THAT MAY INCLUDE DEFECT OF WHICH
NOZZLE POSITION IS RECORDED IN RECORDING DEVICE

| DF1 SENSING CYCLE | COORDINATE THAT MAY INCLUDE DEFECT | | |
|---|---|---|---|
| | X | Y | Z |
| CYCLE4 | 3.5 | 6.5 | 10.5 |
| CYCLE5 | 4.0 | 7.0 | 10.5 |
| CYCLE6 | 4.5 | 7.5 | 10.5 |

FIG. 36

EXAMPLE OF NOZZLE STOP DUE TO CLOGGING $P_{max} = 2.0 (MPa)$

| FOURTH EXAMPLE | BULK MODULUS K (MPa) | $P_t$ (MPa) | $P_f$ (MPa) | $\Delta P = P_f - P_t$ (MPa) | MODIFIED K' (MPa) | K' - K | DETERMINATION RESULT |
|---|---|---|---|---|---|---|---|
| CYCLE1 | 834.000 | 2.00 | 1.40 | -0.60 | 583.800 | -250.200 | |
| CYCLE2 | 583.800 | 2.00 | 2.19 | 0.19 | 639.261 | -194.739 | |
| CYCLE3 | 657.000 | 2.00 | 1.99 | -0.01 | 653.715 | -180.285 | |
| CYCLE4 | 597.000 | 2.00 | 2.91 | 0.91 | 868.635 | 34.635 | |
| CYCLE5 | 873.000 | 2.00 | 5.90 | 3.90 | 2575.350 | 1741.350 | ST4 → PAUSE MODELING |

THREE-DIMENSIONALLY LAMINATED OBJECT MODELING APPARATUS AND THREE-DIMENSIONALLY LAMINATED OBJECT MODELING METHOD

CROSS-REFERENCE TO RELATED APPLICATION

This application claims priority to Japanese Patent Application No. 2021-058212 filed on Mar. 30, 2021, incorporated herein by reference in its entirety.

BACKGROUND

1. Technical Field

The present disclosure relates to a three-dimensionally laminated object modeling apparatus and a three-dimensionally laminated object modeling method.

2. Description of Related Art

An apparatus is proposed which includes an extruder (a screw) and a gear pump arranged in series, and which controls a flow rate of a molten resin discharged from a discharging nozzle, by adjusting, using the gear pump, the molten resin (a fluid material) sent from the extruder (the screw) positioned on an upstream (see, for example, US 2018-0056602 A).

SUMMARY

However, in the apparatus described in US 2018-0056602 A, to control the flow rate of the molten resin, rotations of both the extruder (the screw) and the gear pump need to be controlled at the same time, and this causes an issue of worsening controllability.

The present disclosure provides a three-dimensionally laminated object modeling apparatus and a three-dimensionally laminated object modeling method capable of improving controllability of a flow rate of a molten resin discharged from a discharging nozzle.

A three-dimensionally laminated object modeling apparatus according to a first aspect of the present disclosure includes a cylinder configured to store a molten resin, a discharging nozzle that is communicated with the cylinder, a piston configured to linearly reciprocate in the cylinder and discharge the molten resin from the discharging nozzle by moving in a direction of approaching the discharging nozzle and by pressurizing the molten resin in the cylinder, a drive device configured to relatively move the discharging nozzle with respect to a table on which a three-dimensionally modeled object is modeled by laminating a resin bead that is the molten resin discharged from the discharging nozzle, and at least one processor configured to acquire a movement speed of the discharging nozzle and control movement of the piston based on the movement speed of the discharging nozzle.

With such a configuration, it is possible to improve controllability of the flow rate of the molten resin discharged from the discharging nozzle.

This is because the flow rate of the molten resin is controlled (simplification of flow control) by controlling the movement of the piston that linearly reciprocates in the cylinder which stores the molten resin, not by controlling the rotations of both the extruder (the screw) and the gear pump.

In the first aspect, the at least one processor may control, based on the movement speed of the discharging nozzle, a movement speed of the piston such that a dimension of the resin bead is constant.

In this manner, it is possible to control the dimension of the resin bead such that the dimension is constant (substantially constant) by controlling, based on the movement speed of the discharging nozzle, the movement speed of the piston that linearly reciprocates in the cylinder which stores the molten resin.

In the first aspect, space in the cylinder opposite to the discharging nozzle side with respect to the piston may be a resin raw material supply chamber to which a resin raw material is supplied, and space in the cylinder on the discharging nozzle side with respect to the piston may be a plasticization chamber which stores the molten resin. The piston may plasticize, by moving in a direction away from the discharging nozzle, the resin raw material supplied to the resin raw material supply chamber and store the molten resin which is the plasticized resin raw material in the plasticization chamber. The piston may discharge, by moving in the direction of approaching the discharging nozzle and by pressurizing the molten resin stored in the plasticization chamber, the molten resin stored in the plasticization chamber from the discharging nozzle.

In this manner, after the resin raw material is temporarily plasticized and stored, by pressurizing the stored molten resin using one piston that linearly reciprocates, it is possible to discharge the molten resin from the discharging nozzle. As such, the controllability is improved, as compared with US 2018-0056602 A in which the rotations of both the extruder (screw) and the gear pump are controlled at the same time. Further, it is possible to execute the plasticization of the resin raw material (generation and storage of the molten resin) and the control of the flow rate of the stored molten resin using one piston that linearly reciprocates. Further, since it is possible to execute the plasticization of the resin raw material and the control of the flow rate of the stored molten resin using one piston, it is not necessary to separately provide a mechanism used for plasticizing the resin raw material.

In the first aspect, the at least one processor may control the movement speed of the piston such that a flow rate of the molten resin discharged from the discharging nozzle becomes the movement speed of the discharging nozzle×a size of a cross-sectional area of the resin bead.

In this manner, it is possible to control the dimension of the resin bead such that the dimension is constant (substantially constant).

In the first aspect, the at least one processor may control a temperature of the molten resin stored in the cylinder.

In this manner, it is possible to control the temperature of the molten resin stored in the cylinder such that the temperature becomes a temperature suitable for the molten resin (a temperature at which a molten state is maintained without overheating).

In the first aspect, the at least one processor may predict a discharged flow rate of the molten resin discharged from the discharging nozzle, and control movement of the discharging nozzle by controlling the drive device based on the predicted discharged flow rate such that the dimension of the resin bead is constant.

In this manner, it is possible to control the dimension of the resin bead such that the dimension is constant (substantially constant) based on the predicted discharged flow rate by controlling the movement speed of the discharging nozzle.

In the first aspect, the at least one processor may control the movement speed of the discharging nozzle by controlling the drive device such that the movement speed of the discharging nozzle becomes the predicted discharged flow rate divided by the size of the cross-sectional area of the resin bead.

In this manner, it is possible to control the dimension of the resin bead such that the dimension is constant (substantially constant).

In the first aspect, the at least one processor may control the piston such that the piston moves by a predetermined amount in a direction away from the discharging nozzle at a predetermined timing.

In this manner, it is possible to set the discharging pressure to a negative pressure (for example, a pressure lower than an outside air pressure) by controlling the piston such that the piston moves by the predetermined amount in the direction away from the discharging nozzle at the predetermined timing. As such, it is possible to restrict the molten resin from being continuously discharged due to a residual pressure, gravity, or the like. As a result, it is possible to control the dimension of the resin bead such that the dimension is constant (substantially constant).

In the first aspect, the predetermined timing may be a timing at which the movement speed of the discharging nozzle is changed from a numerical value other than zero to zero.

In this manner, it is possible to set the discharging pressure to the negative pressure (for example, a pressure lower than the outside air pressure) at the timing at which the movement speed of the discharging nozzle is changed from the numerical value other than zero to zero (a timing at which the discharging nozzle that is moving is stopped).

In the first aspect, the predetermined amount may be an amount by which a resin pressure in the discharging nozzle becomes lower than a resin pressure outside the discharging nozzle.

In this manner, it is possible to restrict the molten resin from being continuously discharged due to a residual pressure, gravity, or the like by setting the resin pressure in the discharging nozzle to be lower than the resin pressure outside the discharging nozzle.

In the first aspect, the predetermined timing may be a timing that is a predetermined time before the timing at which the movement speed of the discharging nozzle is predicted to be changed from a numerical value other than zero to zero.

In this manner, it is possible to set the discharging pressure to the negative pressure (for example, a pressure lower than the outside air pressure) during the predetermined time before the timing at which the movement speed of the discharging nozzle is predicted to be changed from the numerical value other than zero to zero (the timing at which the discharging nozzle that is moving is stopped).

In the first aspect, the predetermined amount may be an amount by which a resin pressure in the discharging nozzle becomes lower than the resin pressure outside the discharging nozzle.

In this manner, it is possible to restrict the molten resin from being continuously discharged due to a residual pressure, gravity, or the like by setting the resin pressure in the discharging nozzle to be lower than the resin pressure outside the discharging nozzle.

In the first aspect, the predetermined time may be a time required for the piston to move by the predetermined amount.

In this manner, it is possible to restrict the molten resin from being continuously discharged due to the residual pressure, gravity, or the like at the same timing as the timing at which the movement speed of the discharging nozzle is changed from the numerical value other than zero to zero (the timing at which the discharging nozzle that is moving is stopped) (the flow rate of the molten resin discharged from the discharging nozzle can be set to zero).

In the first aspect, a movement speed of the piston in the direction away from the discharging nozzle may be a speed at which air does not flow into a plasticization chamber from a resin raw material supply chamber.

In this manner, it is possible to prevent air from being mixed in the plasticization chamber.

In the first aspect, the three-dimensionally laminated object modeling apparatus may further include a check ball arranged between a plasticization chamber and the discharging nozzle, and positioned at an open position at which a flow path of the molten resin that communicates with the plasticization chamber and the discharging nozzle is opened or a closed position at which the flow path is closed, and an elastic member configured to position the check ball at the closed position using an elastic force. The check ball may move, when the piston moves in the direction of approaching the discharging nozzle and a pressure that pressurizes the molten resin in the cylinder exceeds a predetermined pressure, from the closed position to the open position while elastically deforming the elastic member. The check ball may move, when the piston moves in a direction away from the discharging nozzle, from the open position to the closed position using a restoring force by which a shape of the elastic member is returned to a shape before the elastic deformation.

In this manner, by automatically moving to the open position or the closed position according to the movement of the piston that linearly reciprocates in the cylinder, the check ball causes a plurality of cylinders to be communicated with the discharging nozzle. When the molten resin in one cylinder is discharged from the discharging nozzle, it is possible to prevent the molten resin from reversely flowing into the other cylinder.

In the first aspect, the at least one processor may suck, in a state where an outlet of the discharging nozzle and the three-dimensionally modeled object are fluidly connected to each other, an uncured resin bead in the three-dimensionally modeled object by controlling the piston such that the piston moves in the direction away from the discharging nozzle by the predetermined amount.

As such, it is possible to suck the uncured resin bead (for example, a resin bead in a portion in which the resin beads overlap) that is once laminated in the three-dimensionally modeled object. As a result, it is possible to control the dimension of the resin bead such that the dimension is constant (substantially constant).

In the first aspect, a plurality of combinations of the cylinders and the pistons may be included.

In this manner, it is possible to continuously discharge the molten resin without interruption.

According to a second aspect of the present disclosure is a three-dimensionally laminated object modeling method in a three-dimensionally laminated object modeling apparatus. The three-dimensionally laminated object modeling apparatus includes a cylinder configured to store a molten resin, a discharging nozzle that is communicated with the cylinder, a piston configured to linearly reciprocate in the cylinder and discharge the molten resin from the discharging nozzle by moving in a direction of approaching the discharging nozzle and by pressurizing the molten resin in the cylinder, and a drive device configured to relatively move the discharging nozzle with respect to a table, and models a three-dimensionally modeled object by laminating a resin bead that is the molten resin discharged from the discharging nozzle on the table. The three-dimensionally modeled object modeling method includes acquiring a movement speed of the discharging nozzle and controlling movement of the piston based on the movement speed of the discharging nozzle.

In the second aspect, the three-dimensionally modeled object modeling method may further include predicting a discharged flow rate of the molten resin discharged from the discharging nozzle and controlling movement of the discharging nozzle by controlling the drive device based on the predicted discharged flow rate such that a diameter of the resin bead is constant.

In the second aspect, the piston may be controlled such that the piston moves by a predetermined amount in a direction away from the discharging nozzle at a predetermined timing.

With each aspect of the present disclosure, it is possible to provide a three-dimensionally laminated object modeling apparatus and a three-dimensionally laminated object modeling method that can improve controllability of a flow rate of a molten resin discharged from a discharging nozzle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 17 is an example (a representative example) of a power index;

FIG. 18A is an example of a numerical table used for calculating a bulk modulus;

FIG. 18B is a graph in which FIG. 18A is plotted;

FIG. 28 is a table displaying a summary of simulation results (first to third cycles) of the first example; and FIG. 29 is a table displaying a summary of simulation results (the first to the third cycles) of the second example.

FIG. 34 is a table summarizing results (the first to sixth cycles) of a third example;

FIG. 35 is an example of the modeling defect prediction position stored in a position storage unit (a nozzle position at a time when the abnormality detection unit detects an abnormality (a defect));

FIG. 36 is a table summarizing results (the first to fifth cycles) of a fourth example;

DETAILED DESCRIPTION OF EMBODIMENTS

Hereinafter, specific embodiments to which the present disclosure is applied will be described in detail with reference to drawings. However, the present disclosure is not limited to the embodiments below. Further, to clarify description, the description and drawings below will be appropriately simplified.

First Embodiment

Figure 1:
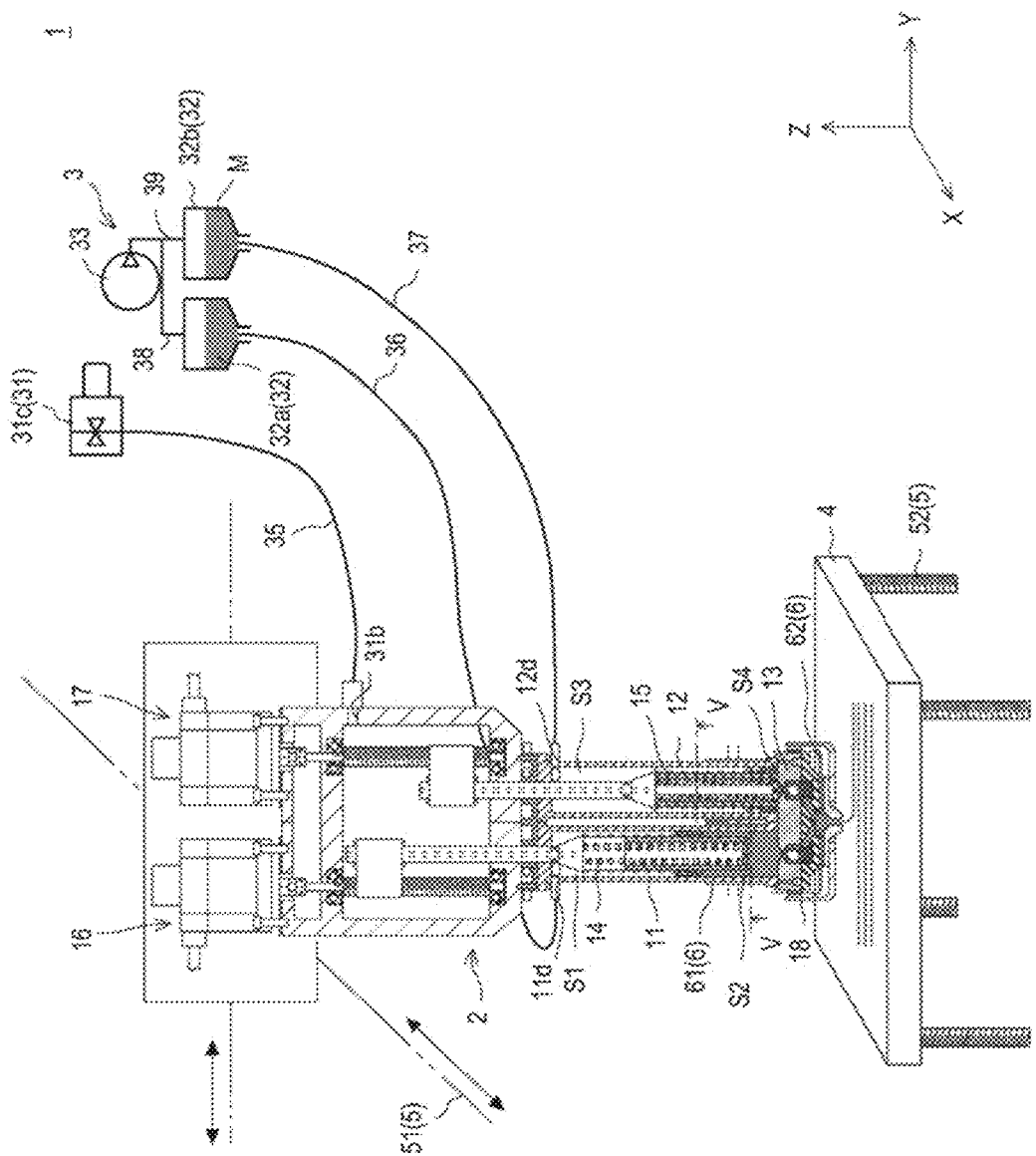
FIG. 1 is a diagram schematically illustrating an injection molding apparatus according to a first embodiment.
Figure 2:
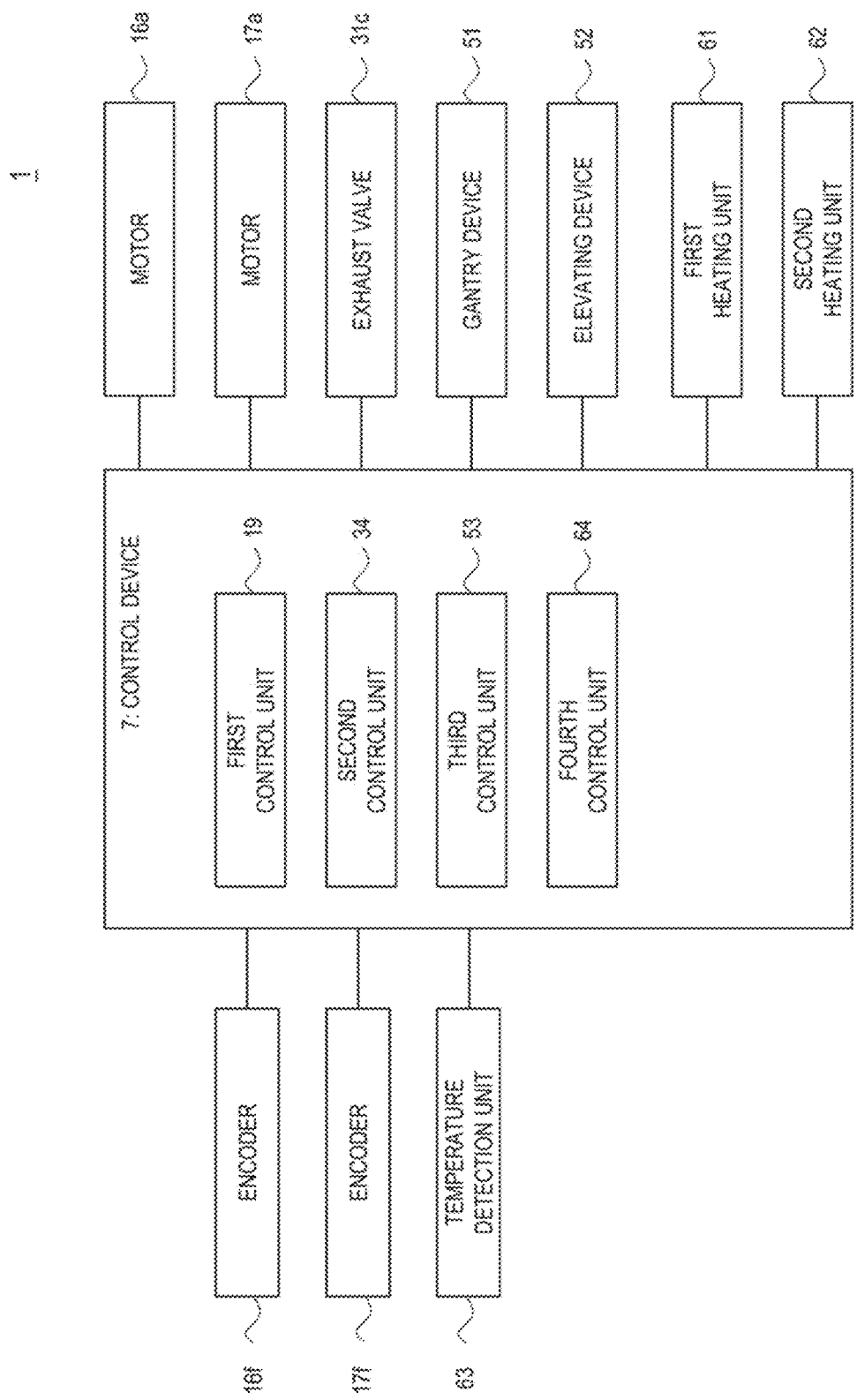
FIG. 2 is a block diagram of a control system of the injection molding apparatus according to the first embodiment.

First, a configuration of an injection molding apparatus according to the present embodiment will be described. The injection molding apparatus according to the present embodiment is suitable for laminating and modeling a workpiece using an injection molding machine. FIG. 1 is a diagram schematically illustrating the injection molding apparatus according to the present embodiment. FIG. 2 is a block diagram of a control system of the injection molding apparatus according to the present embodiment. In the description below, to clarify the description, a three-dimensional (XYZ) coordinate system will be used.

Figure 3:
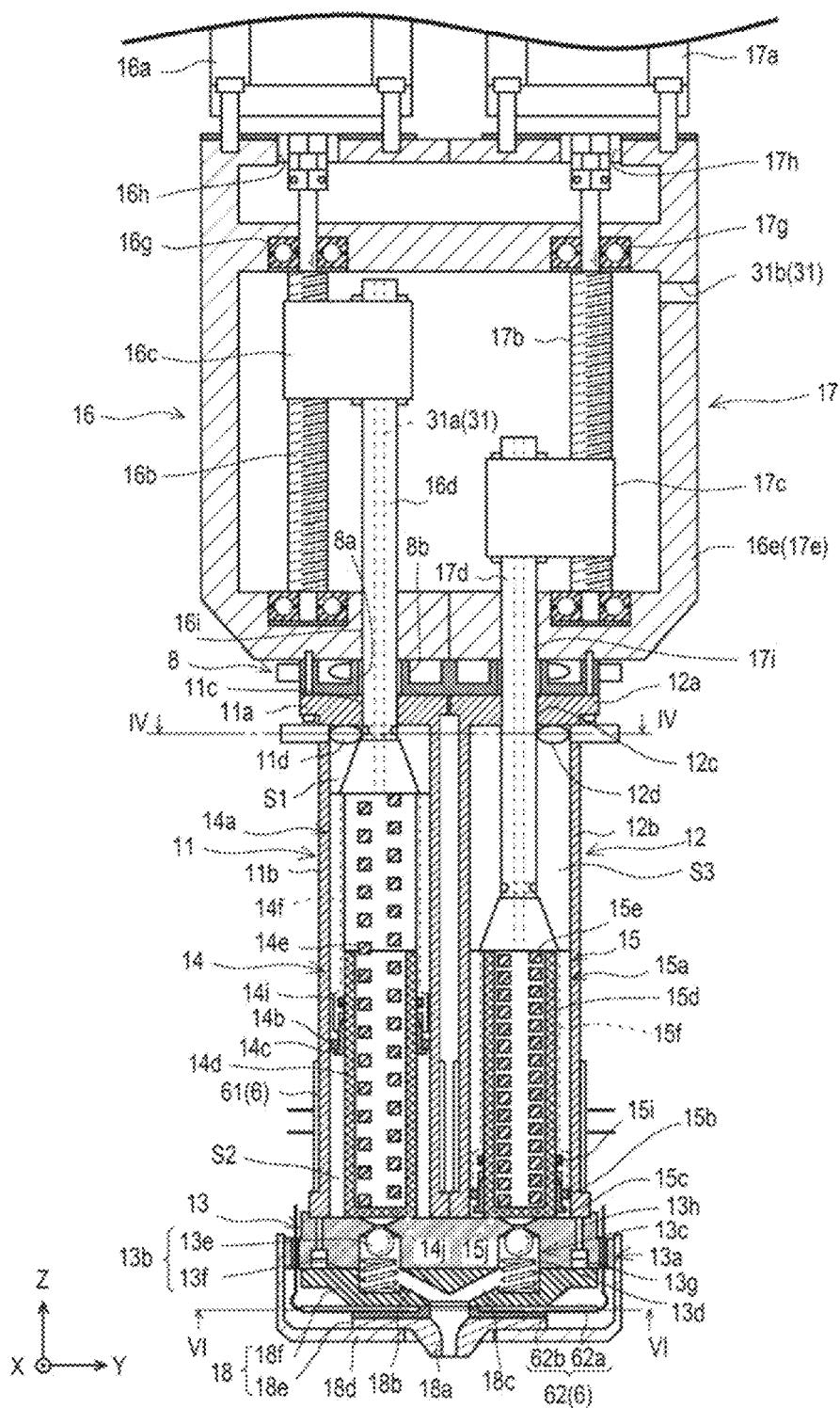
FIG. 3 is a diagram illustrating an enlarged part on a minus side of a Z-axis of an injection molding machine according to the first embodiment.
Figure 4:
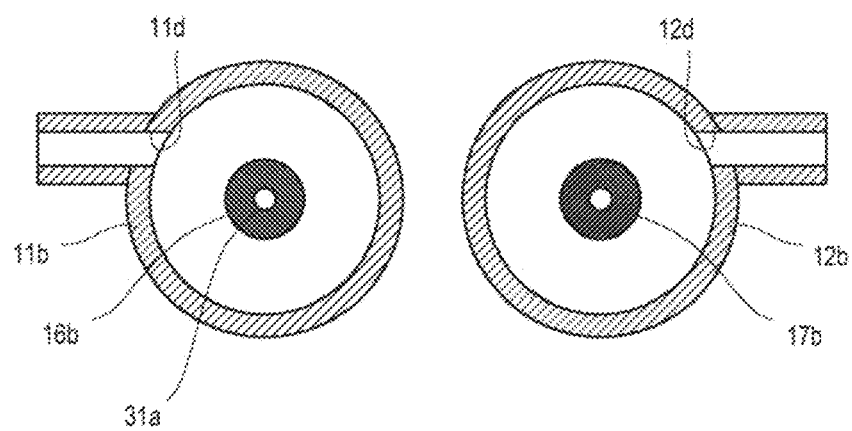
FIG. 4 is a cross-sectional view taken along a line IV-IV of FIG. 3.
Figure 5:
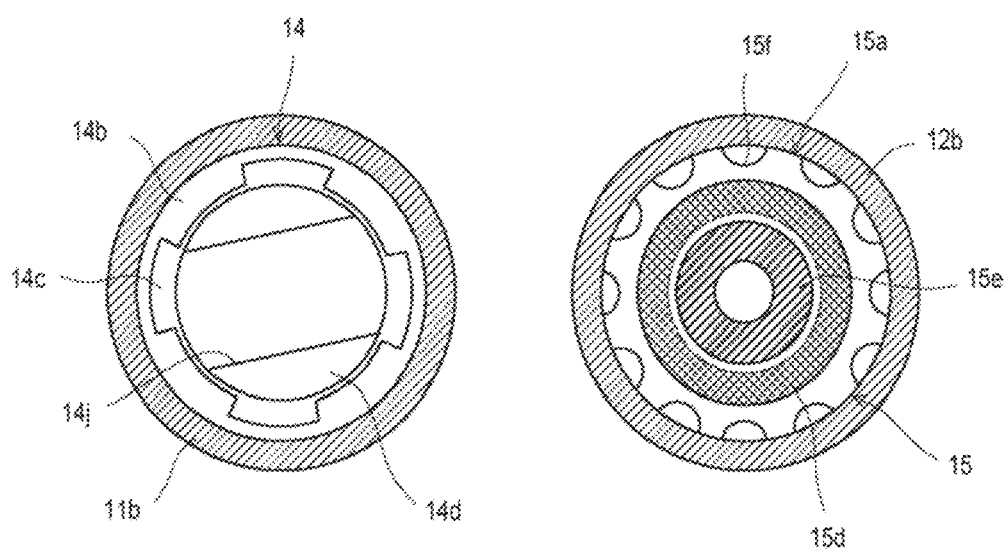
FIG. 5 is a cross-sectional view taken along a line V-V of FIG. 1.
Figure 6:
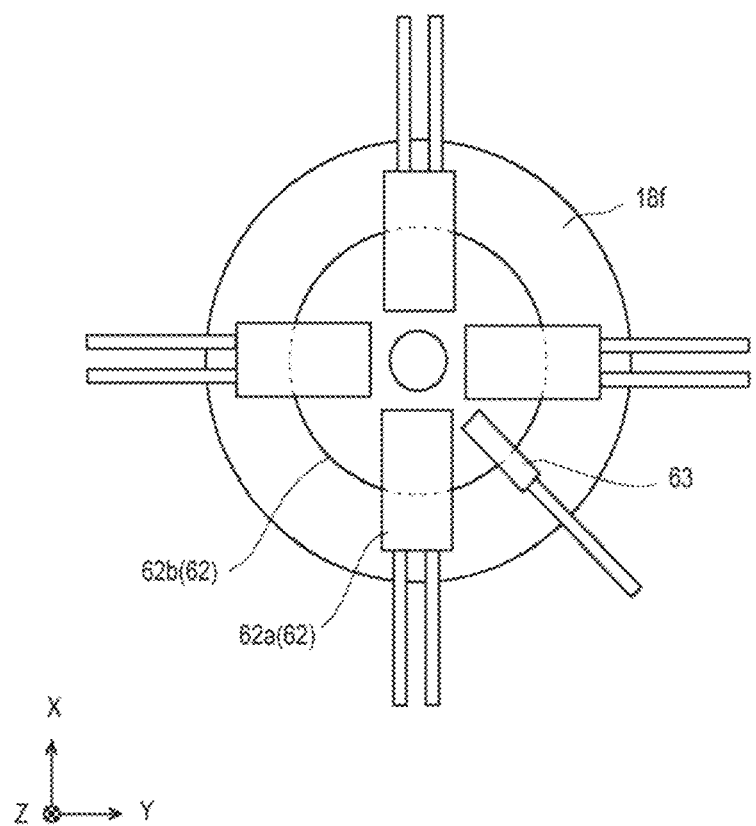
FIG. 6 is a cross-sectional view taken along a line VI-VI of FIG. 3.

As illustrated in FIGS. 1 and 2, an injection molding apparatus 1 includes an injection molding machine 2, a supply device 3, a table 4 (hereinafter, also referred to as a base plate 4), a moving device 5, a heating device 6, and a control device 7. The injection molding machine 2 may be configured to be, for example, capable of continuously injecting a molten resin. FIG. 3 is a diagram illustrating an enlarged part on a minus side of a Z-axis of the injection molding machine 2 according to the present embodiment. FIG. 4 is a cross-sectional view taken along a line IV-IV of FIG. 3. FIG. 5 is a cross-sectional view taken along a line V-V of FIG. 1. FIG. 6 is a cross-sectional view taken along a line VI-VI of FIG. 3.

As illustrated in FIGS. 1 to 3, the injection molding machine 2 includes a first cylinder 11, a second cylinder 12, an end plate 13, a first piston unit 14, a second piston unit 15, a first drive unit 16, a second drive unit 17, an injection portion 18, and a first control unit 19.

As illustrated in FIG. 3, the first cylinder 11 extends in the Z-axis direction, and has, as a basic form, a topped cylinder shape in which the end on a plus side of the Z-axis of the first cylinder 11 is closed. In other words, the first cylinder 11 includes a closed portion 11a arranged on the plus side of the Z-axis and a tubular-shaped side wall portion 11b continuous with a peripheral edge portion of the closed portion 11a and extending from the closed portion 11a to the minus side of the Z-axis. The end on the minus side of the Z-axis of the first cylinder 11 is open.

As illustrated in FIG. 3, a through hole 11e that penetrates the closed portion 11a in the Z-axis direction is formed in the closed portion 11a of the first cylinder 11. Further, as illustrated in FIGS. 3 and 4, a supply hole 11d to which a resin raw material is supplied is formed in a portion on the plus side of the Z-axis in the side wall portion 11b of the first cylinder 11. The resin raw material may be, for example, resin pellets (plural).

As illustrated in FIGS. 3 and 4, the second cylinder 12 extends in the Z-axis direction and is in parallel with the first cylinder 11 in the Y-axis direction. Since the second cylinder 12 has the same configuration as that of the first cylinder 11, duplicate description thereof will be omitted, but the second cylinder 12 includes a closed portion 12a having a through hole 12c and a side wall portion 12b having a supply hole 12d. The end on the minus side of the Z-axis of the second cylinder 12 is open.

As illustrated in FIG. 3, the end plate 13 is fixed to the ends on the minus side of the Z-axis of the first cylinder 11 and the second cylinder 12. The end plate 13 includes a main body 13a and a check valve 13b. The main body 13a may have, for example, a plate shape as a basic form, and through holes 3c are formed at intervals in the Y-axis direction.

As illustrated in FIG. 3, the through hole 13c penetrates the main body 13a in the Z-axis direction, and includes an accommodating portion 13d that accommodates the check valve 13b in a portion on the minus side of the Z-axis of the through hole 13c. A surface on the plus side of the Z-axis of the accommodating portion 13d is an inclined surface that inclines toward the minus side of the Z-axis as it goes outward from the center of the through hole 13c.

At this time, a portion on the plus side of the Z-axis of the through hole 13c includes an inclined surface that inclines toward the plus side of the Z-axis as it goes outward from the center of the through hole 13c, and the end on the minus side of the Z-axis of the inclined surface is continuous with a portion on the plus side of the Z-axis of the accommodating portion 13d.

The check valve 13b allows the molten resin to flow to the minus side of the Z-axis and blocks the molten resin from flowing to the plus side of the Z-axis. The check valve 13b can be composed of, for example, a check valve, and, as illustrated in FIG. 3, includes a check ball 13e and a spring 13f. Here, an elastic force of the spring 13f is appropriately set such that the check valve 13b is opened when a pressure set in advance is applied to the check ball 13e.

As illustrated in FIG. 3, the end plate 13 is fixed to the ends on the minus side of the Z-axis of the first cylinder 11 and the second cylinder 12 via bolts 13h that pass through bolt holes 13g formed in the main body 13a such that the end plate 13 covers respective openings on the minus side of the Z-axis of the first cylinder 11 and the second cylinder 12.

At this time, the through hole 13e on the minus side of a Y-axis in the end plate 13 is arranged on the minus side of the Z-axis with respect to the first cylinder 11, and the through hole 13c on the plus side of the Y-axis in the end plate 13 is arranged on the minus side of the Z-axis with respect to the second cylinder 12.

Here, a central axis of the through hole 13c on the minus side of the Y-axis in the end plate 13 and a central axis of the first cylinder 11 are arranged so as to substantially overlap with each other, and a central axis of the through hole 13c on the plus side of the Y-axis in the end plate 13 and a central axis of the second cylinder 12 are arranged so as to substantially overlap with each other.

Figure 7:
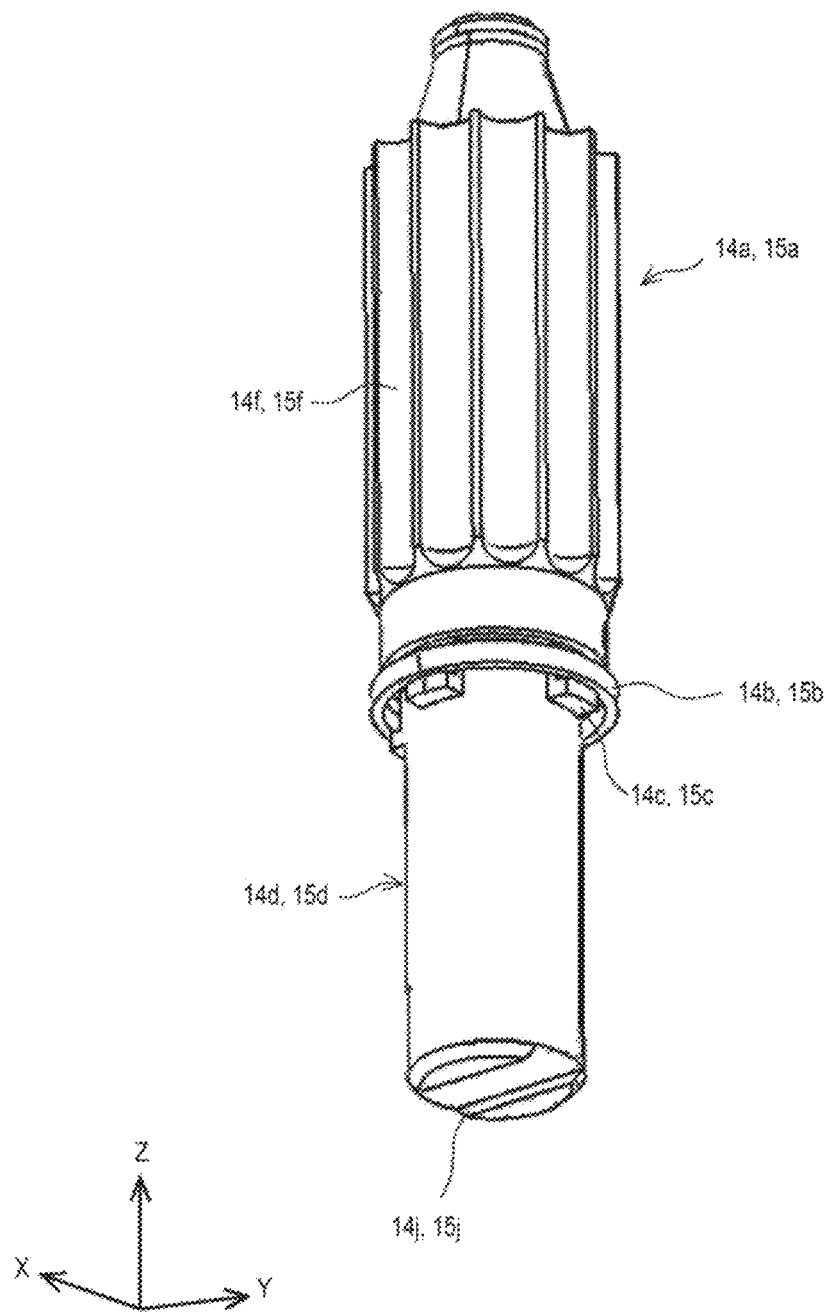
FIG. 7 is a perspective view illustrating a first piston unit and a second piston unit according to the first embodiment.
Figure 8:
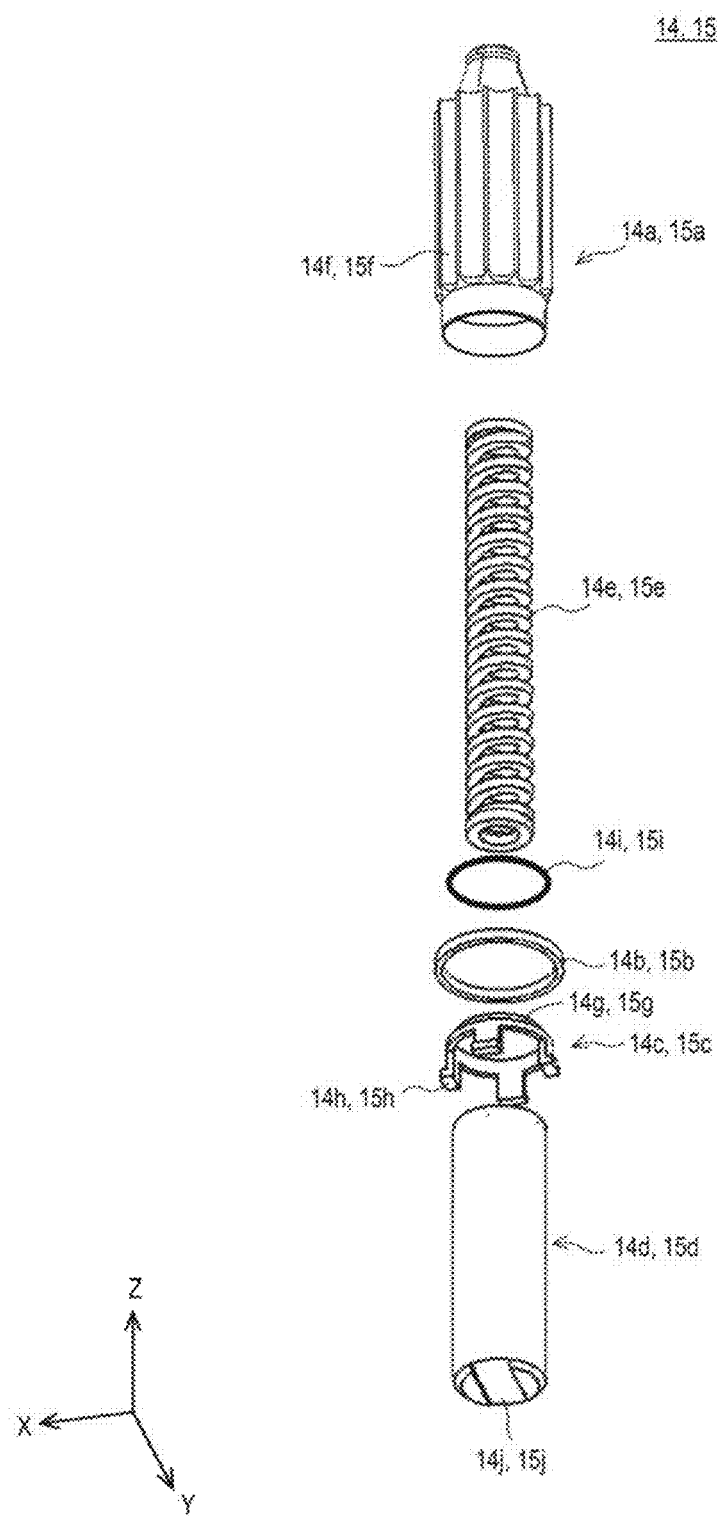
FIG. 8 is an exploded view illustrating the first piston unit and the second piston unit according to the first embodiment.

As illustrated in FIG. 3, the first piston unit 14 is arranged in the first cylinder 11 so as to be capable of sliding therein. FIG. 7 is a perspective view illustrating the first piston unit 14 and the second piston unit 15 according to the present embodiment. FIG. 8 is an exploded view illustrating the first piston unit 14 and the second piston unit 15 according to the present embodiment.

As illustrated in FIGS. 7 and 8, the first piston unit 14 includes a torpedo piston 14a, a check ring 14b, a stopper 14c, a pressurizing piston 14d, and a biasing tool 14e. The torpedo piston 14a has, as a basic form, a topped cylinder shape in which the end on the plus side of the Z-axis of the torpedo piston 14a is closed, and generally has an outer circumference shape corresponding to the inner circumference shape of the first cylinder 11. At this time, a surface on the plus side of the Z-axis of the torpedo piston 14a is an inclined surface that inclines toward the minus side of the Z-axis as it goes toward a peripheral edge portion from the center of the torpedo piston 14a.

As illustrated in FIGS. 7 and 8, groove portions 14f are formed on an outer circumferential surface of the torpedo piston 14a. The groove portions 14f extend in the Z-axis direction and are arranged at substantially equal intervals in the circumferential direction of the torpedo piston 14a.

However, as described below, the groove portions 14f are formed and arranged to be capable of plasticizing the resin raw material to form the molten resin when the resin raw material supplied to a first space S1 on the plus side of the Z-axis with respect to the first piston unit 14 in the first cylinder 11 passes through the groove portions 14f, and of causing the molten resin to flow into a second space S2 on the minus side of the Z-axis with respect to the first piston unit 14 in the first cylinder 11.

As illustrated in FIGS. 5, 7, and 8, the check ring 14b is ring-shaped having an outer circumference shape substantially equal to the inner circumference shape of the first cylinder 11, and is arranged on the minus side of the Z-axis with respect to the torpedo piston 14a. The stopper 14c holds the check ring 14b at the end on the minus side of the Z-axis of the torpedo piston 14a.

As illustrated in FIG. 8, the stopper 14c includes, for example, a ring portion 14g and hook portions 14h. The ring portion 14g has an outer circumference shape substantially equal to an inner circumference shape of the torpedo piston 14a. The hook portion 14h has a substantially L shape when viewed from a direction orthogonal to the Z-axis, and the end on the plus side of the Z-axis of a vertical portion of the hook portion 14h is fixed to the ring portion 14g.

As illustrated in FIG. 8, a horizontal portion of the hook portion 14h protrudes from the end on the minus side of the Z-axis of the vertical portion of the hook portion 14h toward the outside of the ring portion 14g. The hook portions 14h are arranged at substantially equal intervals in the circumferential direction of the ring portion 14g.

The ring portion 14g is fitted into an opening of the end on the minus side of the Z-axis of the torpedo piston 14a in a state where a vertical portion of the ring portion 14g and the vertical portions of the hook portions 14h pass through a through hole of the check ring 14b. As such, the check ring 14b is held at the end on the minus side of the Z-axis of the torpedo piston 14a via the stopper 14c.

At this time, a length of the vertical portion of the hook portion 14h in the Z-axis direction is longer than a thickness of the check ring 14b in the Z-axis direction. As such, the check ring 14b is movable in the Z-axis direction between the end on the minus side of the Z-axis of the first cylinder 11 and the horizontal portion of the hook portion 14h. However, the stopper 14c is configured to be capable of holding the check ring 14b at the end on the minus side of the Z-axis of the first cylinder 11 so as to be movable in the Z-axis direction.

As illustrated in FIGS. 7 and 8, the pressurizing piston 14d has a bottomed tubular shape in which the end on the minus side of the Z-axis of the pressurizing piston 14d is closed. For example, an end surface on the minus side of the Z-axis of the pressurizing piston 14d has a substantially flat surface parallel to an XY plane surface. Thus, an outer circumference shape of the pressurizing piston 14d is substantially equal to the inner circumference shape of the torpedo piston 14a.

As illustrated in FIG. 3, the pressurizing piston 14d is slidably inserted in the torpedo piston 14a in a state where space between an inner circumferential surface of the torpedo piston 14a and an outer circumferential surface of the pressurizing piston 14d is closed by a seal member 14i.

In other words, the inside of the torpedo piston 14a functions as a sliding portion of the pressurizing piston 14d, and when the pressurizing piston 14d slides in the Z-axis direction with respect to the torpedo piston 14a, a protrusion amount of the first cylinder 11 to the second space S2 with respect to the torpedo piston 14a is changed. A size, a maximum movement amount, or the like of an area surrounded by an outer circumferential edge of the pressurizing piston 14d will be described below.

At this time, although detailed functions will be described below, as illustrated in FIGS. 7 and 8, an invading portion 14j into which the molten resin intrudes is formed on the end surface on the minus side of the Z-axis of the pressurizing piston 14d. The invading portion 14j is a groove portion formed on, for example, the end surface on the minus side of the Z-axis of the pressurizing piston 14d and extending in a direction orthogonal to the Z-axis.

However, the invading portion 14j has a shape that enables the molten resin to intrude into space between the end surface on the minus side of the Z-axis of the pressurizing piston 14d and an end surface on the plus side of the Z-axis of the end plate 13 in a state where the end surface on the minus side of the Z-axis of the pressurizing piston 14d is in contact with the end surface on the plus side of the Z-axis of the end plate 13.

The biasing tool 14e biases the pressurizing piston 14d to the second space S2 side of the first cylinder 11 with respect to the torpedo piston 14a. As illustrated in FIG. 8, the biasing tool 14e may be, for example, an elastic member, such as a coil spring.

The biasing tool 14e is arranged in the pressurizing piston 14d in a state where the end on the plus side of the Z-axis of the biasing tool 14e comes into contact with the end on the plus side of the Z-axis of the torpedo piston 14a, and the end on the minus side of the Z-axis of the biasing tool 14e comes into contact with the end on the minus side of the Z-axis of the pressurizing piston 14d. A biasing force and the like of the biasing tool 14e will be described below.

As illustrated in FIG. 3, the second piston unit 15 is arranged in the second cylinder 12 so as to be slidable therein. Since the second piston unit 15 has the same configuration as that of the first piston unit 14, duplicate description thereof will be omitted, but, as illustrated in FIGS. 5, 7, and 8, the second piston unit 15 includes a torpedo piston 15a having groove portions 15f formed on an outer circumferential surface thereof, a check ring 15b, a stopper 15c having a ring portion 15g and a hook portion 15h, a pressurizing piston 15d, and a biasing tool 15e.

Thus, as illustrated in FIG. 3, the pressurizing piston 15d is slidably inserted in the torpedo piston 15a in a state where space between an inner circumferential surface of the torpedo piston 15a and an outer circumferential surface of the pressurizing piston 15d is closed by a seal member 15i. At this time, as illustrated in FIGS. 5, 7, and 8, an invading portion 15j into which the molten resin intrudes is also formed on the end surface on the minus side of the Z-axis of the pressurizing piston 15d.

The first drive unit 16 drives the first piston unit 14 in the Z-axis direction. As illustrated in FIG. 3, the first drive unit 16 includes a motor 16a, a screw shaft 16b, a slider 16c, a rod 16d, and a case 16e. The motor 16a may be, for example, a servomotor, and is fixed to the end on the plus side of the Z-axis of the case 16e. A rotation angle of an output shaft of the motor 16a is detected by an encoder 16f (see FIG. 2).

As illustrated in FIG. 3, the screw shaft 16b extends in the Z-axis direction and is rotatably supported via a bearing 16g in the case 16e. Thus, the end on the plus side of the Z-axis of the screw shaft 16b is connected to the output shaft in a state where the end on the plus side of the Z-axis of the screw shaft 16b passes through a through hole 16h formed at the end on the plus side of the Z-axis of the case 16e so as to be capable of transmitting a drive force from the output shaft of the motor 16a.

The slider 16c includes a screw hole, and the screw hole of the slider 16c is meshed with the screw shaft 16b such that the slider 16c moves along the screw shaft 16b in the case 16e. The screw shaft 16b and the slider 16c compose a ball screw and are accommodated in the case 16e.

As illustrated in FIG. 3, the rod 16d extends in the Z-axis direction and passes through a through hole 16i formed at the end on the minus side of the Z-axis of the case 16e and the through hole 11c of the first cylinder 11. The end on the plus side of the Z-axis of the rod 16d is fixed to the slider 16c and the end on the minus side of the Z-axis of the rod 16d is fixed to the end on the plus side of the Z-axis of the torpedo piston 14a of the first piston unit 14.

As illustrated in FIG. 3, the case 16e supports the motor 16a, the screw shaft 16b, the slider 16c, and the rod 16d. The case 16e may be, for example, box-shaped and a sealed space is formed therein. The closed portion 11a of the first cylinder 11 is fixed to the end on the minus side of the Z-axis of the case 16e.

The second drive unit 17 drives the second piston unit 15 in the Z-axis direction. Since the second drive unit 17 has the same configuration as that of the first drive unit 16, duplicate description thereof will be omitted, but, as illustrated in FIG. 3, the second drive unit 17 includes a motor 17a, a screw shaft 17b, a slider 17c, a rod 17d, and a case 17e.

In other words, the motor 17a is fixed to the end on the plus side of the Z-axis of the case 17e, and a rotation angle of an output shaft of the motor 17a is detected by an encoder 17f (see FIG. 2). As illustrated in FIG. 3, the screw shaft 17b is supported via a bearing 17g in the case 17e, and the end on the plus side of the Z-axis of the screw shaft 17b is connected to the output shaft of the motor 17a in a state where the end on the plus side of the Z-axis of the screw shaft 17b passes through a through hole 17h formed at the end on the plus side of the Z-axis of the case 17e.

A screw hole of the slider 17c is meshed with the screw shaft 17b such that the slider 17c moves along the screw shaft 17b in the case 17e. The rod 17d passes through a through hole 17i formed at the end on the minus side of the Z-axis of the case 17e and the through hole 12c of the second cylinder 12. Thus, the end on the plus side of the Z-axis of the rod 17d is fixed to the slider 17c, and the end on the minus side of the Z-axis of the rod 17d is fixed to the end on the plus side of the Z-axis of the torpedo piston 15a of the second piston unit 15.

As illustrated in FIG. 3, the case 17e supports the motor 17a, the screw shaft 17b, the slider 17c, and the rod 17d, and a sealed space is formed therein. Thus, the closed portion 12a of the second cylinder 12 is fixed to the end on the minus side of the Z-axis of the case 17e.

In the present embodiment, as illustrated in FIGS. 1 and 3, the case 17e is integrally formed with the case 16e of the first drive unit 16 to form a common sealed space. For this reason, in the description below, when the case 16e of the first drive unit 16 is illustrated, the case 17e of the second drive unit 17 may also be illustrated. However, the case 17e may be composed of a member different from that of the case 16e of the first drive unit 16.

The injection portion 18 is arranged on the minus side of the Z-axis with respect to the end plate 13 such that the molten resin extruded from the first cylinder 11 and the second cylinder 12 can be injected. As illustrated in FIG. 3, the injection portion 18 includes an injection port 18a that injects the molten resin (a resin discharging hole, it corresponds to a discharging nozzle of the present disclosure. Hereinafter, it is also referred to as a discharging nozzle 18a or a nozzle 18a), a first branch path 18b that is on the plus side of the Z-axis from the injection port 18a and extending to the minus side of the Y-axis, and a second branch path 18c that is on the plus side of the Z-axis from the injection port 18a and extending to the plus side of the Y-axis. Here, the injection port 18a has a shape that narrows as it goes toward the minus side of the Z-axis.

As illustrated in FIG. 3, the injection portion 18 is fixed to the end plate 13 via a retaining nut 18d. At this time, the end on the plus side of the Z-axis of the first branch path 18b communicates with the through hole 13e on the minus side of the Y-axis in the end plate 13, and the end on the plus side of the Z-axis of the second branch path 18c communicates with the through hole 13c on the plus side of the Y-axis in the end plate 13.

The injection portion 18 is divided into a first plate 18e in which the injection port 18a is formed and a second plate 18f in which the first branch path 18b and the second branch path 18c are formed. Although functions will be described below, at least one of the first plate 18e and the second plate 18f is composed of a ceramic plate. Here, the injection portion 18 can be formed with an accommodating portion that accommodates a part of the check valve 13b.

Although details will be described below, the first control unit 19 controls the motor 16a of the first drive unit 16 and the motor 17a of the second drive unit 17 based on detection results of the encoders 16f, 17f.

The supply device 3 supplies the resin raw material to the first cylinder 11 and the second cylinder 12. As illustrated in FIGS. 1 to 3, the supply device 3 includes an exhaust unit 31, a hopper 32, a pressurizing unit 33, and a second control unit 34. The exhaust unit 31 discharges gas from space surrounded by the first space S1 of the first cylinder 11, a first space S3 on the plus side of the Z-axis with respect to the second piston unit 15 in the second cylinder 12, the torpedo pistons 14a, 15a, and the pressurizing pistons 14d, 15d.

In more detail, the exhaust unit 31 includes an exhaust passage 31a, an exhaust hole 31b, and an exhaust valve 31c. As illustrated in FIG. 3, the exhaust passages 31a are formed in the rod 16d of the first drive unit 16 and the torpedo piston 14a, and in the rod 17d of the second drive unit 17 and the torpedo piston 15a, respectively. The exhaust passages 31a pass through the inside of the rods 16d, 17d, penetrate the ends on the plus side of the Z-axis of the torpedo pistons 14a, 15a, and extend in the Z-axis direction.

The ends on the minus side of the Z-axis of the exhaust passages 31a are branched to reach circumferential surfaces of the ends on the minus side of the Z-axis of the rods 16d, 17d and reach space surrounded by the torpedo pistons 14a, 15a and the pressurizing pistons 14d, 15d. The ends on the plus side of the Z-axis of the exhaust passages 31a reach the end surfaces on the plus side of the Z-axis of the rods 16d, 17d.

For this reason, the ends on the minus side of the Z-axis of the exhaust passages 31a communicate with space surrounded by the first space S1 of the first cylinder 11, the torpedo piston 14a, and the pressurizing piston 15d, or space surrounded by the first space S3 of the second cylinder 12, the torpedo piston 15a, and the pressurizing piston 15d, and the ends on the plus side of the Z-axis of the exhaust passages 31a are arranged in the case 16e of the first drive unit 16.

The exhaust hole 31b is formed in the case 16e of the first drive unit 16. However, when the case 16e of the first drive unit 16 and the case 17e of the second drive unit 17 are composed of different members from each other, the exhaust holes 31b are formed in the cases 16e, 17e, respectively. The exhaust valve 31c is connected to the exhaust hole 31b via an exhaust pipe 35. Examples of the exhaust valve 31c include an electromagnetic valve.

The hopper 32 accommodates a resin raw material M supplied to the first space S1 of the first cylinder 11 and the first space S3 of the second cylinder 12. In the present embodiment, as illustrated in FIG. 1, the hopper 32 includes a first hopper 32a and a second hopper 32b.

The first hopper 32a has a configuration having a sealable inside, and is connected to the supply hole 11d of the first cylinder 11 via a first supply pipe 36. The second hopper 32b has a configuration having a sealable inside, and is connected to the supply hole 12d of the second cylinder 12 via a second supply pipe 37.

The first hopper 32a and the second hopper 32b have a configuration in which the resin raw material M can be maintained in a dry state by a residual heat heater. As such, it is possible to restrict a modeling defect due to water vapor that is generated when the resin raw material M is plasticized.

Further, inner diameters of the supply hole 11d of the first cylinder 11, the supply hole 12d of the second cylinder 12, the first supply pipe 36, and the second supply pipe 37 are equal to or shorter than twice the length of a diagonal line of a resin pellet which is the resin raw material M.

As such, it is possible to restrict the resin raw material M from causing a bridge due to its lining up in the supply hole 11d of the first cylinder 11, the supply hole 12d of the second cylinder 12, the first supply pipe 36, and the second supply pipe 37, and the inside of each of those from clogging.

The pressurizing unit 33 is an air pump that pressurizes the inside of the hopper 32 with gas. In the present embodiment, as illustrated in FIG. 1, the pressurizing unit 33 is connected to the first hopper 32a via a first connecting pipe 38 and is connected to the second hopper 32b via a second connecting pipe 39.

The pressurizing unit 33 pressurizes the inside of the hopper 32 at, for example, all times. For this reason, when the exhaust valve 31c and the check valve 13b of the end plate 13 are closed, sealed spaces formed by the first cylinder 11, the second cylinder 12, space surrounded by the torpedo pistons 14a, 15a and the pressurizing pistons 14d, 15d, and the case 16e of the first drive unit 16 are maintained at a high pressure with respect to the outside of the case 16e.

The second control unit 34 controls the exhaust valve 31c such that the exhaust valve 31c discharges gas from the first space S1 of the first cylinder 11 or from the first space S3 of the second cylinder 12 at a desired timing described below.

As illustrated in FIG. 1, the table 4 is arranged on the minus side of the Z-axis with respect to the injection molding machine 2 and is a molding table used for laminating the molten resin injected from the injection port 18a of the injection molding machine 2 to form a workpiece. The molten resin injected (discharged) from the injection port 18a is referred to as a resin bead (the molten resin discharged from the injection port 18a and solidified like a thread). Here, the table 4 is configured to be, for example, heatable. The moving device 5 causes the injection molding machine 2 and the table 4 to move to mold a workpiece. As illustrated in FIGS. 1 and 2, the moving device 5 includes, for example, a gantry device 51, an elevating device 52, and a third control unit 53.

Figure 37:
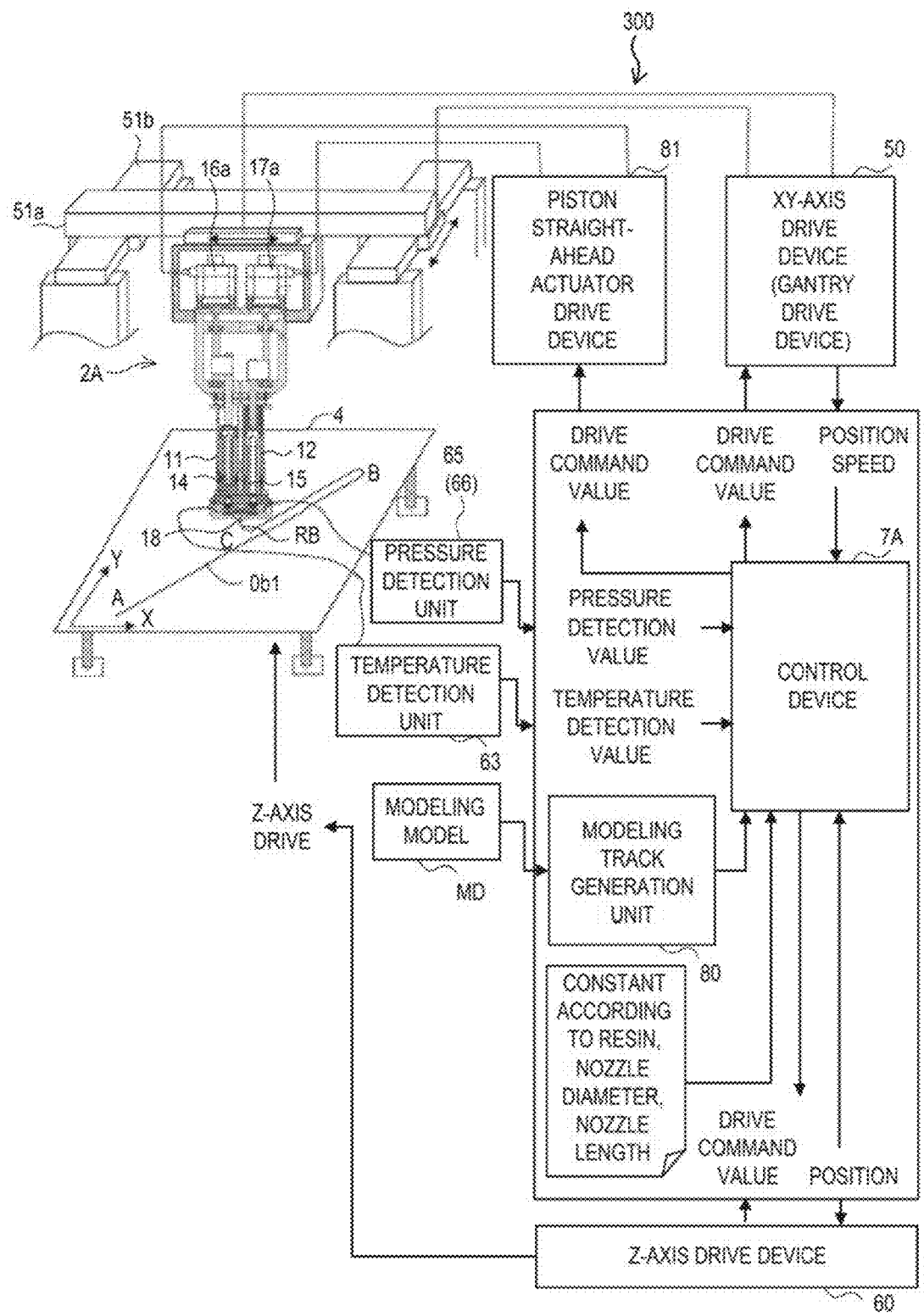
FIG. 37 is a system configuration diagram of the 3D printer of a fourth embodiment.

The gantry device 51 causes the injection molding machine 2 to move in the X-axis direction and the Y-axis direction. As the gantry device 51, a general gantry device can be used, and, for example, as illustrated in FIG. 37, a slide rail 51a extending in the X-axis direction and a slide rail 51b extending in the Y-axis direction can be combined and composed. As the gantry device 51, a gantry device that moves the injection molding machine 2 in the X-axis direction, the Y-axis direction, and the Z-axis direction may be used.

The elevating device 52 causes the table 4 to move up and down in the Z-axis direction. As the elevating device 52, for example, a general elevating device can be used and composed of a ball screw. The third control unit 53 controls the gantry device 51 and the elevating device 52 such that the molten resin injected from the injection molding machine 2 is laminated to form a desired workpiece.

As illustrated in FIGS. 1 to 3, the heating device 6 includes a first heating unit 61, a second heating unit 62, a temperature detection unit 63, and a fourth control unit 64. The first heating unit 61 keeps the plasticized molten resin warm.

The first heating unit 61 can be composed of, for example, a seat heater that surrounds portions on the minus side of the Z-axis of the first cylinder 11 and the second cylinder 12. However, the first heating unit 61 may be any heating unit as long as it can keep the plasticized molten resin warm, and a configuration and an arrangement thereof are not limited.

The second heating unit 62 heats the molten resin to a desired temperature. As illustrated in FIGS. 3 and 6, the second heating unit 62 includes, for example, seat heaters 62a and a heat transfer member 62b. When viewed from the Z-axis direction, the seat heaters 62a are arranged at substantially equal intervals around the injection port 18a of the injection portion 18. The heat transfer member 62b has a disk shape in which a through hole is formed substantially at the center of the heat transfer member 62b, and is composed of a ceramic plate.

The heat transfer member 62b is arranged between the first plate 18e and the second plate 18f. At this time, the seat heater 62a is arranged between the heat transfer member 62b and the first plate 18e, or between the heat transfer member 62b and the second plate 18f. As such, it is possible to appropriately transfer heat of the seat heater 62a to the first plate 18e or the second plate 18f.

Here, when the first plate 18e and the second plate 18f are composed of the above-described ceramic plates, a heat capacity of the ceramic plate is smaller than that of metal. Thus, it is possible to efficiently transfer heat of the second heating unit 62 to the molten resin. Further, when the second heating unit 62 is damaged, it is possible to easily replace it by loosening the retaining nut 18d.

The temperature detection unit 63 detects the temperature of the molten resin. The temperature detection unit 63 is provided in, for example, the injection portion 18. At this time, the temperature detection unit 63 is provided on the first plate 18e or the second plate 18f which is composed of the ceramic plate. As such, it is possible to highly accurately detect the temperature of the molten resin.

Based on the detection result of the temperature detection unit 63, the fourth control unit 64 controls the first heating unit 61 and the second heating unit 62 such that the temperature of the molten resin is within a range set in advance. When the first cylinder 11 and the second cylinder 12 are configured to keep the molten resin R warm, the heating device 6 may be omitted.

As illustrated in FIG. 2, the control device 7 includes the first control unit 19, the second control unit 34, the third control unit 53, and the fourth control unit 64, and executes control of them to form a workpiece.

Next, in the injection molding apparatus 1 according to the present disclosure, description will be made on an appropriate condition for restricting inflow of gas into the second space S2 of the first cylinder 11 or a second space S4 of the second cylinder 12 when the resin raw material M supplied to the first space S1 of the first cylinder 11 or the first space S3 of the second cylinder 12 is plasticized and the molten resin is caused to flow into the second space S2 of the first cylinder 11 or the second space S4 of the second cylinder 12 on the minus side of the Z-axis with respect to the second piston unit 15.

First, a size of an area surrounded by an outer circumferential edge in an XY cross-section of the pressurizing piston 14d of the first piston unit 14 is equal to or greater than a size of an area surrounded by an outer circumferential edge in an XY cross-section of the rod 16d. Similarly, a size of an area surrounded by an outer circumferential edge in an XY cross-section of the pressurizing piston 15d of the second piston unit 15 is equal to or greater than a size of an area surrounded by an outer circumferential edge in the XY cross-section of the rod 17d.

Then, a volume of the second space S2 in a state where the torpedo piston 14a is arranged on the most plus side of the Z-axis and the pressurizing piston 14d is arranged in the second space S2 of the first cylinder 11 so as to inject the molten resin is equal to or smaller than a volume of the first space S1 in a state where the torpedo piston 14a is arranged on the most minus side of the Z-axis and the rod 16d is arranged in the first space S1 of the first cylinder 11 so as to plasticize the resin raw material M.

Similarly, a volume of the second space S4 in a state where the torpedo piston 15a is arranged on the most plus side of the Z-axis and the pressurizing piston 15d is arranged in the second space S4 of the second cylinder 12 so as to inject the molten resin is equal to or smaller than a volume of the first space S3 in a state where the torpedo piston 15a is arranged on the most minus side of the Z-axis and the rod 17d is arranged in the first space S3 of the second cylinder 12 so as to plasticize the resin raw material M.

The following equations 1 to 3 is further satisfied:

$$(\pi \times Dc^2 - Dr^2) \times Lr \times \gamma)/4 \geq (\pi \times (Dc^2 - Dp^2) \times Lr)/4 \quad \text{(Equation 1)}$$

$$\pi \times Lr \times \{(Dc^2 - Dr) \times \gamma - (Dc^2 - Dp^2)\}/4 \leq \pi \times Dp^2 \times Lp/4 \quad \text{(Equation 2)}$$

$$(Dc^2 - Dp^2)/(Dc^2 - Dr^2) \leq \gamma \leq Dp^2/(Dc^2 - Dr^2) \times Lp/Lr + (Dc^2 - Dp^2)/(Dc^2 - Dr^2) \quad \text{(Equation 3)}$$

Here, Dc is an inner diameter of the first cylinder 11 and the second cylinder 12, Dp is an outer diameter of the pressurizing pistons 14d, 15d, Dr is an outer diameter of the rods 16d, 17d, Lp is the maximum stroke amount (the maximum movement amount) of the pressurizing pistons 14d, 15d, Lr is the maximum stroke amount (the maximum movement amount) of the torpedo pistons 14a, 15a, and γ is a filling rate of the resin raw material M.

As expressed in the equation 1, a volume of the resin raw material M supplied to the first space S1 of the first cylinder 11 or the first space S3 of the second cylinder 12 is equal to or greater than an increase amount of the volume of the second space S2 of the first cylinder 11 or the second space S4 of the second cylinder 12 when the resin raw material M is plasticized.

Here, the volume of the resin raw material M is substantially equal to a volume of the molten resin. For this reason, it can be said that the volume of the molten resin flowing into the second space S2 of the first cylinder 11 or the second space S4 of the second cylinder 12 is equal to or greater than the increase amount of the volume of the second space S2 of the first cylinder 11 or the second space S4 of the second cylinder 12 when the molten resin flows thereinto.

As expressed in the equation 2, by moving the pressurizing pistons 14d, 15d which are arranged on the most minus side of the Z-axis to the plus side of the Z-axis, with respect to a difference obtained by subtracting the increase amount of the volume of the second space S2 of the first cylinder 11 or the second space S4 of the second cylinder 12 from the volume of the molten resin, the volume of the second space S2 of the first cylinder 11 or the second space S4 of the second cylinder 12 is equal to or greater than an amount that can be increased.

As such, according to the equation 1, by moving the pressurizing pistons 14d, 15d to the plus side of the Z-axis, it is possible to absorb the amount of the molten resin obtained by subtracting the increase amount of the volume of the second space S2 of the first cylinder 11 or the second space S4 of the second cylinder 12 from the volume of the molten resin.

In the equation 3, solutions of the equation 1 and the equation 2 with respect to the filling rate of the resin raw material M are expressed. As such, even when the type and the like of the resin raw material M are different, by satisfying the equation 3, it is possible to restrict inflow of gas into the second space S2 of the first cylinder 11 or the second space S4 of the second cylinder 12.

Next, a flow of molding a workpiece using the injection molding apparatus 1 according to the present embodiment will be described. FIGS. 9 to 13 are diagrams illustrating an operation of the injection molding apparatus 1 according to the present embodiment. In FIGS. 9 to 13, the upper rows illustrate the operation of the injection molding machine 2 and the lower rows illustrate timings of the plasticization of the resin raw material M, the injection of the molten resin R, and the like in the first cylinder 11 and the second cylinder 12.

Figure 9:
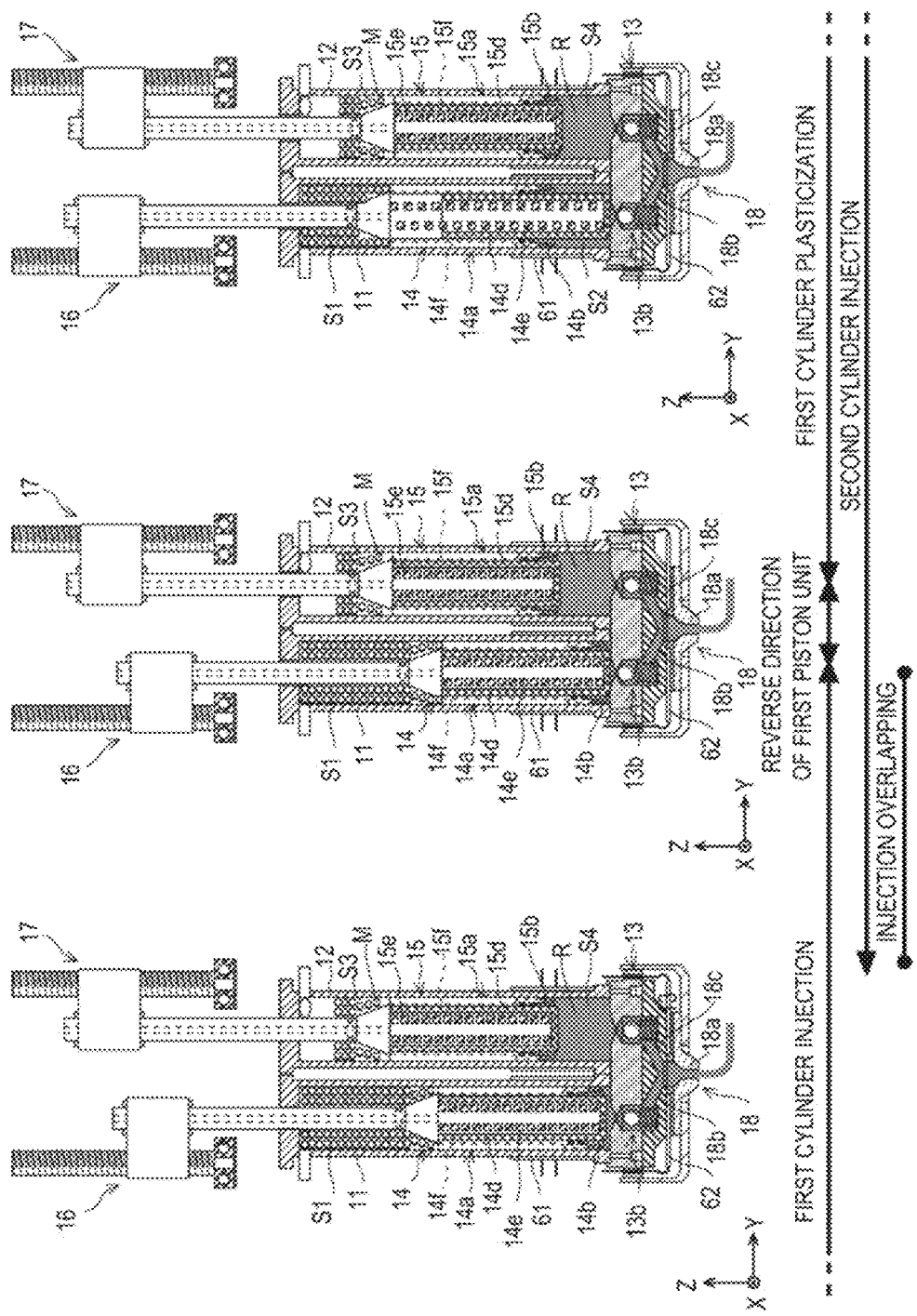
FIG. 9 is a diagram illustrating an operation of the injection molding apparatus according to the first embodiment.

Here, on the left side of FIG. 9, in a state where the supply of the resin raw material M from the first hopper 32a of the supply device 3 to the first space S1 of the first cylinder 11 is completed, the first piston unit 14 moves to the minus side of the Z-axis and the molten resin R that has flowed into the second space S2 of the first cylinder 11 is injected.

On the other hand, the second piston unit 15 moves to the minus side of the Z-axis and the injection of the molten resin R from the second space S4 of the second cylinder 12 is started. At this time, it is assumed that the pressurizing piston 15d of the second piston unit 15 is arranged on the most plus side of the Z-axis. Further, it is assumed that the exhaust valve 31c of the exhaust unit 31 is closed.

From such a state, the first control unit 19 controls the motor 16a such that the first piston unit 14 continues to move to the minus side of the Z-axis and the molten resin R continues to be injected, and controls the motor 17a such that the second piston unit 15 continues to move to the minus side of the Z-axis and the molten resin R continues to be injected.

Figure 10:
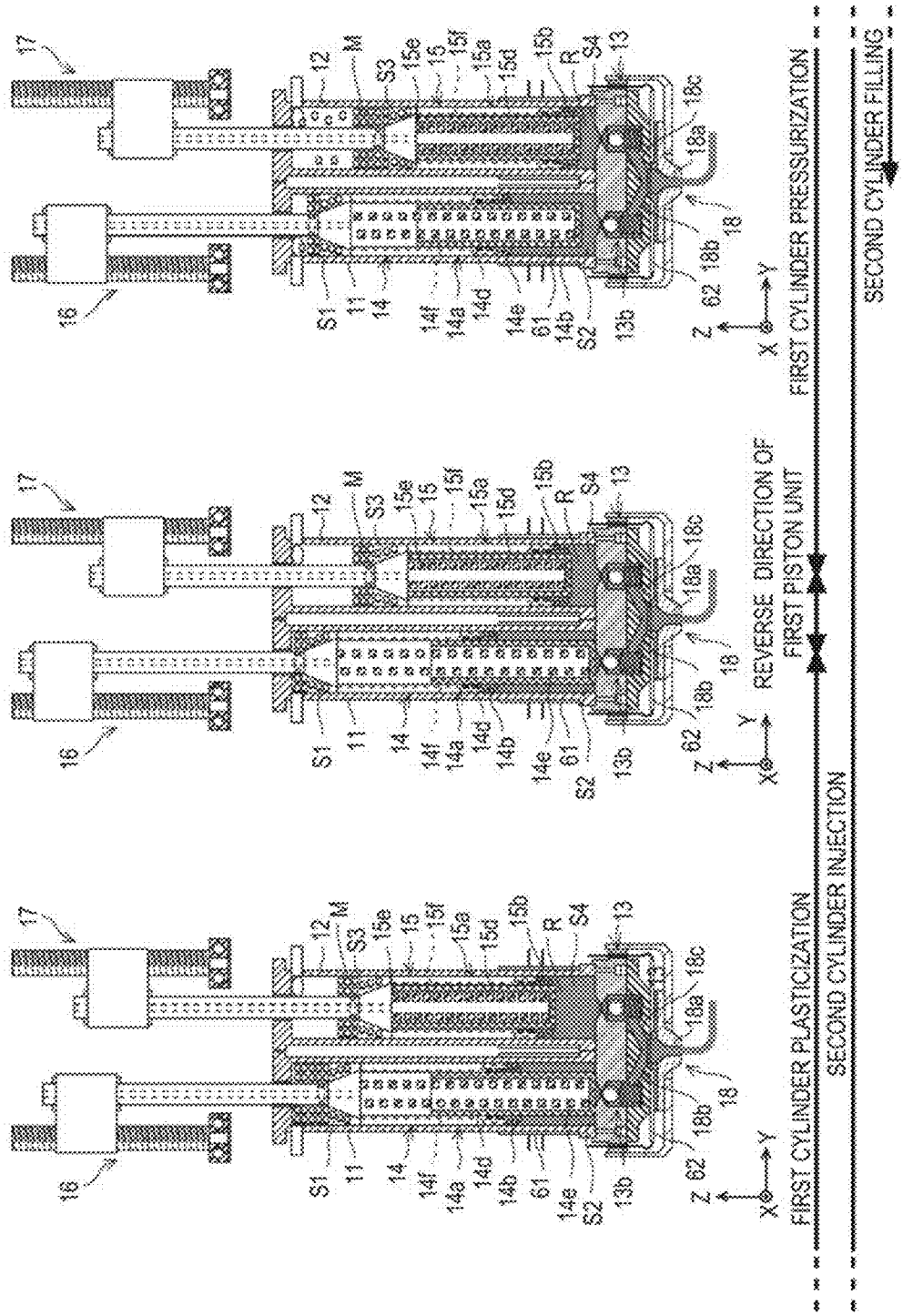
FIG. 10 is another diagram illustrating the operation of the injection molding apparatus according to the first embodiment.

Next, upon confirming, with reference to the detection result of the encoder 16f, that the first piston unit 14 has reached the most minus side of the Z-axis (a bottom dead point), the first control unit 19 controls the motor 16a such that the first piston unit 14 starts to move to the plus side of the Z-axis, as illustrated at the center of FIG. 9→on the right side of FIG. 9→on the left side of FIG. 10.

As such, during a period from the start of the injection of the molten resin R from the second cylinder 12 to the stop of the injection of the molten resin R from the first cylinder 11, the molten resin R is injected from the first cylinder 11 and the second cylinder 12.

For that reason, a period in which the molten resin R is injected from the second cylinder 12 can overlap with a period in which the molten resin R is injected from the first cylinder 11 by a first period set in advance. Therefore, it is possible to continuously inject the molten resin R from the first cylinder 11 and the second cylinder 12.

Here, the first period set in advance can be appropriately set according to movement speeds of the piston units 14, 15, respectively. Then, when the first control unit 19 controls the motors 16a, 17a and adjusts the movement speeds of the piston units 14, 15, respectively, such that an injection amount of the molten resin R injected from the injection portion 18 becomes a target injection amount, it is possible to highly accurately mold a desired workpiece.

When the movement of the first piston unit 14 to the plus side of the Z-axis is started, the resin raw material M is compressed in the first piston unit 14, the closed portion 11a of the first cylinder 11, and the side wall portion 11b of the first cylinder 11, is plasticized while passing through the groove portion 14f of the torpedo piston 14a of the first piston unit 14 to become the molten resin R, and flows into the second space S2 of the first cylinder 11.

At this time, the supply hole 11d is formed in the side wall portion 11b of the first cylinder 11, and thus the resin raw material M is unlikely to leak from the supply hole 11d.

Moreover, a force on the plus side of the Z-axis, which acts when the resin raw material M is plasticized in the first piston unit 14, can be received by the closed portion 11a of the first cylinder 11.

Further, when the surface on the plus side of the Z-axis of the torpedo piston 14a of the first piston unit 14 is formed on an inclined surface that inclines toward the minus side of the Z-axis as it goes toward the peripheral edge portion from the center of the torpedo piston 14a, it is possible to suitably guide the resin raw material M to the groove portion 14f of the torpedo piston 14a of the first piston unit 14 when the first piston unit 14 moves to the plus side of the Z-axis.

Then, when the first piston unit 14 moves to the plus side of the Z-axis, the check ring 14b of the first piston unit 14 is pushed to the minus side of the Z-axis, and thus it is possible to cause the molten resin R to suitably flow into the second space S2 of the first cylinder 11 from the through hole of the check ring 14b through a gap between the torpedo piston 14a and the check ring 14b.

In this manner, when the first piston unit 14 moves to the plus side of the Z-axis, the pressurizing piston 14d protrudes to the minus side of the Z-axis with respect to the torpedo piston 14a due to the biasing force of the biasing tool 14e such that the state where the end on the minus side of the Z-axis of the pressurizing piston 14d is in contact with the end plate 13 is maintained.

Then, in the present embodiment, the size of the area surrounded by the outer circumferential edge in the XY cross-section of the pressurizing piston 14d of the first piston unit 14 is equal to or greater than the size of the area surrounded by the outer circumferential edge in the XY cross-section of the rod 16d, and the volume of the second space S2 in the state where the torpedo piston 14a is arranged on the most plus side of the Z-axis and the pressurizing piston 14d is arranged in the second space S2 of the first cylinder 11 so as to inject the molten resin R is equal to or smaller than the volume of the first space S1 in the state where the torpedo piston 14a is arranged on the most minus side of the Z-axis and the rod 16d is arranged in the first space S1 of the first cylinder 11 so as to plasticize the resin raw material M.

For this reason, the pressurizing piston 14d is biased by the biasing tool 14e such that the increase amount of the volume of the second space S2 of the first cylinder 11 when the torpedo piston 14a moves to the plus side of the Z-axis is equal to or smaller than a decrease amount of the volume of the first space S1 of the first cylinder 11. Therefore, it is possible to restrict inflow of gas into the second space S2 of the first cylinder 11 when the molten resin R flows thereinto.

On the other hand, the first control unit 19 controls the motor 17a with reference to the detection result of the encoder 17f such that the second piston unit 15 continues to move to the minus side of the Z-axis. As such, the molten resin R is injected through the through hole 13e on the plus side of the Y-axis and the second branch path 18c and the injection port 18a of the injection portion 18 while pushing the check valve 13b on the plus side of the Y-axis of the end plate 13 to the minus side of the Z-axis. At this time, the check valve 13b on the plus side of the Y-axis blocks the molten resin R from flowing to the plus side of the Z-axis due to the pressure of the molten resin R injected from the second cylinder 12.

Then, when the second piston unit 15 moves to the minus side of the Z-axis, the check ring 15b of the second piston unit 15 is pushed to the plus side of the Z-axis, and the groove portion 15f of the torpedo piston 15a is closed by the check ring 15b. Therefore, it is possible to restrict a reverse flow of the molten resin R into the first space S3 of the second cylinder 12 through the groove portion 15f of the torpedo piston 15a.

Next, upon confirming, with reference to the encoder 16f, that the first piston unit 14 has reached the most plus side of the Z-axis, the first control unit 19 controls the motor 16a such that the first piston unit 14 starts to move to the minus side of the Z-axis, as illustrated at the center of FIG. 10. On the other hand, the first control unit 19 controls the motor 17a with reference to the encoder 17f such that the second piston unit 15 continues to move to the minus side of the Z-axis.

At this time, the pressurizing piston 14d of the first piston unit 14 is in a state of protruding from the torpedo piston 14a to the most minus side of the Z-axis, and as the first piston unit 14 moves to the minus side of the Z-axis, the pressure of the molten resin R in the second space S2 of the first cylinder 11 rises.

Figure 11:
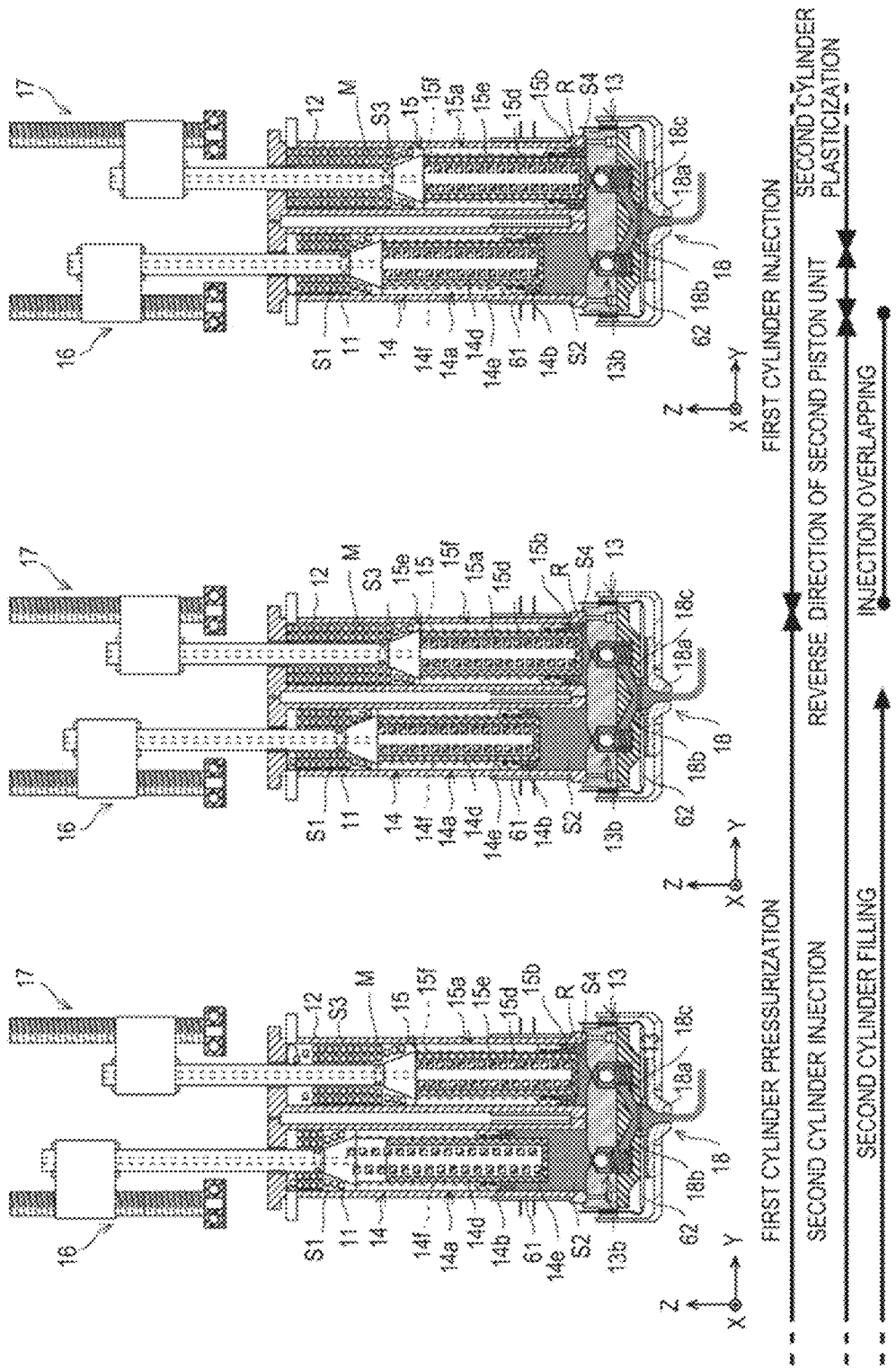
FIG. 11 is still another diagram illustrating the operation of the injection molding apparatus according to the first embodiment.

Then, as the molten resin R in the second space S2 of the first cylinder 11 invades into the invading portion 14j of the pressurizing piston 14d, the force due to the pressure of the molten resin R exceeds the biasing force of the biasing tool 14e and, as illustrated on the right side of FIG. 10→on the left side of FIG. 11→at the center of FIG. 11, the pressurizing piston 14d is pushed to the minus side of the Z-axis. At this time, the gas in the space surrounded by the torpedo piston 14a and the pressurizing piston 14d is exhausted from the exhaust passage 31a into the case 16e by an amount that causes the volume of the space to be reduced.

On the other hand, when the first control unit 19 confirms, with reference to the encoder 17f, that the second piston unit 15 has reached a position in the Z-axis direction set in advance, the second control unit 34 controls the exhaust valve 31e of the exhaust unit 31 such that the exhaust valve 31c opens.

As such, the gas in the first space S3 of the second cylinder 12 invades into the case 16e through the exhaust passage 31a of the rod 17d and is discharged through the exhaust hole 31b and the exhaust valve 31c. As a result, a flow of gas flowing from the second hopper 32b into the first space S3 of the second cylinder 12 is generated and, as illustrated on the right side of FIG. 10→on the left side of FIG. 11→at the center of FIG. 11, the resin raw material M is pushed from the second hopper 32b by the gas and supplied to the first space S3 of the second cylinder 12 through the supply hole 12d of the second cylinder 12.

At this time, since the supply hole 12d is formed in the side wall portion 12b of the second cylinder 12, the resin raw material M falls to the minus side of the Z-axis while swirling with the gas. For this reason, it is possible to supply the resin raw material M to the first space S3 of the second cylinder 12 in a substantially uniform manner.

Next, when the pressurizing piston 14d reaches the most plus side of the Z-axis (for example, the end on the plus side of the Z-axis of the pressurizing piston 14d comes into contact with the end on the plus side of the Z-axis of the torpedo piston 14a) and the pressure that pushes the molten resin R to the minus side of the Z-axis at the end on the minus side of the Z-axis of the first piston unit 14 reaches a pressure set in advance, the check valve 13b on the minus side of the Y-axis of the end plate 13 is opened.

As such, the molten resin R is injected through the through hole 13c on the minus side of the Y-axis and the first branch path 18b and the injection port 18a of the injection portion 18 while pushing the check valve 13b on the minus side of the Y-axis of the end plate 13 to the minus side of the Z-axis.

At this time, when the first piston unit 14 moves to the minus side of the Z-axis, the check ring 14b of the first piston unit 14 is pushed to the plus side of the Z-axis, and the groove portion 14f of the torpedo piston 14a is closed by the check ring 14b. Therefore, it is possible to restrict a reverse flow of the molten resin R into the first space S1 of the first cylinder 11 through the groove portion 14f of the torpedo piston 14a.

On the other hand, when the first control unit 19 confirms, with reference to the encoder 17f, that the second piston unit 15 has reached a vicinity of the most minus side of the Z-axis, the second control unit 34 executes the control of the exhaust valve 31c of the exhaust unit 31 so as to close the exhaust valve 31c. At this time, the first space S3 of the second cylinder 12 is in a state of being filled with the resin raw material M.

In other words, it is possible to automatically supply the resin raw material M to the first space S3 of the second cylinder 12 only by opening the exhaust valve 31c of the exhaust unit 31. At this time, the resin raw material M is supplied to the first space S3 of the second cylinder 12 between the time when the second piston unit 15 reaches the position in the Z-axis direction set in advance and the time when it reaches the vicinity of the most minus side of the Z-axis. Therefore, it is possible to quantitatively supply the resin raw material M to the second cylinder 12.

Thus, a period in which the resin raw material M is supplied to the first space S3 of the second cylinder 12 can overlap with a period in which the molten resin R is injected from the second cylinder 12 by a second period set in advance.

For that reason, it is possible to efficiently repeat the injection of the molten resin R from the second cylinder 12 and the supply of the resin raw material M to the second cylinder 12. Here, the second period set in advance can be appropriately set according to the movement speed of the second piston unit 15, the timing of opening the exhaust valve 31c of the exhaust unit 31, or the like.

Figure 12:
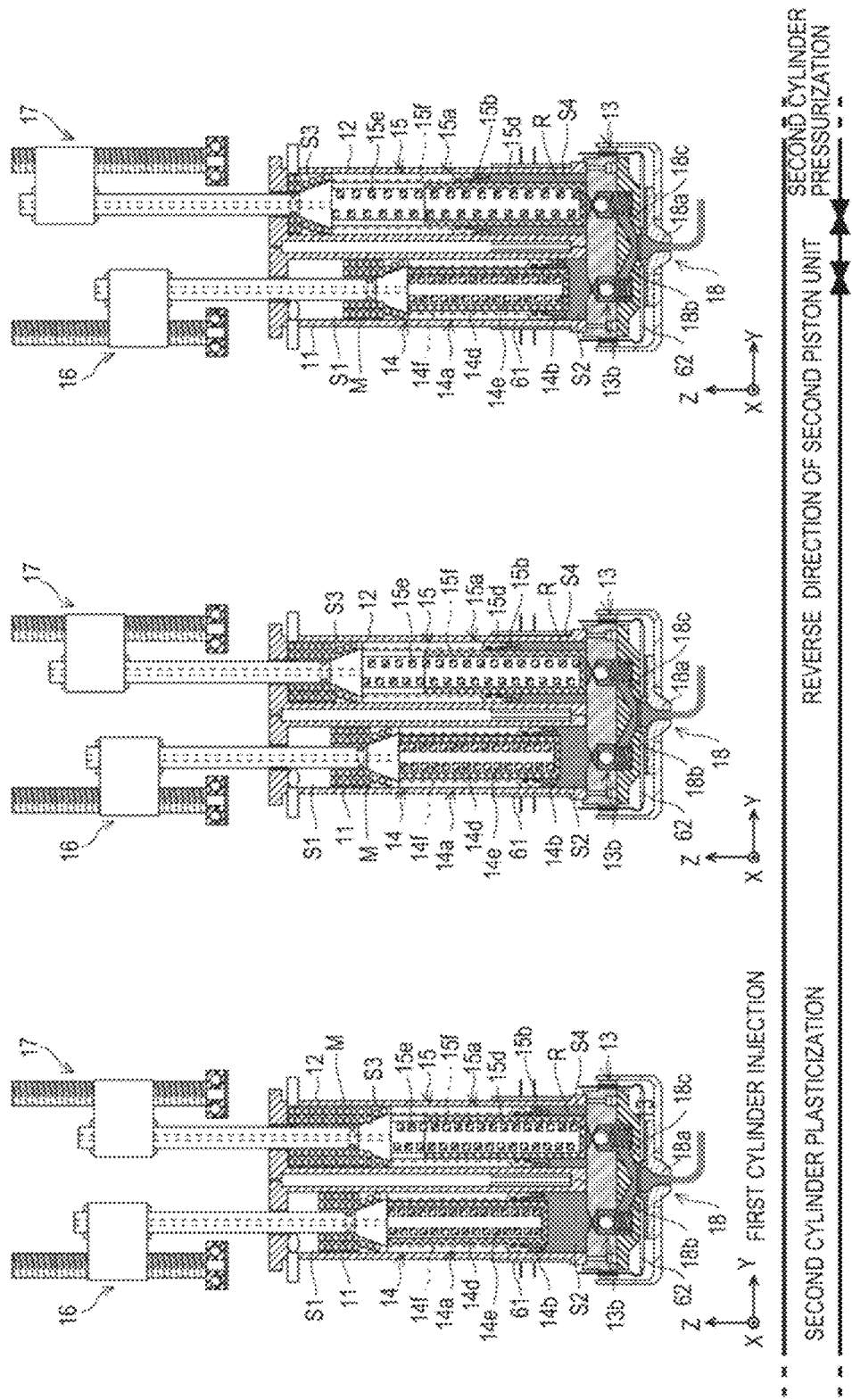
FIG. 12 is yet another diagram illustrating the operation of the injection molding apparatus according to the first embodiment.

Next, upon confirming, with reference to the detection result of the encoder 17f, that the second piston unit 15 has reached the most minus side of the Z-axis (the bottom dead point), the first control unit 19 controls the motor 17a such that the second piston unit 15 starts to move to the plus side of the Z-axis, as illustrated on the right side of FIG. 11→on the left side of FIG. 12→at the center of FIG. 12. At this time, the check valve 13b on the minus side of the Y-axis blocks the molten resin R from flowing to the plus side of the Z-axis due to the pressure of the molten resin R injected from the first cylinder 11.

As such, the resin raw material M is compressed in the second piston unit 15, the closed portion 12a of the second cylinder 12, and the side wall portion 12b of the second cylinder 12, is plasticized while passing through the groove portion 15f of the torpedo piston 15a of the second piston unit 15 to become the molten resin R, and flows into the second space S4 of the second cylinder 12.

At this time, the supply hole 12d is formed in the side wall portion 12b of the second cylinder 12, and thus the resin raw material M is unlikely to leak from the supply hole 12d. Moreover, the force on the plus side of the Z-axis, which acts when the resin raw material M is plasticized in the second piston unit 15, can be received by the closed portion 12a of the second cylinder 12.

Further, when a surface on the plus side of the Z-axis of the torpedo piston 15a of the second piston unit 15 is formed on an inclined surface that inclines toward the minus side of the Z-axis as it goes toward the peripheral edge portion from the center of the torpedo piston 15a, it is possible to suitably guide the resin raw material M to the groove portion 15f of the torpedo piston 15a of the second piston unit 15 when the second piston unit 15 moves to the plus side of the Z-axis.

Then, when the second piston unit 15 moves to the plus side of the Z-axis, the check ring 15b of the second piston unit 15 is pushed to the minus side of the Z-axis, and thus it is possible to cause the molten resin R to suitably flow into the second space S4 of the second cylinder 12 from the through hole of the check ring 15b through a gap between the torpedo piston 15a and the check ring 15b.

In this manner, when the second piston unit 15 moves to the plus side of the Z-axis, the pressurizing piston 15d protrudes to the minus side of the Z-axis with respect to the torpedo piston 15a due to the biasing force of the biasing tool 15e such that the state where the end on the minus side of the Z-axis of the pressurizing piston 15d is in contact with the end plate 13 is maintained.

Then, in the present embodiment, the size of the area surrounded by the outer circumferential edge in the XY cross-section of the pressurizing piston 15d is equal to or greater than the size of the area surrounded by the outer circumferential edge in the XY cross-section of the rod 17d, and the volume of the second space S4 in the state where the torpedo piston 15a is arranged on the most plus side of the Z-axis and the pressurizing piston 15d is arranged in the second space S4 of the second cylinder 12 so as to inject the molten resin R is equal to or smaller than the volume of the first space S3 in the state where the torpedo piston 15a is arranged on the most minus side of the Z-axis and the rod 17d is arranged in the first space S3 of the second cylinder 12 so as to plasticize the resin raw material M.

For this reason, the pressurizing piston 15d is biased by the biasing tool 15e such that the increase amount of the volume of the second space S4 of the second cylinder 12 when the torpedo piston 15a moves to the plus side of the Z-axis is equal to or smaller than a decrease amount of the volume of the first space S3 of the second cylinder 12. Therefore, it is possible to restrict inflow of gas when the molten resin R flows into the second space S4 of the second cylinder 12.

On the other hand, the first control unit 19 controls the motor 16a with reference to the detection result of the encoder 16f such that the first piston unit 14 continues to move to the minus side of the Z-axis. As such, during a period from the start of the injection of the molten resin R from the first cylinder 11 to the stop of the injection of the molten resin R from the second cylinder 12, the molten resin R is injected from the first cylinder 11 and the second cylinder 12.

For that reason, the period in which the molten resin R is injected from the first cylinder 11 can overlap with the period in which the molten resin R is injected from the second cylinder 12 by the first period set in advance. Therefore, it is possible to continuously inject the molten resin R from the first cylinder 11 and the second cylinder 12.

Then, when the first control unit 19 controls the motors 16a, 17a and adjusts the movement speeds of the piston units 14, 15, respectively, such that the injection amount of the molten resin R injected from the injection portion 18 becomes the target injection amount, it is possible to highly accurately mold a desired workpiece.

Next, upon confirming, with reference to the encoder 17f, that the second piston unit 15 has reached the most plus side of the Z-axis, the first control unit 19 controls the motor 17a such that the second piston unit 15 starts to move to the minus side of the Z-axis, as illustrated on the right side of FIG. 12. On the other hand, the first control unit 19 controls the motor 16a with reference to the encoder 16f such that the first piston unit 14 continues to move to the minus side of the Z-axis.

At this time, the pressurizing piston 15d of the second piston unit 15 is in a state of protruding from the torpedo piston 15a to the most minus side of the Z-axis, and as the second piston unit 15 moves to the minus side of the Z-axis, the pressure of the molten resin R in the second space S4 of the second cylinder 12 rises.

Figure 13:
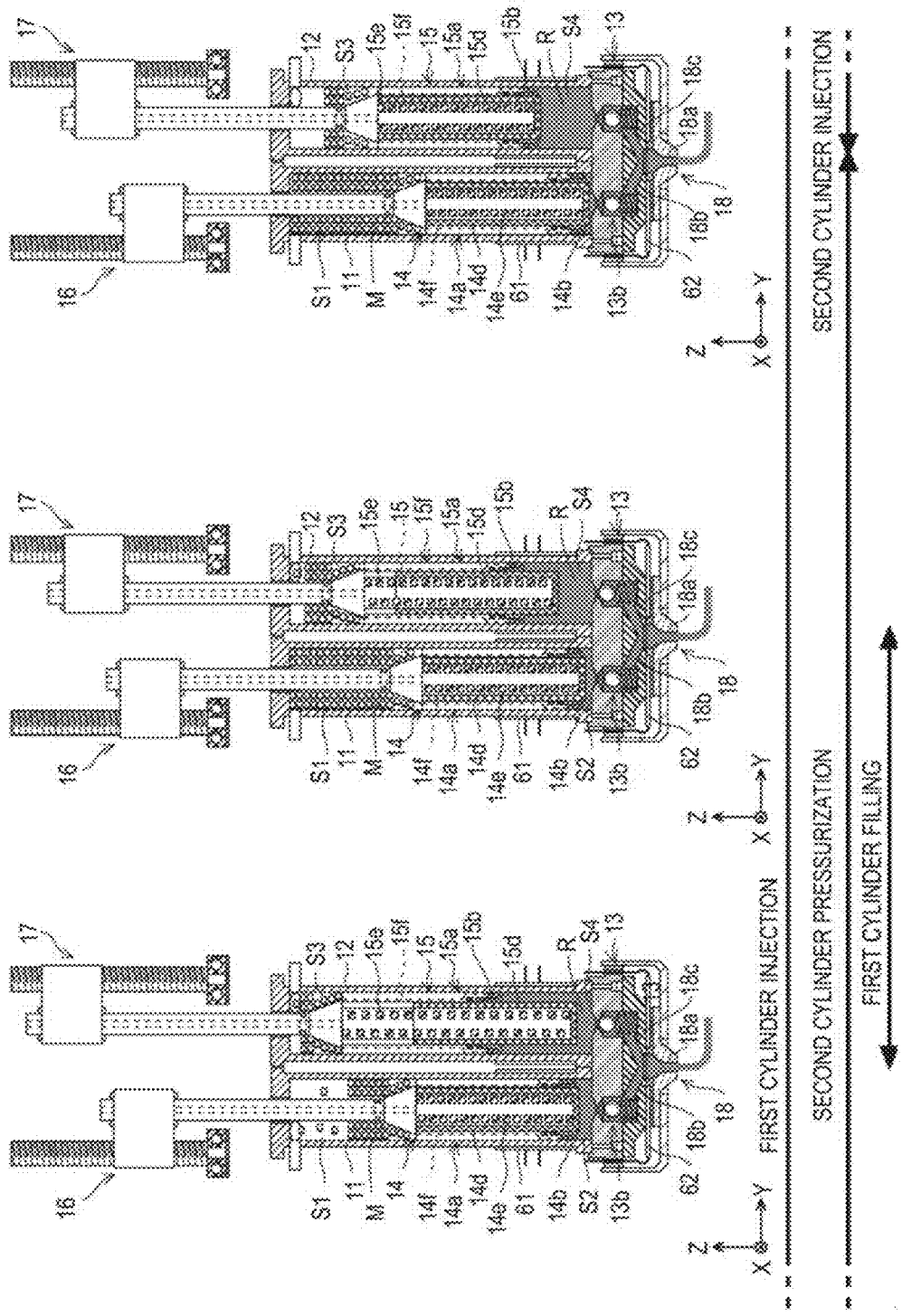
FIG. 13 is yet still another diagram illustrating the operation of the injection molding apparatus according to the first embodiment.

Then, as the molten resin R in the second space S4 of the second cylinder 12 invades into the invading portion 15j of the pressurizing piston 15d, the force due to the pressure of the molten resin R exceeds the biasing force of the biasing tool 15e and, as illustrated on the left side of FIG. 13, the pressurizing piston 15d is pushed to the minus side of the Z-axis. At this time, the gas in space surrounded by the torpedo piston 15a and the pressurizing piston 15d is exhausted from the exhaust passage 31a into the case 16e by an amount that causes the volume of the space to be reduced.

On the other hand, when the first control unit 19 confirms, with reference to the encoder 16f, that the first piston unit 14 has reached the position in the Z-axis direction set in advance, the second control unit 34 controls the exhaust valve 31c of the exhaust unit 31 such that the exhaust valve 31c opens.

As such, the gas in the first space S1 of the first cylinder 11 invades into the case 16e through the exhaust passage 31a of the rod 16d and is discharged through the exhaust hole 31b and the exhaust valve 31c. As a result, a flow of gas flowing from the first hopper 32a into the first space S1 of the first cylinder 11 is generated, and the resin raw material M is pushed from the first hopper 32a by the gas and supplied to the first space S1 of the first cylinder 11 through the supply hole 11d of the first cylinder 11.

At this time, since the supply hole 11d is formed in the side wall portion 11b of the first cylinder 11, the resin raw material M falls to the minus side of the Z-axis while swirling with the gas. For this reason, it is possible to supply the resin raw material M to the first space S1 of the first cylinder 11 in a substantially uniform manner.

Next, as illustrated at the center of FIG. 13, when the first control unit 19 confirms, with reference to the encoder 16f, that the first piston unit 14 has reached the vicinity of the most minus side of the Z-axis, the second control unit 34 controls the exhaust valve 31c of the exhaust unit 31 such that the exhaust valve 31c closes. At this time, the first space S1 of the first cylinder 11 is in a state of being filled with the resin raw material M.

In other words, it is possible to automatically supply the resin raw material M to the first space S1 of the first cylinder 11 only by opening the exhaust valve 31c of the exhaust unit 31. At this time, the resin raw material M is supplied to the first space S1 of the first cylinder 11 between the time when the first piston unit 14 reaches the position in the Z-axis direction set in advance and the time when it reaches the vicinity of the most minus side of the Z-axis. Therefore, it is possible to quantitatively supply the resin raw material M to the first cylinder 11.

Thus, a period in which the resin raw material M is supplied to the first space S1 of the first cylinder 11 can overlap with the period in which the molten resin R is injected from the first cylinder 11 by the second period set in advance.

For that reason, it is possible to efficiently repeat the injection of the molten resin R from the first cylinder 11 and the supply of the resin raw material M to the first cylinder 11. Here, the second period set in advance can be appropriately set according to the movement speed of the first piston unit 14, the timing of opening the exhaust valve 31c of the exhaust unit 31, or the like.

Next, the first control unit 19 controls the motor 16a such that the first piston unit 14 continues to move to the minus side of the Z-axis, and controls the motor 17a such that the second piston unit 15 continues to move to the minus side of the Z-axis.

Next, as illustrated on the right side of FIG. 13, moving to the state of the left side of FIG. 9, when the pressurizing piston 15d reaches the most plus side of the Z-axis (for example, the end on the plus side of the Z-axis of the pressurizing piston 15d comes into contact with the end on the plus side of the Z-axis of the torpedo piston 15a) and the pressure that pushes the molten resin R to the minus side of the Z-axis at the end on the minus side of the Z-axis of the second piston unit 15 reaches a pressure set in advance, the check valve 13b on the plus side of the Y-axis of the end plate 13 is opened.

As such, the molten resin R is injected through the through hole 13c on the plus side of the Y-axis and the second branch path 18c and the injection port 18a of the injection portion 18 while pushing the check valve 13b on the plus side of the Y-axis of the end plate 13 to the minus side of the Z-axis.

In this manner, when the first control unit 19 controls the motors 16a, 17a such that the molten resin R is continuously injected from the first cylinder 11 and the second cylinder 12, and the third control unit 53 controls the gantry device 51 and the elevating device 52 such that a desired workpiece is laminated and modeled on the surface on the plus side of the Z-axis of the table 4 by the injected molten resin R, it is possible to mold a workpiece.

At this time, based on the detection result of the temperature detection unit 63, the fourth control unit 64 controls the first heating unit 61 and the second heating unit 62 such that the temperature of the injected molten resin R is within a range set in advance. As such, it is possible to inject the molten resin R in a stable state.

The injection molding apparatus 1, the injection molding machine 2, and the injection molding method of the present embodiment include the pressurizing pistons 14d, 15d slidable in the Z-axis direction, and the biasing tools 14e, 15e that bias the pressurizing pistons 14d, 15d on the minus side of the Z-axis with respect to the torpedo pistons 14a, 15a such that the protrusion amounts of the first and the second cylinders 11, 12 to the second spaces S2, S4 with respect to the torpedo pistons 14a, 15a are changed.

For this reason, it is possible to reduce the volumes of the second spaces S2, S4 when the molten resin R flows into the second spaces S2, S4 of the first and the second cylinders 11, 12, and to restrict inflow of gas into the second spaces S2, S4 when the molten resin R flows thereinto. Therefore, the injection molding apparatus 1, the injection molding machine 2, and the injection molding method of the present embodiment can restrict gas from being mixed with the molten resin R when the molten resin R is injected, and contribute to improvement of the quality of the workpiece.

Specifically, in the injection molding apparatus 1, the injection molding machine 2, and the injection molding method of the present embodiment, the biasing tools 14c, 15e that bias the pressurizing pistons 14d, 15d such that the increase amounts of the volumes of the second spaces S2, S4 of the first and the second cylinders 11, 12 when the torpedo pistons 14a, 15a move to the plus side of the Z-axis are equal to or smaller than the decrease amounts of the volumes of the first spaces S1, S3 of the first and the second cylinders 11, 12. Therefore, it is possible to restrict inflow of gas into the second spaces S2, S4 of the first and the second cylinders 11, 12 when the molten resin R flows thereinto.

Moreover, in the injection molding apparatus 1, the injection molding machine 2, and the injection molding method of the present embodiment, a part of the period in which the molten resin R is injected from the first cylinder 11 overlaps with a part of the period in which the molten resin R is injected from the second cylinder 12. As such, it is possible to continuously inject the molten resin R from the first cylinder 11 and the second cylinder 12.

Further, in the injection molding apparatus 1, the injection molding machine 2, and the injection molding method of the present embodiment, it is possible to automatically supply the resin raw material M to the first and the second cylinders 11, 12 only by opening the exhaust valve 31c of the exhaust unit 31. In other words, the supply device 3 of the present embodiment can function as an automatic supply device for the resin raw material M. For this reason, it is possible to supply the resin raw material M with a simple configuration.

Further, since the resin raw material M is supplied to the first cylinder 11 or the second cylinder 12 from the time when the first piston unit 14 or the second piston unit 15 reaches the position in the Z-axis direction set in advance to the time when it reaches the vicinity of the most minus side of the Z-axis, it is possible to quantitatively supply the resin raw material M to the first and the second cylinders 11, 12. For this reason, it is possible to omit a measuring device for the resin raw material M.

The position in the Z-axis direction set in advance is set such that the first space S1 of the first cylinder 11 or the first space S3 of the second cylinder 12 is filled with the resin raw material M by the time when the first piston unit 14 or the second piston unit 15 reaches the vicinity of the most minus side of the Z-axis.

Here, since the end on the minus side of the Z-axis of the first cylinder 11 is open, it is possible to insert the first piston unit 14 or the rod 16d of the first drive unit 16 from the opening on the minus side of the Z-axis of the first cylinder 11. Similarly, since the end on the minus side of the Z-axis of the second cylinder 12 is open, it is possible to insert the second piston unit 15 or the rod 17d of the second drive unit 17 from the opening on the minus side of the Z-axis of the second cylinder 12. For this reason, it is possible to omit a plunger as provided in an injection molding apparatus of US 2018-0056602 A.

As illustrated in FIG. 3, the injection molding machine 2 includes a cooling unit 8 between the case 16e of the first drive unit 16 and the first and the second cylinders 11, 12. The cooling unit 8 may have, for example, a ring shape as a basic form, and the through hole 8a through which the rod 16d or the rod 17d passes is formed so as to penetrate the cooling unit 8 in the Z-axis direction. Thus, a cooling passage 8b through which a cooling medium flows is formed in the cooling unit 8 so as to surround the through hole 8a.

With such a configuration, in the case where the workpiece is molded by the injection molding apparatus 1, when the cooling medium flows through the cooling passage 8b of the cooling unit 8, the heat from the first and the second cylinders 11, 12 is unlikely to be transferred to the bearing 16g of the first drive unit 16 or the bearing 17g of the second drive unit 17. For this reason, it is possible to restrict a temperature change of the bearings 16g, 17g and restrict an operation defect of the bearings 16g, 17g. As a result, it is possible to highly accurately mold a workpiece.

Second Embodiment

Next, a configuration of an injection molding machine 2A of a second embodiment will be described.

Figure 14:
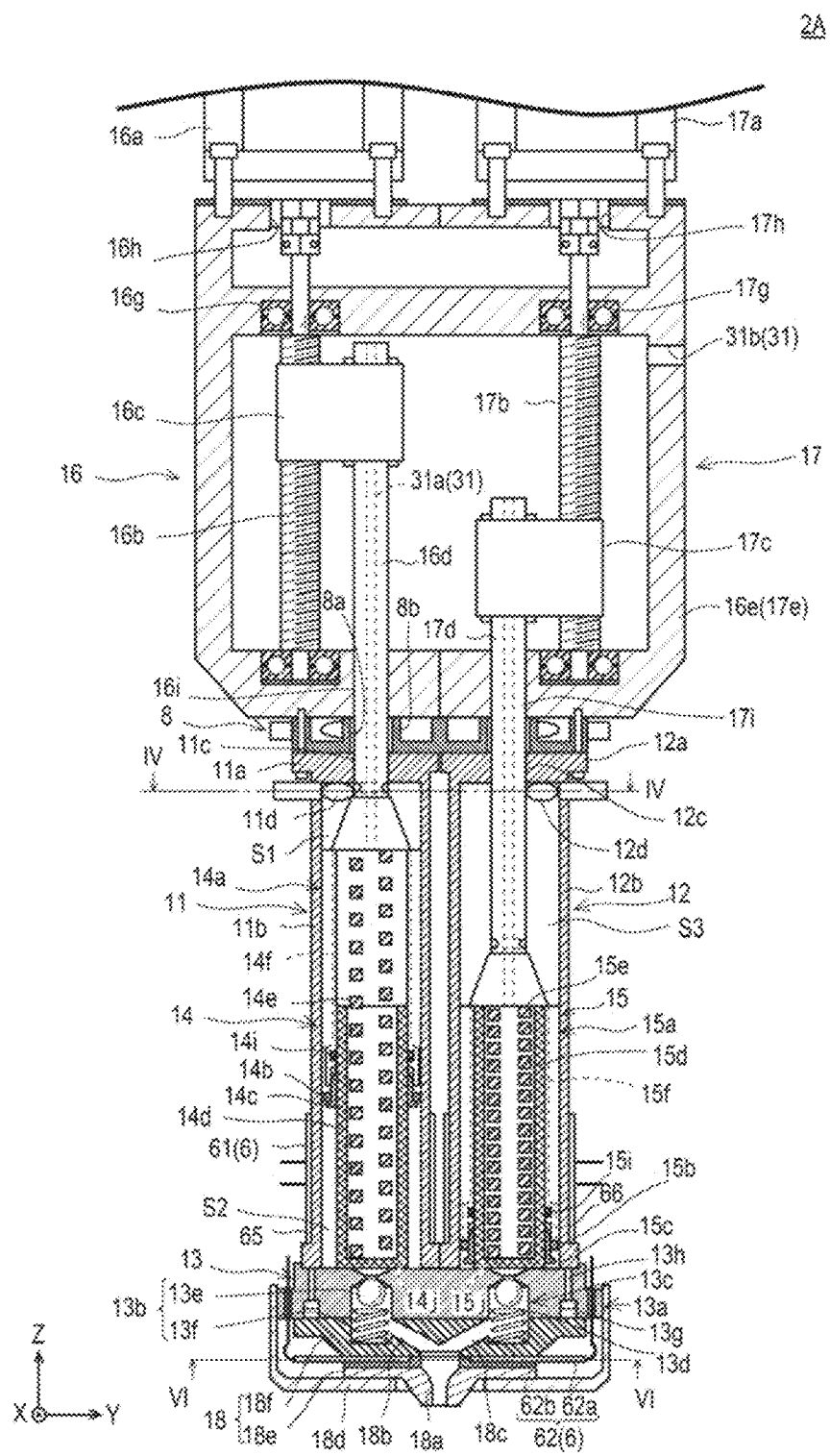
FIG. 14 is a configuration diagram of an injection molding apparatus according to a second embodiment.

FIG. 14 is a configuration diagram of the injection molding machine 2A of the second embodiment.

The configuration of the injection molding machine 2A of the second embodiment is the same as that of the injection molding machine 2 of the first embodiment except for the following points.

As illustrated in FIG. 14, a first pressure detection unit 65 and a second pressure detection unit 66 are added to the injection molding machine 2A of the second embodiment. The first pressure detection unit 65 is a pressure detection sensor that detects a pressure applied to the molten resin accommodated (stored) in the first cylinder 11, and examples thereof include a strain gauge. The strain gauge detects a pressure from the strain on an outer wall of the first cylinder 11 due to the pressure applied to the molten resin accommodated (stored) in the first cylinder 11. The first pressure detection unit 65 may be provided (for example, attached) on, for example, a portion, corresponding to a part in which the molten resin is accommodated, of the outer circumferential surface of the first cylinder 11. The second pressure detection unit 66 is a pressure detection sensor that detects a pressure applied to the molten resin accommodated (stored) in the second cylinder 12, and examples thereof include a strain gauge. The strain gauge detects a pressure from the strain on an outer wall of the second cylinder 12 due to the pressure applied to the molten resin accommodated (stored) in the second cylinder 12. The second pressure detection unit 66 may be provided (for example, attached) on, for example, a portion, corresponding to a part in which the molten resin is accommodated, of the outer circumferential surface of the second cylinder 12.

Further, in the second embodiment, potentiometers are used instead of the encoders 16f, 17f. Hereinafter, they will be referred to as potentiometers 16f, 17f. The potentiometer 16f is a position detection tool of the motor 16a (a servo motor). A position of the first torpedo 14 can be detected by a position detection value of the potentiometer 16f. Similarly, the potentiometer 17f is a position detection tool of the motor 17a (a servo motor). A position of the second torpedo 15 can be detected by a position detection value of the potentiometer 17f. Further, a ceramic heater is used instead of the seat heater 62a. Hereinafter, it is referred to as a ceramic heater 62a.

Further, in the second embodiment, a thermocouple is used as the temperature detection unit 63 (a tool that detects the temperature of the molten resin accommodated in the first and the second cylinders 11, 12).

Next, a control device 7A of the second embodiment will be described.

Figure 15:
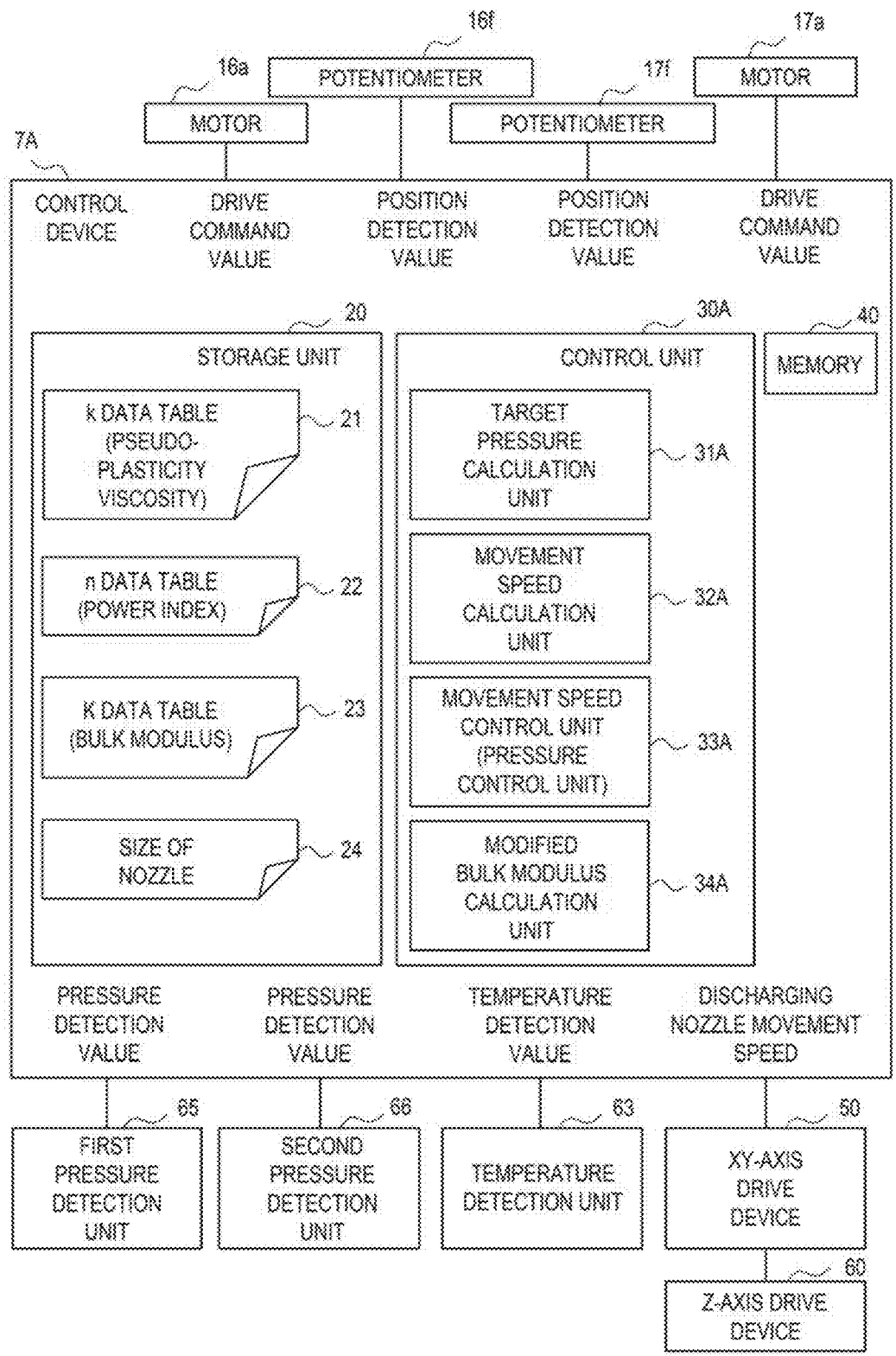
FIG. 15 is a configuration diagram of a control device according to the second embodiment.

FIG. 15 is a configuration diagram of the control device 7A of the second embodiment.

As illustrated in FIG. 15, the control device 7A includes a storage unit 20, a control unit 30A, and a memory 40.

The storage unit 20 is a non-volatile storage unit, such as a hard disk device or a ROM. The storage unit 20 stores a k data table 21, an n data table 22, and a K data table 23. Further, the storage unit 20 stores a discharging nozzle size 24 (for example, a nozzle diameter and a nozzle length). Further, the storage unit 20 stores a predetermined program (not shown) executed by the control unit 30A.

In the k data table 21, a pseudo-plastic viscosity k for each type and temperature of resins is stored in advance. The pseudo-plastic viscosity k will be described below. In the K data table 22, a power index n for each type of resins is stored in advance. The power index n will be described below. In the n data table 23, a bulk modulus K for each type of resins is stored in advance. The bulk modulus K will be described below. The control unit 30A includes a processor (not shown). Examples of the processor include a central processing unit (CPU). The number of processors may be one or more. The processor executes a predetermined program read from the storage unit 20 using the memory 40 (for example, a RAM) to mainly function as a target pressure calculation unit 31A, a movement speed calculation unit 32A, a movement speed control unit 33A, and a modified bulk modulus calculation unit 34A. A part or all of these may be implemented in hardware.

The control device 7A is electrically connected to the motors 16a, 17a, the potentiometers 16f, 17f, the temperature detection unit 63, the first pressure detection unit 65, the second pressure detection unit 66, an XY-axis drive device 50, a Z-axis drive device 60, and the like.

The XY-axis drive device 50 drives the injection molding machine 2A (the discharging nozzle 18a) on the XY-axes by a mechanism (not shown). The Z-axis drive device 60 drives the base plate 4 on the Z-axis by a mechanism (not shown).

The injection molding apparatus 1 having the above configuration functions as a 3D printer (an example of a laminated modeling apparatus of the present disclosure) that models a three-dimensionally modeled object (a laminated modeled body) while forming resin beads on the base plate 4, which can be driven on the Z-axis, using the molten resin discharged (injected) from the injection molding machine 2A (the discharging nozzle 18a), which is driven on the XY-axes, and sequentially laminating them.

Next, an operation of the injection molding machine 2A of the second embodiment will be described. The following processing is implemented when the control unit 30A (a processor) executes a predetermined program read from the storage unit 20 using the memory 40 (for example, a RAM).

The base plate 4 is arranged directly under the resin discharging hole of the discharging nozzle 18a, and the discharging nozzle 18a is moved by the XY-axis drive device 50 along a modeling track which is a first layer of the laminated modeled body. At that time, the movement speed of the discharging nozzle 18a is input to the control device 7A, and a drive command value is output to the motors 16a, 17a according to the flowchart of FIG. 27.

Figure 21:
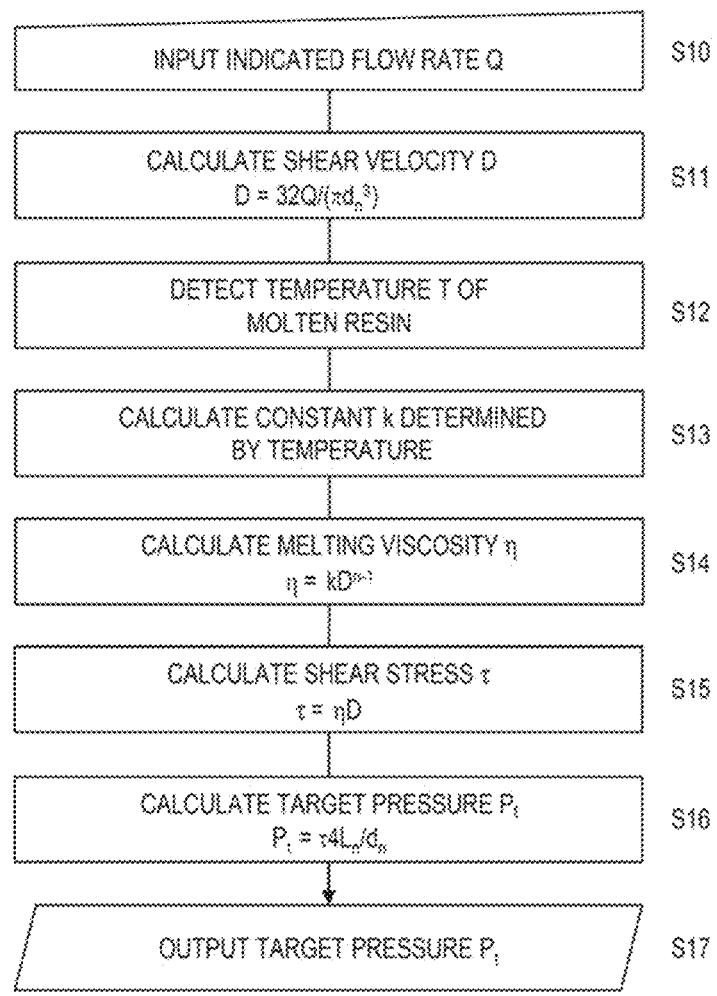
FIG. 21 is a flowchart of an operation example of a target pressure calculation unit.

The control device 7A calculates a target pressure according to a flowchart of FIG. 21 so as to obtain an indicated flow rate from a position (a position detection value), a pressure (a pressure detection value), a temperature (a temperature detection value), and values (a pseudo-plastic viscosity, a power index, a bulk modulus, and a nozzle size) stored in the storage unit (data tables 21 to 23). At that time, in the first cycle, an indicated movement speed is calculated according to a flowchart of FIG. 22, and the drive command value based on the calculated indicated movement speed is output to the motor 16a or 17a. From the second cycle, a modified bulk modulus K' is calculated according to a flowchart of FIG. 25, an indicated movement speed using the calculated modified bulk modulus K' is calculated, and a drive command value based on the calculated indicated movement speed is output to the motor 16a or 17a.

Definition of Terminology

The "indicated flow rate" is a target value (a target flow rate) of a flow rate of the molten resin discharged from the discharging nozzle 18a, and refers to the flow rate of the molten resin discharged from the nozzle 18a per unit time. The indicated flow rate Q is expressed by the following equation 4:

$$Q = \text{A cross-sectional area size of a resin bead (= A size of a cross-sectional area of a nozzle)} \times \text{a nozzle movement speed} \quad \text{(Equation 4)}$$

Figure 16A:
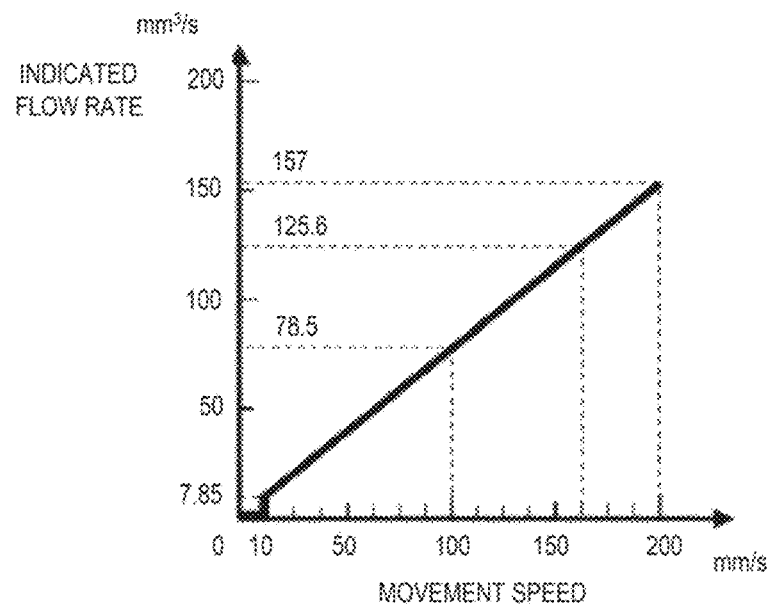
FIG. 16A is a graph displaying a relationship between a nozzle movement speed and an indicated flow rate (when a diameter of the nozzle is 1 mm and a diameter of a cylinder is 20 mm)
Figure 16B:
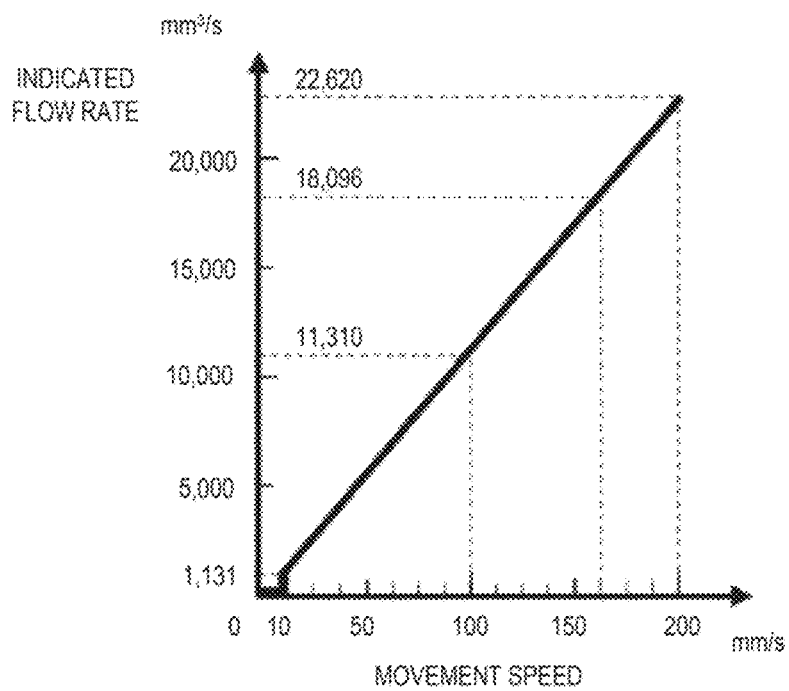
FIG. 16B is another graph displaying the relationship between the nozzle movement speed and the indicated flow rate (when the diameter of the nozzle is 12 mm and the diameter of the cylinder is 100 mm)

FIG. 16A is a graph displaying a relationship between the nozzle movement speed and the indicated flow rate (when a diameter of the nozzle is 1 mm and a diameter of the cylinder is 20 mm). In an area in which the movement speed is close to zero, when the indicated flow rate is lower than a control minimum flow rate (7.85 in FIG. 16A), the indicated flow rate may be set to zero. FIG. 16B is another graph displaying the relationship between the nozzle movement speed and the indicated flow rate (when the diameter of the nozzle is 12 mm and the diameter of the cylinder is 100 mm). In the area in which the movement speed is close to zero, when the indicated flow rate is lower than the control minimum flow rate (1,131 in FIG. 16B), the indicated flow rate may be set to zero.

The "power index" refers to a constant determined for each resin.

FIG. 17 is an example (a representative example) of the power index. As the power index, a well-known index (see, for example, Seiichi Honma, Nikkan Kogyo Shimbun, 2011, 'Plastic Product Design Method', p. 9) may be used.

The "pseudo-plastic viscosity" refers to a constant determined by a temperature for each resin. An example of obtaining the pseudo-plastic viscosity will be described.

Figure 19:
FIG. 19 is a specific example in which a relationship between a pressure and a flow rate is converted into a relationship between a shear velocity and a melting viscosity (resin name: ABS, temperature: 210° C.)
Figure 20:
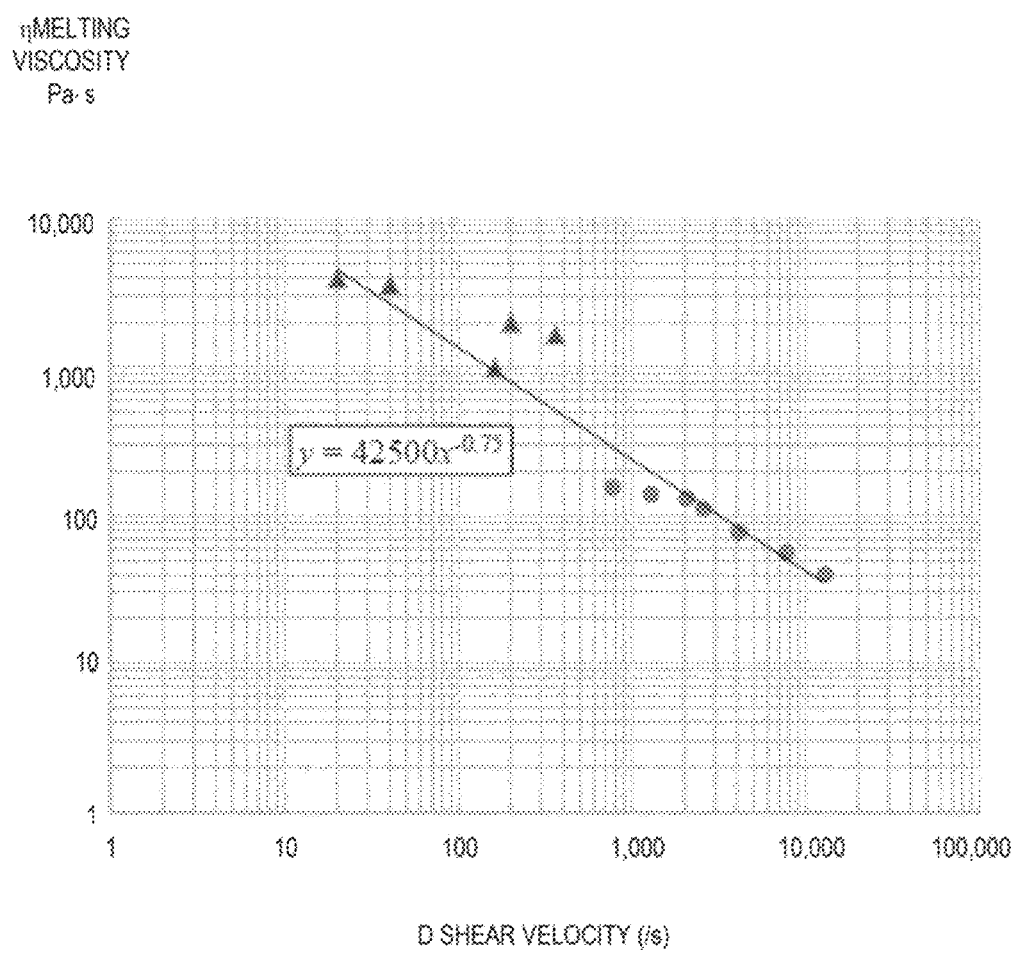
FIG. 20 is a graph in which the "shear velocity" and the "melting viscosity" in FIG. 19 are plotted.

FIG. 19 is a specific example in which a relationship between a pressure and a flow rate is converted into a relationship between a shear velocity and a melting viscosity (resin name: ABS, temperature: 210° C.). FIG. 20 is a graph in which the "shear velocity" and the "melting viscosity" in FIG. 19 are plotted.

From experiment results of FIG. 19, $y=42500x^{-0.75}$ is obtained by converting a relationship between measured pressures and measured flow rates into the relationship between shear velocities and melting viscosities, by plotting the relationship in a log-log graph as illustrated in FIG. 20, and by applying it to a power approximation formula ($y=kx^{(n-1)}$) using the method of least squares. As such, the pseudo-plastic viscosity k=42,500 is obtained. For resins other than the resin having a name of ABS and a temperature of 210° C., the pseudo-plastic viscosity can also be obtained in the same manner.

Figures 18A, 18B:
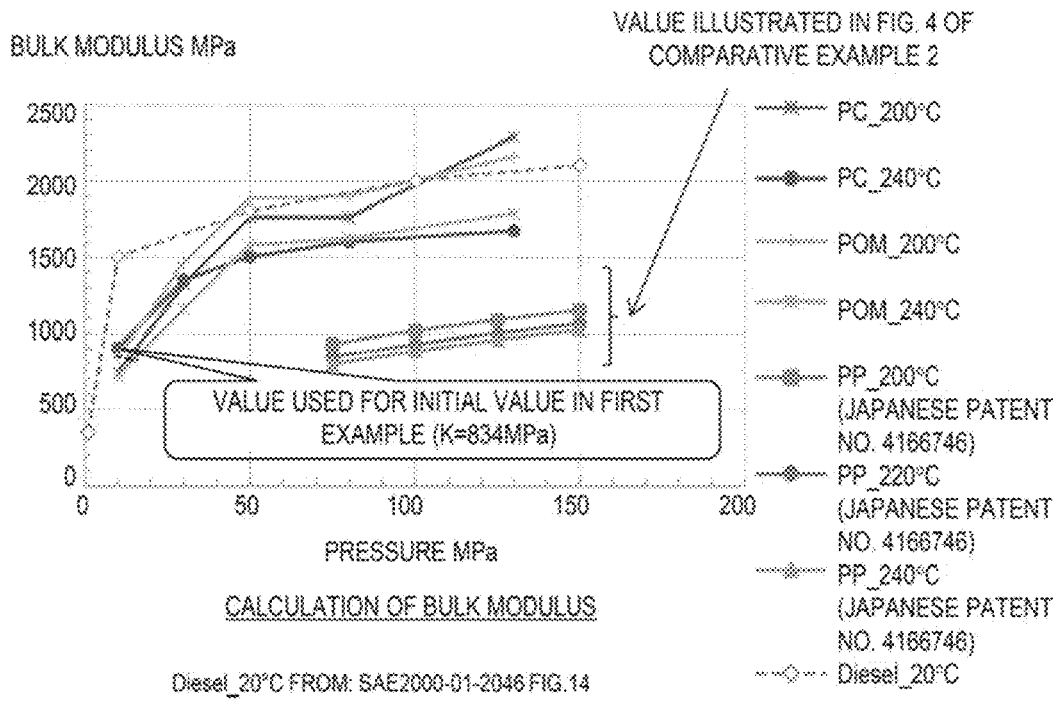

The "bulk modulus" refers to a constant determined by characteristics of the molten resin. FIG. 18A is an example of a numerical table used for calculating the bulk modulus, and FIG. 18B is a graph in which FIG. 18A is plotted.

The "target pressure" refers to a pressure applied to the molten resin accommodated (stored) in the cylinder 11 or 12 to make the flow rate of the molten resin discharged from the discharging nozzle 18a the indicated flow rate.

A "predicted outflow rate" refers to an outflow rate of the molten resin predicted to be discharged from the nozzle 18a per Δt (an interval between control times).

The "indicated movement speed" refers to a speed at which the first piston unit 14 or the second piston unit 15 is caused to move to make the flow rate of the molten resin discharged from the nozzle 18a the indicated flow rate. The first piston unit 14 and the second piston unit 15 are examples of a piston of the present disclosure. Hereinafter, the first piston unit 14 and the second piston unit 15 will also be referred to as a first torpedo 14 and a second torpedo 15, respectively. "Operating the injection molding machine" refers to discharging the resin (the molten resin).

Operation Example of Target Pressure Calculation Unit

Next, an operation example of the target pressure calculation unit 31A will be described.

The target pressure calculation unit 31A calculates the target pressure based on the indicated flow rate, the temperature of the molten resin, the pseudo-plastic viscosity, and the size of the discharging nozzle 18a.

FIG. 21 is a flowchart of an operation example of the target pressure calculation unit 31A.

First, the indicated flow rate Q is input (acquired) (step S10).

Next, a shear velocity D with respect to the indicated flow rate Q is calculated using the following equation 5 (step S11):

$$D = 32Q/(\pi d_n^3) \quad \text{(Equation 5)}$$

Here, $d_n$ is a value equivalent to a diameter (a nozzle diameter) of the minimum cross-sectional area size of the discharging nozzle 18a. π is pi. The nozzle diameter $d_n$ can be obtained from the storage unit 20.

Next, a temperature T of the molten resin immediately before the discharging is detected (step S12). The temperature T may be a temperature (a temperature detection value) directly detected by the temperature detection unit 63 (the thermocouple) or an estimated temperature. Step S12 is an example of a temperature acquisition unit of the present disclosure.

Next, the pseudo-plastic viscosity k determined by the temperature T is calculated (step S13). The pseudo-plastic viscosity k corresponding to a type and a temperature (the temperature T detected in step S12) of the resin (the molten resin) can be obtained from the k data table 21. The type of resin (molten resin) is input by, for example, a user. Step S13 is an example of a pseudo-viscosity acquisition unit of the present disclosure.

Next, a melting viscosity η is calculated using the following equation 6 (step S14):

$$\eta = kD^{n-1} \quad \text{(Equation 6)}$$

Here, n is a power index corresponding to the type of resin (molten resin). The power index n corresponding to the type of resin (molten resin) can be obtained from the n data table 22. The type of resin (molten resin) is input by, for example, a user.

Next, a shear stress τ is calculated using the following equation 7 (step S15):

$$\tau = \eta D \quad \text{(Equation 7)}$$

Next, a target pressure $P_t$ is calculated using the following equation 8 (step S16) and is output (step S17). The target pressure $P_t$ is a relative pressure in which a pressure outside the discharging nozzle 18a is set as the atmospheric pressure (zero).

$$P_t = \tau 4L_n/d_n \quad \text{(Equation 8)}$$

Here, $L_n$ is the length (the nozzle length) of the discharging nozzle 18a (the diameter $d_n$). The nozzle length $L_n$ can be obtained from the storage unit 20.

Operation Example of Movement Speed Calculation Unit (Torpedo Movement Speed Feed Forward Control)

Next, an operation example (torpedo movement speed feed-forward control) of the movement speed calculation unit 32A will be described.

The movement speed calculation unit 32A calculates the "indicated movement speed (a first cycle of the discharging)".

Figure 22:
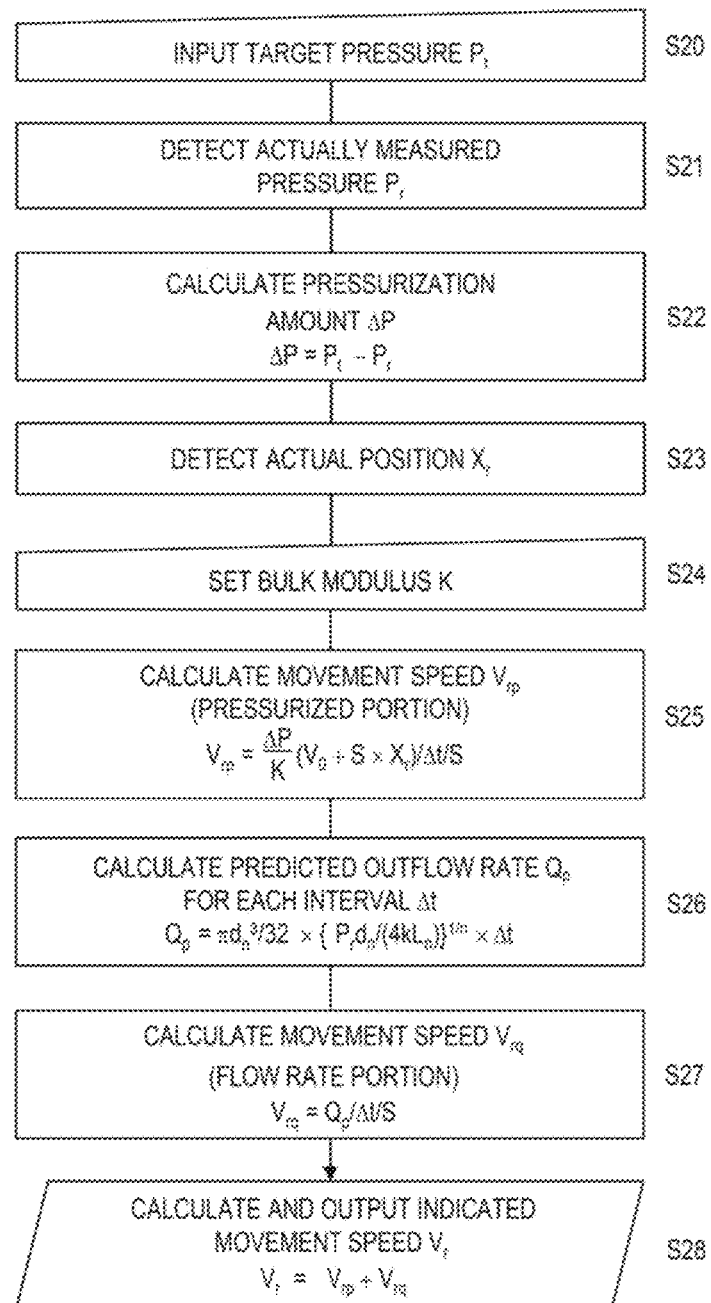
FIG. 22 is a flowchart of an operation example of a movement speed calculation unit (feedforward control of a torpedo movement speed)

FIG. 22 is a flowchart of the operation example (the torpedo movement speed feed-forward control) of the movement speed calculation unit 32A.

First, the target pressure $P_t$ calculated in step S16 and output in step S17 is input (acquired) (step S20).

Next, an actually measured pressure $P_r$ is detected (step S21). The actually measured pressure $P_r$ refers to detection values (pressure detection values) of the first pressure detection unit 65 and the second pressure detection unit 66.

Next, a pressurization amount $\Delta P$ is calculated using the following equation 9 such that the pressure becomes the target pressure $P_t$ and is output (step S22).

$$\Delta P = P_t - P_r \qquad \text{(Equation 9)}$$

Next, an actual position $X_r$ is detected (step S23). The actual position $X_r$ refers to detection values (position detection values) of the potentiometers 16f, 17f.

Next, the bulk modulus K corresponding to the type of resin (molten resin) is set (step S24). For example, in the first cycle of the discharging, the bulk modulus K corresponding to the type of resin (molten resin) is obtained from the K data table 23. The type of resin (molten resin) is input by, for example, a user.

Next, $V_{rp}$, which is a pressurized portion of the movement speed of the first torpedo 14 (or the second torpedo 15) is calculated using the following equation 10 (step S25). In the following equation 10, the outflow (discharging) of the molten resin by pressurization will not be considered.

$$V_{rp} = -\frac{\Delta P}{K}(V_0 + S \times X_r)/\Delta t/S \qquad \text{(Equation 10)}$$

Figure 23:
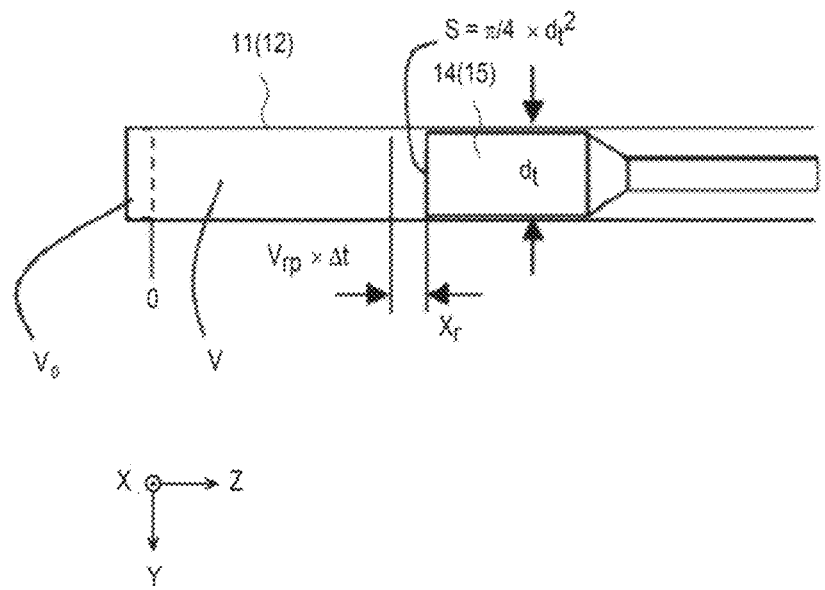
FIG. 23 is a schematic diagram illustrating each element of an equation 10.

Here, $\Delta P = K \times \Delta V/V$, $\Delta V = V_{rp} \times \Delta t \times S$ (S is a size of the cross-sectional area of the first torpedo 14 (or the second torpedo 15), $\Delta t$ is the interval between control times), $V = V_0 + S \times X_r$ (V is a pressurized volume when the first torpedo 14 (or the second torpedo 15) is positioned at $X_r$, and $V_0$ is a dead volume), and $S = \pi/4 \times d_t$ ($d_t$ is the diameter of the first torpedo 14 (or the second torpedo 15)). Each of these elements can be illustrated as in FIG. 23. FIG. 23 is a schematic diagram illustrating each element of the equation 10.

Next, a predicted outflow rate $Q_p$ is calculated using the following equation 11 (step S26):

$$Q_p = \pi d_n^3/32 \times \{P_r d_n/(4kL_n)\}^{1/n} \times \Delta t \qquad \text{(Equation 11)}$$

The equation 11 is derived as follows. First, the equation 5 is transformed into the following equation 12:

$$Q_p = D\pi d_n^3/32 \qquad \text{(Equation 12)}$$

Next, when the equations 6 and 7 are substituted into the equation 8, the following equation 13 is obtained:

$$P_r = kD^n 4L_n/d_n \qquad \text{(Equation 13)}$$

The equation 13 is transformed into the following equation 14:

$$D = (P_r d_n/4kL_n)^{1/n} \qquad \text{(Equation 14)}$$

When the equation 14 is substituted into the equation 12, the following equation 15 is obtained:

$$Q_p = \pi d_n^3/32 \times \{P_r d_n/(4kL_n)\}^{1/n} \qquad \text{(Equation 15)}$$

Figure 24:
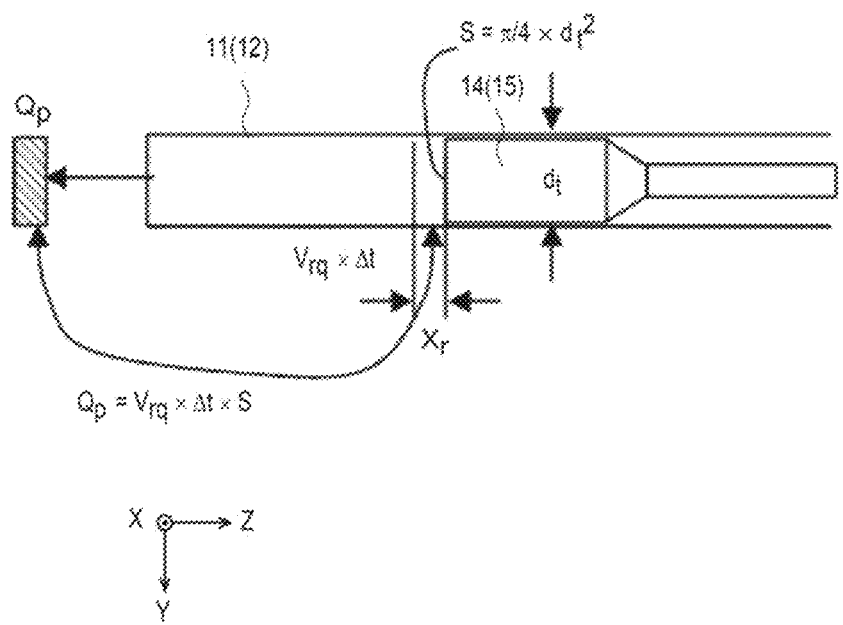
FIG. 24 is a schematic diagram illustrating each element of equations 12 to 15.

When the right side of the equation 15 is multiplied by $\Delta t$, the equation 15 becomes the equation 11. Each element in the equations 12 to 15 can be illustrated as in FIG. 24. FIG. 24 is a schematic diagram illustrating each element in the equations 12 to 15.

Next, $V_{rq}$, which is a flow rate portion of the movement speed of the first torpedo 14 (or the second torpedo 15), is calculated using the following equation 16 (step S27):

$$V_{rq} = Q_p/\Delta t/S \qquad \text{(Equation 16)}$$

Next, the indicated movement speed $V_r$ is calculated by adding the pressurized portion to the flow rate portion by using the following equation 17 and is output (step S28):

$$V_r = V_{rp} + V_{rq} \qquad \text{(Equation 17)}$$

Operation Example After Second Cycle of Discharging (Method of Improving Accuracy of Torpedo Movement Speed Prediction)

Next, an operation example (a method of improving the accuracy of the torpedo movement speed prediction) after the second cycle of the discharging will be described.

After the second cycle of the discharging, the movement speed calculation unit 32A calculates the "indicated movement speed (after the second cycle of the discharging)". At that time, a pressure change amount generated as a result of the movement of the first torpedo 14 (or the second torpedo 15) is obtained from the actually measured pressure, a "substantially pressurized volume" is obtained by subtracting the outflow rate calculated using the actually measured pressure in the equation 11 from a volume change amount caused by the movement of the first torpedo 14 (or the second torpedo 15), a modified bulk modulus is obtained from the pressure change amount and the "substantially pressurized volume", and these are used for calculating the indicated movement speed (see steps S32, S33 described below). As such, it is possible to use a predicted value (the modified bulk modulus) that reflects the bulk modulus according to a condition of the air entraining into the molten resin, thereby improving the accuracy.

Figure 25:
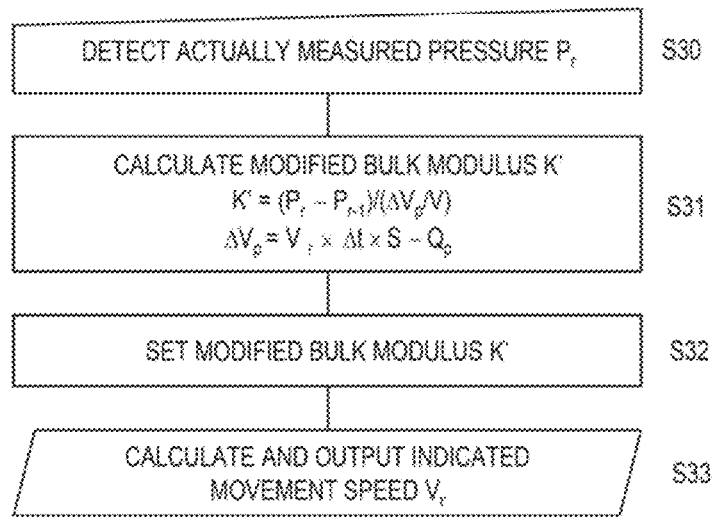
FIG. 25 is a flowchart of an operation example after a second cycle of discharging.

FIG. 25 is a flowchart of an operation example after a second cycle of the discharging.

First, the actually measured pressure $P_r$ is detected (step S30). The actually measured pressure $P_r$ refers to the detection values (the pressure detection values) of the first pressure detection unit 65 and the second pressure detection unit 66.

Next, the modified bulk modulus calculation unit 34A calculates the modified bulk modulus K' using the following equation 18 (step S31):

$$K' = (P_r - P_{r-1})/(\Delta V_p/V) \qquad \text{(Equation 18)}$$

Here, $P_r$ is the actually measured pressure when the modified bulk modulus is calculated in a case where the interval $\Delta t$ between control times is used. $P_{r-1}$ is the actually measured pressure before the interval $\Delta t$, and $\Delta V_p$ is the "substantially pressurized volume" obtained by subtracting the outflow rate from a volume that shrinks as the first torpedo 14 (or the second torpedo 15) moves during the interval $\Delta t$.

$\Delta V_p$ is calculated using the following equation 19:

$$\Delta V_p = V_r \times \Delta t \times S - Q_p \qquad \text{(Equation 19)}$$

Figure 26:
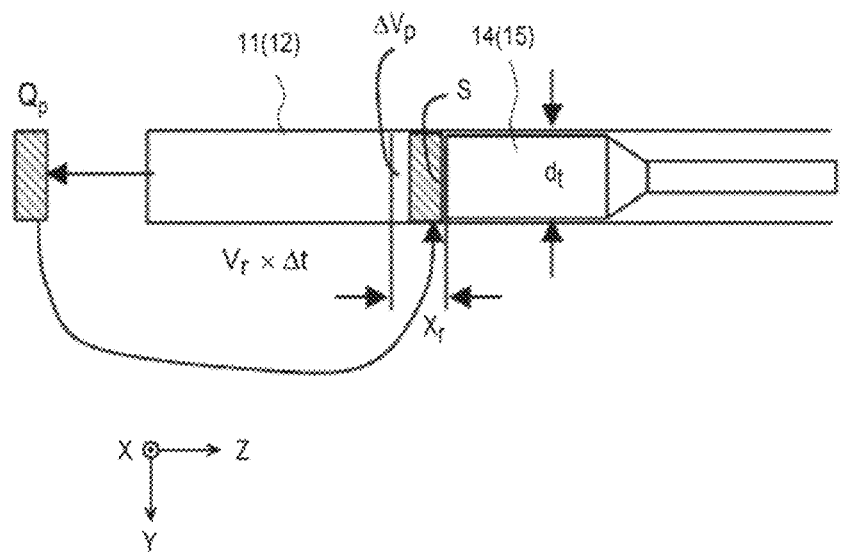
FIG. 26 is a schematic diagram illustrating each element in equations 18 and 19.

Each element in the equations 18 and 19 can be illustrated as in FIG. 26. FIG. 26 is a schematic diagram illustrating each element in the equations 18 and 19.

Next, the movement speed calculation unit 32A sets the modified bulk modulus K' as the bulk modulus K' of the second cycle (step S32). Next, the movement speed calculation unit 32A calculates and outputs the indicated movement speed $V_r$ in the same manner as in the first cycle (steps S25 to S28) (step S33).

Operation Example of Movement Speed Control Unit

The movement speed control unit 33A controls the motor 16a or 17a such that the movement speed of the first torpedo 14 (or the second torpedo 15) becomes the indicated movement speed $V_r$ that is calculated and output in step S28 (the first cycle of the discharging). Specifically, the movement speed control unit 33A outputs a drive command value to the motor 16a or 17a such that the movement speed of the first torpedo 14 (or the second torpedo 15) becomes the indicated movement speed $V_r$. Further, the movement speed control unit 33A controls the motor 16a or 17a such that the movement speed of the first torpedo 14 (or the second torpedo 15) becomes the indicated movement speed $V_r$ that is calculated and output in step S33 (after the second cycle of the discharging). Specifically, the movement speed control unit 33A outputs a drive command value to the motor 16a or 17a such that the movement speed of the first torpedo 14 (or the second torpedo 15) becomes the indicated movement speed $V_r$.

First Example of Flow Rate Control

Next, a first example of flow rate control will be described.

The first example is a discharging control example where a small object with high resolution is printed. In the first example, in a case where the nozzle diameter is as small as $\phi 1$ mm (a cylinder diameter $d_t=20$ mm), description will be made on flow rate control and a method of controlling the nozzle 18a when the nozzle 18a with a nozzle diameter of $\phi 1$ mm is driven at the movement speed of 160 mm/s, which is a steady speed (the maximum speed that is normally used) to form an ABS resin bead with a circular cross-section of $\phi 1$ mm in a straight line.

Figure 27:
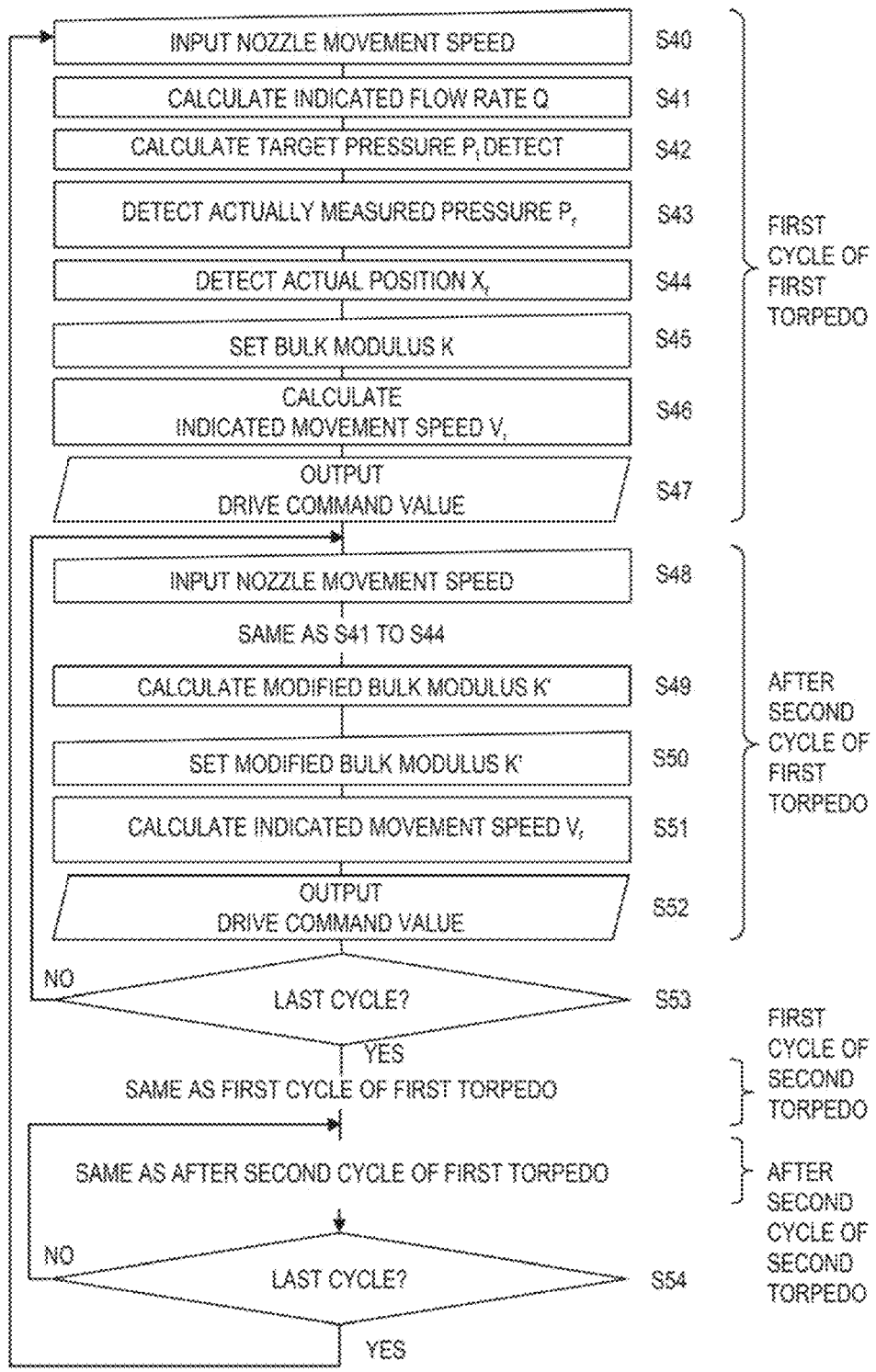
FIG. 27 is a flowchart of flow rate control common to a first example and a second example.

FIG. 27 is a flowchart common to the first example and a second example of the flow rate control. FIG. 28 is a table displaying a summary of a simulation result (first to third cycles) of the first example.

In the following description, it is assumed that the molten resin is continuously discharged from the discharging nozzle 18a as the first torpedo 14 and the second torpedo 15 alternately pressurize the molten resin in the cylinders 11 and 12 (see FIGS. 9 to 13).

Each cycle in FIG. 27 corresponds to $\Delta t$ (the interval between control times).

First, processing (steps S40 to S47) of the first cycle of the first torpedo 14 will be described.

First, the nozzle movement speed is input (step S40). Here, it is assumed that the fact that the movement speed of the nozzle 18a is 160 mm/s is detected from the XY-axis drive device 50 and input to the control device 7A.

Next, an indicated flow rate Q is input (acquired) (step S41). Here, it is assumed that the indicated flow rate Q=the cross-sectional area size of the resin bead (=the size of the cross-sectional area of the nozzle 18a)×the nozzle movement speed=$\pi/4 \times 1$ mm$^2 \times 160$ mm/s=125.6 mm$^3$/s is calculated according to the equation 4.

Next, the target pressure $P_t$ is calculated (step S42). Specifically, processing illustrated in FIG. 21 (steps S11 to S17) is executed.

First, the shear velocity D is calculated (step S11). Here, the shear velocity D=$32Q/(\pi d_n^3)=32\times 125.6$ mm$^3$/s/$(3.14\times(1$ mm)$^3)=1,280$/s is calculated according to the equation 5. Q=125.6 mm$^3$/s and $d_n=1$ mm.

Next, a temperature T of the molten resin immediately before the discharging is detected (step S12). Here, it is assumed that the temperature T=210° C. is detected.

Next, the pseudo-plastic viscosity k determined by the temperature T is calculated (step S13). Here, it is assumed that the pseudo-plastic viscosity k=42,500 [kg/(m·s$^{2-n}$)] of ABS resin at 210° C. is calculated (see FIG. 20).

Next, the melting viscosity $\eta$ is calculated (step S14). Here, it is assumed that the melting viscosity $\eta=kD^{n-1}=42,500$ kg/(m·s$^{2-0.25}$)$\times 1,280^{0.25-1}$/s$^{0.25-1}=199$ kg/(m·s)=199 Pa·s is calculated according to the equation 6. In the case of ABS resin, n=0.25 (see FIG. 17).

Next, the shear stress $\tau$ is calculated (step S15). Here, it is assumed that the shear stress $\tau=\eta D=199$ Pa·s×1,280/s=254,720 Pa=0.25 MPa is calculated according the equation 7. $\eta=199$ Pa·s and D=1,280/s.

Next, the target pressure $P_t$ is calculated (step S16). Here, it is assumed that the target pressure $P_t=\tau 4L/d_n=0.25$ MPa×4×2 mm/1 mm=2.0 MPa is calculated according to the above equation 8. $\tau=0.25$ MPa, L=2 mm, and $d_n=1$ mm. The target pressure $P_t$ (2.0 MPa) is output to the control device 7A (step S17).

Next, returning to FIG. 27, the actually measured pressure $P_r$ is detected (step S43). Here, it is assumed that the actually measured pressure $P_r=0.0$ MPa is detected.

Next, the pressurization amount $\Delta P$ is calculated. Here, it is assumed that the pressurization amount $\Delta P=P_t-P_r=2.0$ MPa-0.0 MPa=2.0 MPa is calculated according to the equation 9.

Next, an actual position $X_r$ is detected (step S44). Here, it is assumed that the actual position $X_r=25$ mm is detected.

Next, the bulk modulus K is set (step S45). Here, it is assumed that the bulk modulus K=834 MPa is set (see FIG. 18A).

Next, the indicated movement speed $V_r$ is calculated (step S46). Specifically, processing illustrated in FIG. 22 (steps S25 to S28) is executed.

First, the movement speed (the pressurized portion) $V_{rp}$ of the first torpedo 14 is calculated (step S25). Here, it is assumed that the movement speed (the pressurized portion) $V_{rp}=(2.0$ MPa/834 MPa) (628 mm$^3$+314 mm$^2 \times 25$ mm)/0.1 s/314 mm$^2=0.647$ mm/s is calculated according to the equation 10. $V_0=628$ mm$^3$, S=$\pi/4\times d_t^2=314$ mm$^2$ ($d_t=20$ mm), and $\Delta t=0.1$ sec. $\Delta t$ is not limited to 0.1 second and may be another value.

Next, the predicted outflow rate $Q_p$ is calculated (step S26). Here, it is assumed that the predicted outflow rate $Q_p=\pi d_n^3/32\times\{P_r d_n/(4kL_n)\}^{1/n}\times\Delta t=0$ mm$^3$ is calculated according to the equation 11. $P_r=0.0$ MPa.

Next, the movement speed (the flow rate portion) $V_{rq}$ of the first torpedo 14 is calculated (step S27). Here, it is assumed that the movement speed (the flow rate portion) $V_{rq}=Q_p/\Delta t/S=0$ mm/s is calculated according to the equation 16. $Q_p=0$ mm$^3$.

Next, the indicated movement speed $V_r$ is calculated (step S28). Here, the indicated movement speed $V_r=V_{rp}+V_{rq}=0.647$ mm/s+0 mm/s=0.647 mm/s is calculated according to the equation 17 and is output.

Next, the drive command value is output to the motor 16a such that the movement speed of the first torpedo 14 becomes the indicated movement speed $V_r$ calculated in step S46 (step S27) (step S47).

Next, processing after the second cycle of the first torpedo 14 (torpedo movement speed feedback control, steps S48 to S52) will be described.

First, the nozzle movement speed is input (step S48). Here, it is assumed that the fact that the movement speed of the nozzle 18a is 160 mm/s is detected from the XY-axis drive device and input to the control device 7A.

Next, the same processing as in steps S41 to S44 is executed.

Here, in step S43, it is assumed that the actually measured pressure $P_r$=1.45 MPa is detected.

Next, the modified bulk modulus K' is calculated (step S49). Here, it is assumed that the modified bulk modulus K'=$(P_r-P_{r-1})/(\Delta V_p/V)$   $\Delta V_p=V_r \times \Delta t \times S-Q_p$=(1.45 MPa-0 MPa)/(20.33 mm$^3$/8,478 mm$^3$)=604.6 MPa is calculated according to the equation 18. $\Delta V_p$=0.647 mm/s×0.1 s×314 mm$^2$-0 mm$^3$=20.33 mm$^3$, $P_r$=1.45 MPa, $P_{r-1}$=0 MPa, and V=628 mm$^3$+π/4×202 mm$^2$×25 mm=8,478 mm$^3$. Next, the modified bulk modulus K' is set as the bulk modulus K' of the second cycle (step S50).

Next, the indicated movement speed $V_r$ is calculated in the same manner as in the first cycle (step S46) (step S51). Here, it is assumed that the indicated movement speed $V_r=V_{rp}+V_{rq}$=0.245 mm/s+0.103 mm/s=0.348 mm/s is calculated according to the equation 17. $\Delta P=P_t-P_r$=2.0 MPa-1.45 MPa=0.55 MPa, $X_r$=24.94 mm, $V_{rp}$=(0.55 MPa/604.6 MPa) (628 mm$^3$+314 mm$^2$×24.94 mm)/0.1 s/314 mm$^2$=0.245 mm/s, $Q_p$=n×(1 mm)$^3$/32×{1.45 MPa×1 mm/(4×42,500 kg/(m·s$^{2-0.25}$)×2 mm)}$^{1-0.25}$×0.1 s=3.25 mm$^3$, and $V_{rq}$=3.25 mm$^3$/0.1 s/314 mm$^2$=0.103 mm/s.

Next, the drive command value is output to the motor 16a such that the movement speed of the first torpedo 14 becomes the indicated movement speed $V_r$ calculated in step S51 (step S52).

After the second cycle as well, steps S48 to S52 are repeatedly executed until it is determined that the cycle is the final cycle (step S53: YES), that is, until it is determined that the first torpedo 14 has reached the bottom dead point. Whether the first torpedo 14 has reached the bottom dead point can be determined based on the detection value (the position detection value) of the potentiometer 16f.

Next, the same processing as in steps S40 to S52 is executed until the second torpedo 15 moves to the plus side of the Z-axis and reaches the most minus side of the Z-axis (the bottom dead point) (step S54: YES).

Second Example of Flow Rate Control

Next, the second example of the flow rate control will be described.

The second example is a discharging control example in which a large automobile-sized object is printed in a short time. In the second example, in a case where the nozzle diameter is as large as φ12 mm (a cylinder diameter $d_f$=100 mm), description will be made on the flow rate control and the method of controlling the nozzle 18a when the nozzle 18a with a nozzle diameter of φ12 mm is driven at the movement speed of 160 mm/s, which is a steady speed (the maximum speed that is normally used) to form an ABS resin bead with a circular cross-section of φ12 mm in a straight line.

FIG. 27 is a flowchart common to the first example and the second example of the flow rate control. FIG. 29 is a table displaying a summary of a simulation result (first to third cycles) of the second example.

In the following description, it is assumed that the molten resin is continuously discharged from the discharging nozzle 18a as the first torpedo 14 and the second torpedo 15 alternately pressurize the molten resin in the cylinders 11 and 12 (see FIGS. 9 to 13).

Each cycle in FIG. 27 corresponds to Δt (the interval between control times).

First, processing (steps S40 to S47) of the first cycle of the first torpedo 14 will be described.

First, the nozzle movement speed is input (step S40). Here, it is assumed that the fact that the movement speed of the nozzle 18a is 160 mm/s is detected from the XY-axis drive device 50 and input to the control device 7A.

Next, an indicated flow rate Q is input (acquired) (step S41). Here, it is assumed that the indicated flow rate Q=the cross-sectional area size of the resin bead (=the size of the cross-sectional area of the nozzle 18a)×the nozzle movement speed=π/4×122 mm$^2$×160 mm/s=18,096 mm$^3$/s is calculated according to the equation 4.

Next, the target pressure $P_t$ is calculated (step S42). Specifically, processing illustrated in FIG. 21 (steps S11 to S17) is executed.

First, the shear velocity D is calculated (step S11). Here, it is assumed that the shear velocity D=32×18,096 mm$^3$/s/(3.14×(12 mm)$^3$)=106.7/s is calculated according to the equation 5. Q=18,096 mm$^3$/s and $d_n$=12 mm.

Next, a temperature T of the molten resin immediately before the discharging is detected (step S12). Here, it is assumed that the temperature T=210° C. is detected.

Next, the pseudo-plastic viscosity k determined by the temperature T is calculated (step S13). Here, it is assumed that the pseudo-plastic viscosity k=42,500 [kg/(m·s$^{2-n}$)] of ABS resin at 210° C. is calculated (see FIG. 20).

Next, the melting viscosity η is calculated (step S14). Here, it is assumed that the melting viscosity η=42,500 kg/(m·s$^{2-0.25}$)×106.7$^{0.25-1}$/s$^{0.25-1}$=1,280 kg/(m·s)=1,280 Pa·s is calculated according to the equation 6. In the case of ABS resin, n=0.25 (see FIG. 17).

Next, the shear stress τ is calculated (step S15). Here, it is assumed that the shear stress τ=1,280 Pa·s×106.7/s=136,576 Pa=0.14 MPa is calculated according the equation 7. η=1,280 Pa·s and D=106.7/s.

Next, the target pressure $P_t$ is calculated (step S16). Here, it is assumed that the target pressure $P_t$=0.14 MPa×4×2 mm/12 mm=0.09 MPa is calculated according to the equation 8. τ=0.14 MPa, L=2 mm, and $d_n$=12 mm. The target pressure $P_t$ (0.09 MPa) is output to the control device 7A (step S17).

Next, returning to FIG. 27, the actually measured pressure $P_r$ is detected (step S43). Here, it is assumed that the actually measured pressure $P_r$=0.0 MPa is detected.

Next, the pressurization amount ΔP is calculated. Here, it is assumed that the pressurization amount $\Delta P=P_t-P_r$=0.09 MPa-0.0 MPa=0.09 MPa is calculated according to the equation 9.

Next, an actual position $X_r$ is detected (step S44). Here, it is assumed that the actual position $X_r$=25 mm is detected.

Next, the bulk modulus K is set (step S45). Here, it is assumed that the bulk modulus K=834 MPa is set (see FIG. 18A).

Next, the indicated movement speed $V_r$ is calculated (step S46). Specifically, processing illustrated in FIG. 22 (steps S25 to S28) is executed.

First, the movement speed (the pressurized portion) $V_{rp}$ of the first torpedo 14 is calculated (step S25). Here, it is assumed that the movement speed (the pressurized portion) $V_{rp}$=(0.09 MPa/834 MPa) (15,700 mm$^3$+7,854 mm$^2$×25 mm)/0.1 s/7,854 mm$^2$=0.029 mm/s is calculated according to the equation 10. $V_0$=15,700 mm$^3$, S=7,854 mm$^2$($d_f$=100 mm), and Δt=0.1 sec. At is not limited to 0.1 second and may be another value.

Next, the predicted outflow rate $Q_p$ is calculated (step S26). Here, it is assumed that the predicted outflow rate $Q_p=\pi d_n^3/32 \times \{P_r d_n/(4kL_n)\}^{1/n} \times \Delta t$=0 mm$^3$ is calculated according to the equation 11. $P_r$=0.0 MPa.

Next, the movement speed (the flow rate portion) $V_{rq}$ of the first torpedo 14 is calculated (step S27). Here, it is assumed that the movement speed (the flow rate portion) $V_{rq}=Q_p/\Delta t/S$=0 mm/s is calculated according to the equation 16. $Q_p$=0 mm$^3$.

Next, the indicated movement speed $V_r$ is calculated (step S28). Here, the indicated movement speed $V_r = V_{rp} + V_{rq} = 0.029$ mm/s+0 mm/s=0.029 mm/s is calculated according to the equation 17 and is output.

Next, the drive command value is output to the motor 16a such that the movement speed of the first torpedo 14 becomes the indicated movement speed $V_r$ calculated in step S46 (step S27) (step S47).

Next, processing after the second cycle of the first torpedo 14 (the torpedo movement speed feedback control, steps S48 to S52) will be described.

First, the nozzle movement speed is input (step S48). Here, it is assumed that the fact that the movement speed of the nozzle 18a is 160 mm/s is detected from the XY-axis drive device and input to the control device.

Next, the same processing as in steps S41 to S44 is executed.

Here, in step S43, it is assumed that the actually measured pressure $P_r=0.046$ MPa is detected.

Next, the modified bulk modulus K' is calculated (step S49). Here, it is assumed that the modified bulk modulus $K'=(P_r-P_r)/(\Delta V_p/V)\Delta V_p = V_r \times \Delta t \times S - Q_p = (0.046$ MPa-0 MPa$)/(22.88$ mm$^3/212,049$ mm$^3) = 426.3$ MPa is calculated according to the equation 18. $\Delta V_p = 0.029$ mm/s×0.1 s×7,854 mm$^2$-0 mm$^3$=22.88 mm$^3$, $P_r=0.046$ MPa, $P_{r-1}=0$ MPa, and $V=15,700$ mm$^3 + \pi/4 \times 1002$ mm$^2 \times 25$ mm=212,049 mm$^3$.

Next, the modified bulk modulus K' is set as the bulk modulus K' of the second cycle (step S50).

Next, the indicated movement speed $V_r$ is calculated in the same manner as in the first cycle (step S46) (step S51). Here, it is assumed that the indicated movement speed $V_r = V_{rp} + V_{rq} = 0.028$ mm/s+0.150 mm/s=0.178 mm/s is calculated according to the equation 17. $\Delta P = P_t - P_r = 0.09$ MPa-0.046 MPa=0.044 MPa, $X_r=24.98$ mm, $V_{rp}=(0.044$ MPa/426.3 MPa) (15,700 mm$^3$+7,854 mm$^2$×24.98 mm)/0.1 s/7,854 mm$^2$=0.028 mm/s, $Q_p = \pi \times (12$ mm$)^3/32 \times \{0.046$ MPa× 12 mm/(4×42,500 kg/(m·s$^{2-0.25}$)×2 mm)$\}^{1-0.25}$×0.1 s=117.86 mm$^3$, $V_{rq}=117.86$ mm$^3$/0.1 s/7,854 mm$^2$=0.150 mm/s.

Next, the drive command value is output to the motor 16a such that the movement speed of the first torpedo 14 becomes the indicated movement speed $V_r$ calculated in step S51 (step S52).

After the second cycle as well, steps S48 to S52 are repeatedly executed until it is determined that the cycle is the final cycle (step S53: YES), that is, until it is determined that the first torpedo 14 has reached the bottom dead point. Whether the first torpedo 14 has reached the bottom dead point can be determined based on the detection value (the position detection value) of the potentiometer 16f.

Next, the same processing as in steps S40 to S52 is executed until the second torpedo 15 moves to the plus side of the Z-axis and reaches the most minus side of the Z-axis (the bottom dead point) (step S54: YES).

As described above, with the second embodiment, it is possible to provide an injection molding machine capable of optimally controlling the discharged amount while being operated.

This is because the movement speed control unit 33A is included. It controls the movement speed of the piston such that the movement speed becomes the indicated movement speed (the indicated movement speed obtained by adding the pressurized portion of the movement speed of the piston (the first torpedo 14 or the second torpedo 15), in which the pressure used for pressurizing the molten resin in the cylinder becomes the target pressure, to the flow rate portion of the movement speed of the piston, in which the flow rate of the molten resin discharged from the discharging nozzle 18a per unit time becomes the predicted outflow rate).

Further, with the second embodiment, it is possible to control the discharged flow rate without measuring the actual outflow rate by calculating the predicted outflow rate from the actually measured pressure, and calculating the target movement speed of the piston (the first torpedo 14 or the second torpedo 15). Thus, it is possible to control the discharged flow rate while operating the injection molding machine 2A.

Further, with the second embodiment, in the cycle in which the discharging is started (for example, the first cycle of the first torpedo in FIG. 27), the target indicated flow rate can be swiftly reached using the bulk modulus stored in advance.

Further, with the second embodiment, it is possible to highly accurately set the flow rate according to the condition of the air entraining into the molten resin.

Further, with the second embodiment, it is possible to calculate the target pressure in consideration of the type (grade), the temperature, and the nozzle size of the molten resin and control the flow rate to be discharged.

This is because the movement speed control unit (an example of a pressure control unit of the present disclosure) configured to control the pressure of the molten resin in the cylinder such that the pressure thereof becomes the target pressure is included.

Further, with the second embodiment, it is possible to accurately control the discharged flow rate of the resin by calculating the target pressure of the molten resin using the pseudo-plastic viscosity that varies depending on the temperature.

Further, with the second embodiment, even when a plurality of resin grades is used, it is possible to accurately control the discharged flow rate of the resin by calculating the target pressure of the molten resin using the pseudo-plastic viscosity that varies depending on the resin grade.

Further, with the second embodiment, it is possible to reduce a calculation load when calculating the target pressure by storing in advance the pseudo-plastic viscosity for each type and temperature of resins to be used. Further, it is possible to swiftly set the indicated flow rate to the target indicated flow rate from the cycle at which the discharging is started.

Further, with the second embodiment, when the movement speed control unit 33A executes feed-forward control of the movement speed of the piston (the first torpedo 14 or the second torpedo 15) using the bulk modulus of the molten resin, it is possible to more accurately control the target pressure.

Further, with the second embodiment, it is possible to control the discharged flow rate without measuring the actual outflow rate by calculating the predicted outflow rate from the actually measured pressure and calculating the indicated movement speed of the piston (the first torpedo 14 or the second torpedo 15). Thus, it is possible to control the discharged flow rate while operating the injection molding machine.

Further, with the second embodiment, since the modified bulk modulus calculation unit 34A that modifies the bulk modulus based on the pressure change amount calculated from the actually measured pressure and the substantially pressurized volume is included, it is possible to obtain a highly accurate flow rate according to the condition of the air entraining into the molten resin.

Further, with the second embodiment, since the modified bulk modulus calculation unit 34A modifies the bulk modulus only when a difference between the actually measured pressure and the target pressure is equal to or higher than a predetermined value, it is possible to modify the bulk modulus only when it is necessary to correct the value of the bulk modulus.

Further, with the second embodiment, the following advantageous effects are obtained.

The flow rate control of the resin discharging nozzle 18a described in the second embodiment may be applied to a 3D printer in which a resin bead (the molten resin discharged from the nozzle 18a and solidified like a thread) is formed and laminated from the resin pellet material (usually, since it is in a form of being industrially distributed in a large amount, it is much cheaper than a filament used in an existing 3D printer, such as Stratasys).

For that reason, there is a possibility of solving the following four issues.

Issue 1

In the 3D printer (the injection molding machine 2A or the injection molding apparatus 1 including the injection molding machine 2A), even when the movement speed of the nozzle 18a is changed, it is necessary to be able to form resin beads having uniform thicknesses. In other words, it is required to sense the movement speed and swiftly respond to the corresponding flow rate.

Issue 2

In the resin nozzle assumed by the present disclosure, it is difficult to measure the actual flow rate of the resin discharging nozzle while operating the 3D printer. For this reason, in general, a method of controlling by a measured value of the resin discharging pressure is adopted.

Issue 3

However, the present inventors have found that the actual flow rate considerably varies depending on the type of resin material, the temperature of the molten resin, or the diameter of the discharging hole even when the pressure is the same. Since the melting viscosity is low at a high temperature, the flow rate is easily increased with respect to the pressure. Further, the larger the nozzle diameter, the smaller a range influenced by wall friction, and thus apparent viscosity is decreased and the flow rate is easily increased with respect to the pressure. Further, since the molten resin is a non-Newtonian fluid, the larger the flow rate, the lower the apparent viscosity, and thus the flow rate is easily increased. It is desirable that the 3D printer can handle various types of resins, various temperatures of molten resins, or extremely small diameters (for example, $\phi 0.5$ mm) to large diameters (for example, $\phi 12$ mm) of discharging holes as one device. For example, when a case of modeling a small object, such as a pen case, is compared with a case of modeling a large object, such as a minivan, a time required for one layer of laminated modeling changes. Therefore, it is necessary to change the temperature of the resin or the nozzle diameter.

Issue 4

The present inventors have found the following issue. As an issue of using the resin pellet material, the plasticization processing varies for each stroke depending on a filling condition of the pellets and the like. As a result, the actual pressure rise varies depending on the molten state (the condition of the air entraining into the molten resin) even when compressed volumes are the same (this is caused by a difference in bulk modulus), and as a result, the flow rate also varies.

In the second embodiment, in order to solve issues 1 to 4, the target pressure used for discharging the indicated flow rate calculated from the movement speed is calculated by storing in advance, in the data tables 21 to 23 as constants, material property values with respect to various types of resins or temperatures of various molten resins, inputting a type of resin to be filled, measuring a temperature of a molten resin, and inputting a corresponding constant and a diameter of a mounted discharging hole (a nozzle diameter). As such, issues 1 and 3 are solved.

Next, the pressure is controlled by a movement speed obtained by adding the movement speed of the torpedo (the first torpedo 14 or the second torpedo 15) that generates a pressurizing amount calculated from the difference from the actually measured pressure to the movement speed of the torpedo corresponding to the outflow rate while the torpedo is moving, such that the pressure becomes the target pressure. Since it is difficult to directly measure the outflow rate, the flow rate predicted from the actually measured pressure is used. When calculating the movement speed of the torpedo that generates the pressurization amount, in the cycle at which the discharging is started (for example, the first cycle of the first torpedo in FIG. 27), the feed-forward control is used using a corresponding bulk modulus in the data table, and the target indicated flow rate is swiftly reached. As such, issue 2 is solved.

In the subsequent cycles (for example, after the second cycle of the first torpedo in FIG. 27), the pressure change amount generated as a result of the movement of the torpedo is actually measured, the volume change amount is calculated from the position detection result of the torpedo and the "substantially pressurized volume" are obtained by subtracting the outflow rate calculated using the actually measured pressure in the equation 11, from the volume change amount, the modified bulk modulus is obtained from the pressure change amount and the "substantially pressurized volume", and the indicated movement speed is calculated using the above. Therefore, it is possible to highly accurately set the flow rate according to the condition of the air entraining into the molten resin. As such, issue 4 is solved.

Next, advantageous effects of the second embodiment will be further described in comparison with comparative examples 1 to 3.

Comparative Example 1

In comparative example 1 (Japanese Patent No. 5920859), a flow rate of a resin plasticized by a screw is adjusted by a gear pump arranged immediately after the resin.

An advantageous effect of the second embodiment with respect to comparative example 1 is as follows. In the second embodiment, instead of adjusting the flow rate of the resin plasticized by the screw by the gear pump arranged immediately after the resin, the resin plasticized by the torpedo is temporarily stored in a plasticization chamber, and the flow rate is controlled by the movement speed of the torpedo controlled by an actuator at the time of discharging. Thus, the gear pump at the tip of a nozzle of comparative example 1 or the piston member slidable back and forth so as to change the volume of an internal space of the nozzle is not required. Therefore, there is an advantageous effect in that a structure is simple and small.

Comparative Example 2

In comparative example 2 (Japanese Patent No. 4166746), when an outflow rate of a molten resin is controlled by a pressure and a temperature, a nozzle is turned to a closed state and a change characteristic of compressibility C(P, T) is obtained. An advantageous effect of the second embodiment with respect to comparative example 2 is as follows. In the second embodiment, a material property value required for calculating an indicated value for driving the actuator that controls the movement speed of the torpedo from the indicated flow rate (the target flow rate) is included as a constant in the data table in the apparatus. Therefore, there is an advantageous effect in that processing for measuring a characteristic value before the injection processing is not required.

Comparative Example 3

In comparative example 3 (JP 5-016195 A), it is assumed that a bulk modulus of a molding material is changed according to a position of a plunger, and an actual injection flow rate value of the molding material injected from a nozzle is calculated. An advantageous effect of the second embodiment with respect to comparative example 3 is as follows. There is an advantageous effect in that processing for measuring a constant ABC that determines the bulk modulus before the injection processing is not required in the second embodiment whereas it is required in comparative example 3. This is because, in the second embodiment, the bulk modulus in the data table is used only in the first cycle (for example, after the first cycle of the first torpedo in FIG. 27), but from the second cycle (for example, the second cycle of the first torpedo in FIG. 27), the modified bulk modulus can be obtained every cycle while executing the injection processing, and the modified bulk modulus becomes a value in which the condition of the air entraining into the molten resin is taken into consideration, and thus it can have the same effect as that of comparative example 3.

A difference in the feedback control between comparative example 3 and the second embodiment will be described in I below, and a reason why the modified bulk modulus can be obtained while executing the injection processing in the second embodiment will be described in II below.

I: In comparative example 3, an "actual flow rate" (referred to as such in comparative example 3) is calculated from measurement results of a pressure and a position, and the feedback control is executed based on a difference from a target flow rate. However, the nozzle assumed in the second embodiment does not have a tool that measures the actual flow rate. For this reason, in the second embodiment (a technical idea of the present disclosure), open-loop control is executed for the flow rate after the second cycle, as well. In other words, in the present disclosure, the modified bulk modulus is obtained using the actually measured pressure, and thus prediction accuracy of the movement speed of the torpedo used for obtaining the indicated flow rate (the target flow rate) is improved.

II: In the second embodiment, the modified bulk modulus can be obtained while executing the injection processing because, by recognizing the volume change amount due to the movement of the torpedo as a sum of the "substantially pressurized volume" (a compressed volume that contributes to raising the pressure) and an amount corresponding to the outflow rate, setting the outflow rate as the highly accurate "predicted outflow rate" calculated from the actually measured pressure in the equation 11, and setting the volume change amount due to the movement of the torpedo as a highly accurate value as well from an actual position that can be measured by position sensors (the potentiometers $16f$, $17f$), it is possible to highly accurately obtain the "substantially pressurized volume", which is a difference between the latter and the former while executing the injection processing (that is while moving the torpedo and causing the resin to flow out without closing the nozzle).

In the second embodiment, when obtaining the modified bulk modulus, the actually measured pressure, the volume change amount due to the movement of the torpedo, and the "predicted outflow rate" are used, but as expressed in the equation 11, the actually measured pressure is used to calculate the "actually predicted outflow rate", but the bulk modulus is not used. For this reason, it is possible to obtain the modified bulk modulus independently of the bulk modulus.

On the other hand, in comparative example 3, the bulk modulus K(z) is used in addition to the actually measured pressure P° when calculating the "actual flow rate q°'" (referred to as such in comparative example 3). Thus, even when the "substantially pressurized volume" referred to in the second embodiment is to be obtained by subtracting the "actual flow rate q°'" from the volume change amount As·Z° due to the movement of the torpedo and the modified bulk modulus is obtained from the obtained substantially pressurized volume and the actually measured pressure P°, the predicted value (the modified bulk modulus) will be used in calculation processing of the predicted value (the modified bulk modulus), which will be a circular reference referred to in Excel, and thus the predicted value cannot be calculated.

Further, in the second embodiment, the target pressure with respect to the target indicated flow rate is calculated from a theoretical equation (obtained considering shear velocity dependence and temperature dependence of the melting viscosity using the power law of non-Newtonian fluids in quasi-plastic flow) in which the flow rate is determined from the viscosity and the pressure using a value obtained considering the change in the viscosity with respect to the temperature and the flow rate of the molten resin, and is used for controlling. Thus, the prediction is highly accurate and the indicated flow rate (the target flow rate) is swiftly reached. Further, by preparing the power index n for various resins in the data table and also preparing k obtained for each temperature in advance, it is possible to accurately control flow rates of various resins.

Third Embodiment

Next, as a third embodiment, a method of automatically stopping and recording a defect position when a modeling defect occurs in the 3D printer will be described.

Since a configuration of an injection molding machine 2B of the third embodiment is the same as that of the injection molding machine 2A of the second embodiment (see FIG. 14), description thereof will be omitted.

Figure 30:
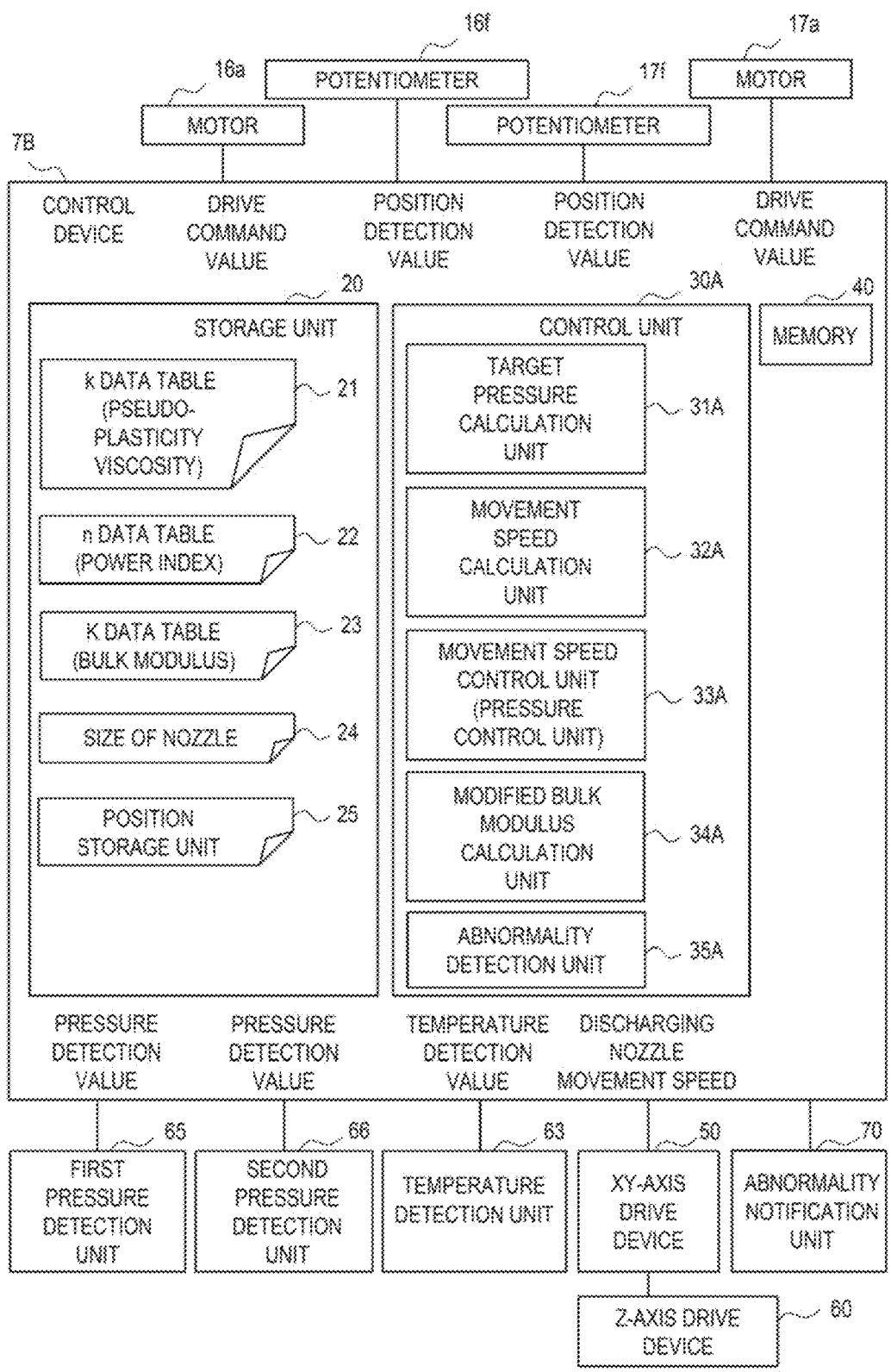
FIG. 30 is a configuration diagram of a control device of a third embodiment.

FIG. 30 is a configuration diagram of a control device 7B of the third embodiment.

Although a configuration of the control device 7B of the third embodiment is the same as that of the control device 7A of the second embodiment (see FIG. 15), as illustrated in FIG. 30, a position storage unit 25, an abnormality detection unit 35A, and an abnormality notification unit 70 are added to the control device 7B of the third embodiment.

The position storage unit 25 is provided in, for example, the storage unit 20. The position storage unit 25 stores a nozzle position at a time when the abnormality detection unit 35A detects an abnormality (a defect) (an operating position of the 3D printer that shows a position of the nozzle 18a at the time when an abnormality (a defect) is detected). FIG. 35 is an example of the position of the nozzle 18a stored in the position storage unit 25.

The abnormality detection unit 35A is implemented when the control unit 30 (a processor) executes a predetermined program read from the storage unit 20 using the memory 40

(for example, a RAM). The abnormality detection unit 35A may be implemented in hardware. An operation example of the abnormality detection unit 35A will be described below.

The abnormality notification unit 70 is a display that displays an abnormality detected by the abnormality detection unit 35A or a speaker that outputs an abnormality detected by the abnormality detection unit 35A by voice.

Operation Example of Abnormality Detection Unit

Next, an operation example (automatic stop determination and defect occurrence determination logic) of the abnormality detection unit 35A will be described.

Figure 31:
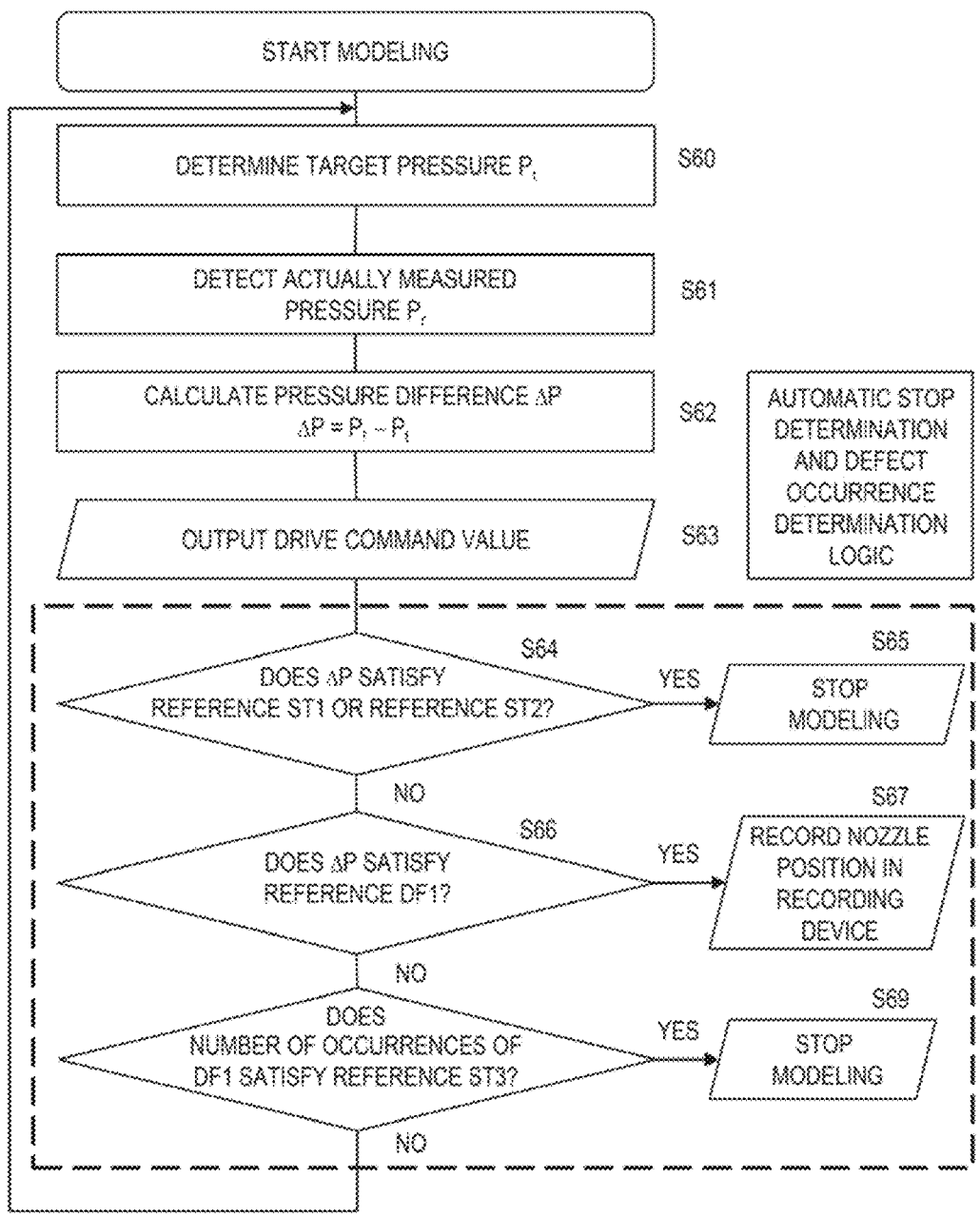
FIG. 31 is a flowchart of an operation example (automatic stop determination and defect occurrence determination logic) of an abnormality detection unit.

FIG. 31 is a flowchart of an operation example (the automatic stop determination and the defect occurrence determination logic) of the abnormality detection unit 35A. In FIG. 31, a range surrounded by a dotted line is the operation example (the automatic stop determination and the defect occurrence determination logic) of the abnormality detection unit 35A.

First, the target pressure $P_t$ is determined (step S60). Specifically, the target pressure $P_t$ of the molten resin on an upstream of the discharge hole is determined such that the flow rate is calculated from the movement speed of the discharging nozzle 18a such that resin beads have a constant thickness. The target pressure $P_t$ can be determined by, for example, the target pressure calculation unit 31A described in the second embodiment.

Next, the actually measured pressure $P_r$ is detected (step S61). The actually measured pressure $P_r$ is directly detected by a pressure sensor and the like, but it can be estimated from a value (the pressure detection value) of the pressure detection unit 65 or 66 (for example, a strain gauge) attached to the outer circumferential surface of the first cylinder 11 or the outer circumferential surface of the second cylinder 12.

Next, a pressure difference ΔP is calculated by the following equation 20 (step S62):

$$\Delta P = P_r - P_t \quad \text{(Equation 20)}$$

Here, $P_r$ is the actually measured pressure and $P_t$ is the target pressure.

Next, in the same manner as in step S47, the drive command value is output to the motor 16a (step S63).

Next, a determination is made as to whether ΔP satisfies a reference ST1 or a reference ST2 determined in advance (step S64).

The reference ST1 may be, for example, ΔP>a threshold value Pmax. The threshold value Pmax is a positive value and, for example, a relatively high value that can be predetermined in advance by experiments. The reference ST1 (the threshold value Pmax and the like) is stored in, for example, the storage unit 20. The reference ST1 is satisfied when an actual flow rate Q becomes smaller than the target flow rate (the indicated flow rate) because the discharging nozzle 18a (the discharging hole) is clogged with unmelted resin pieces or dust, and the like. This is because, when the actual flow rate Q is smaller than the target flow rate, a compressed amount of the resin in the cylinder 11 becomes larger than expected and an internal pressure rises, and thus the actually measured pressure $P_r$ becomes higher than the target pressure $P_t$.

The reference ST2 may be, for example, ΔP<a threshold value Pmin. The threshold value Pmin is a negative value and, for example, a relatively low value that can be predetermined in advance by experiments. The reference ST2 (the threshold value Pmin and the like) is stored in, for example, the storage unit 20. The reference ST2 is satisfied when the bulk modulus K of the molten resin is smaller than when the molten resin is not mixed with air. The reason is as follows.

As a case where air is mixed with the molten resin, when a bridge is caused, the resin pellets are clogged in the supply pipe, and a supply amount of the resin pellets is insufficient, and a filling rate in the nozzle 18a is small due to a shape of the pellets, an influence of static electricity, or the like, the amount of the resin to be plasticized may be smaller than the volume of the first cylinder 11. The resin bead formed in this state contains a pore defect generated by expansion of the mixed air, which causes deterioration of a quality of a modeled body.

When ΔP satisfies the reference ST1 (step S64: YES), it is determined that a modeling defect has occurred because the discharging nozzle 18a is clogged, and modeling is automatically stopped (step S65). The stop refers to a stop of the discharging nozzle 18a (a stop of an actuator (here, the motor 16a or 17a)) and a stop of the gantry device 51. In this case (step S64: YES), the abnormality notification unit 70 may display on the display or may output by voice an indication that the discharging nozzle 18a is clogged.

On the other hand, when ΔP satisfies the reference ST2 (step S64: YES), it is determined that a modeling defect has occurred because air is excessively entrained in the molten resin, and modeling is automatically stopped (step S65). In this case (step S64: YES), the abnormality notification unit 70 may display on the display or may output by voice an indication that air is excessively entrained in the molten resin.

On the other hand, as a result of the determination in step S64, when ΔP does not satisfy the reference ST1 and the reference ST2 (step S64: NO), a determination is made as to whether ΔP satisfies a reference DF1 determined in advance (step S66). The reference DF1 may be, for example, ΔP<a threshold value $P_{DF}$. The threshold value $P_{DF}$ is a negative value and is higher than the threshold value Pmin. The threshold value $P_{DF}$ can be determined in advance by, for example, experiments. The reference DF1 (the threshold value $P_{DF}$ and the like) is stored in, for example, the storage unit 20.

When ΔP satisfies the reference DF1 (step S66: YES), it is considered that a little air is entrained in the molten resin (a pore defect) (here, a laminated modeled object can be adopted as a product), and the nozzle position (the operating position of the 3D printer that shows the position of the nozzle 18a at a time when the abnormality (defect) is detected) is recorded in the position storage unit 25 (step S67) such that the position of the pore defect can be confirmed thereafter. In this case, the abnormality notification unit 70 may display on the display or may output by voice the indication that a little air is entrained in the molten resin (and the nozzle position).

On the other hand, as a result of the determination in step S66, when ΔP does not satisfy the reference DF1 (step S66: NO), a determination is made as to whether the number of occurrences of the DF1 satisfies a reference ST3 (step S68). The reference ST3 is the number of occurrences of DF1 (the number in which ΔP exceeds the threshold value $P_{DF}$)>a predetermined number. The predetermined number can be determined in advance as the total accumulated number or the accumulated number within a predetermined period. The reference ST3 (the predetermined number and the like) is stored in, for example, the storage unit 20.

When the number of occurrences of the DF1 satisfies the reference ST3 (step S68: YES), it is determined that a modeling defect has occurred (pore defects frequently occur) and the modeling is automatically stopped (step S69).

In this case, the abnormality notification unit 70 may display on the display or may output by voice an indication that pore defects frequently occur.

On the other hand, as a result of the determination in step S68, when the number of occurrences of the DF1 does not satisfy the reference ST3 (step S68: NO), the process returns to step S60 and processes of step S60 and steps thereafter are repeatedly executed.

Another Operation Example of Abnormality Detection Unit

Next, another operation example (the automatic stop determination and the defect occurrence determination logic) of the abnormality detection unit 35A will be described.

Figure 32:
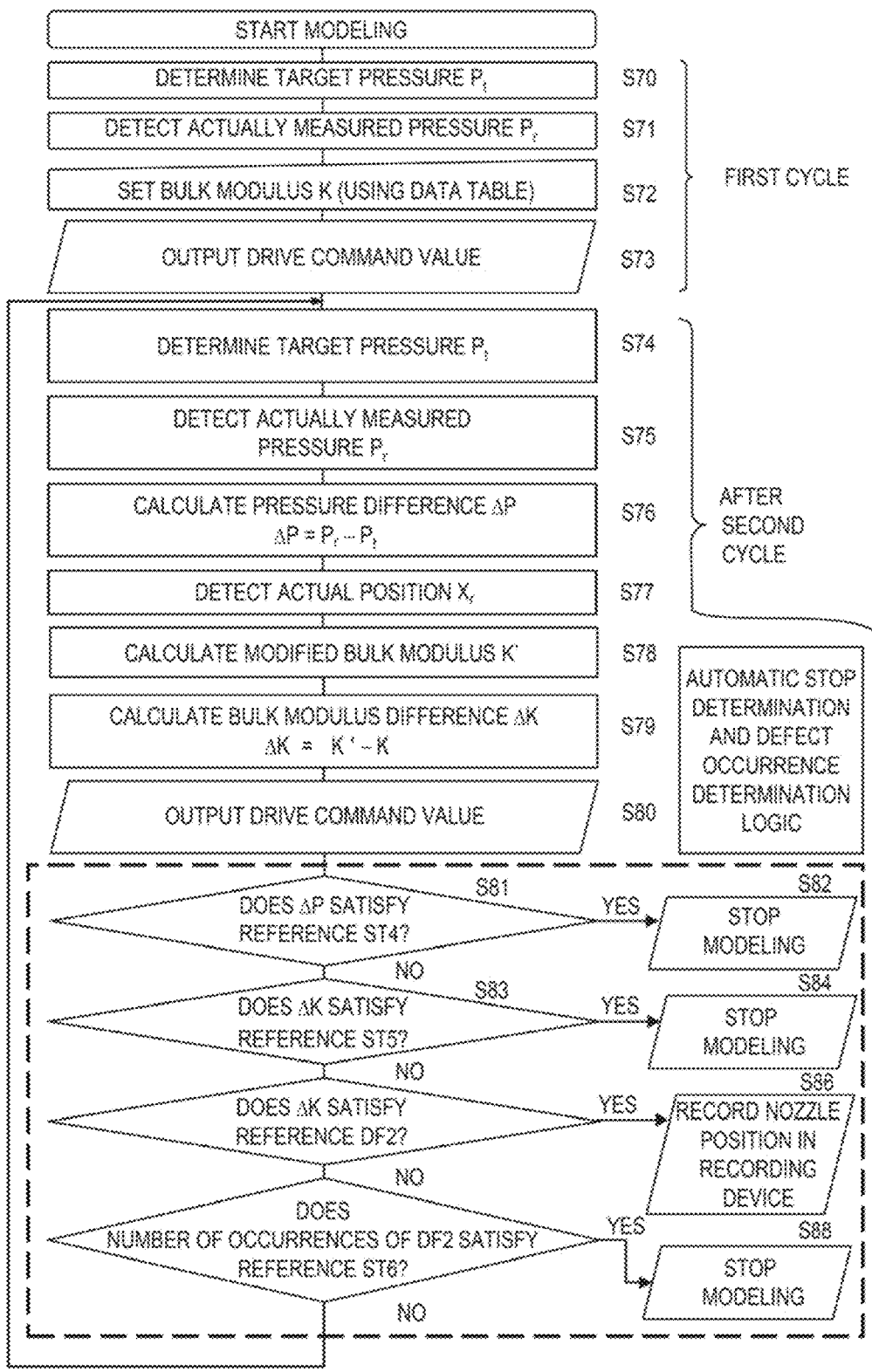
FIG. 32 is a flowchart of another operation example (automatic stop determination and defect occurrence determination logic) of the abnormality detection unit.

FIG. 32 is a flowchart of another operation example (the automatic stop determination and the defect occurrence determination logic) of the abnormality detection unit 35A. In FIG. 32, a range surrounded by a dotted line is another operation example (the automatic stop determination and the defect occurrence determination logic) of the abnormality detection unit 35A.

FIG. 32 is a flowchart common to the operation examples of the first cycle and after the second cycle of the first torpedo 14, and the operation examples of the first cycle and after the second cycle of the second torpedo 15.

Hereinafter, an operation example of the first cycle (S70 to S73) and an operation example (S74 to S88) after the second cycle of the first torpedo 14 will be described. Since the operation example of the first cycle (S70 to S73) and the operation example after the second cycle (S74 to S88) of the second torpedo 15 are the same as that of the first cycle and that after the second cycle of the first torpedo 14, description thereof will be omitted.

First, the operation example of the first cycle (S70 to S73) of the first torpedo 14 will be described.

First, the target pressure $P_t$ is determined (step S70).

Next, the actually measured pressure $P_r$ is detected (step S71).

Next, the bulk modulus K is set in the same manner as in step S45 (step S72).

Next, in the same manner as in step S47, the drive command value is output to the motor 16a (step S73).

Next, the operation example after the second cycle (S74 to S101) will be described.

First, the target pressure $P_t$ is determined (calculated) (step S74).

Next, the actually measured pressure $P_r$ is detected (step S75).

Next, the pressure difference ΔP is calculated by the equation 20 (step S76).

Next, the actual position $X_r$ is detected (step S77).

Next, the modified bulk modulus K' is set by the equation 18 in the same manner as in step S31 (step S78).

Next, a bulk modulus difference ΔK is calculated by the following equation 21 (step S79):

$$\Delta K = K' - K \quad \text{(Equation 21)}$$

Here, K' is the modified bulk modulus and K is the bulk modulus.

Next, in the same manner as in step S73, the drive command value is output to the motor 16a (step S80).

Next, a determination is made as to whether ΔP satisfies a reference ST4 determined in advance (step S81). The reference ST4 may be, for example, ΔP>the threshold value Pmax. The threshold value Pmax is a positive value and, for example, a relatively high value that can be determined in advance by experiments. The reference ST4 (the threshold value Pmax and the like) is stored in, for example, the storage unit 20.

The reference ST4 is satisfied when the actual flow rate Q becomes smaller than the target flow rate (the indicated flow rate) because the discharging nozzle 18a (the discharging hole) is clogged with unmelted resin pieces or dust, and the like. This is because, when the actual flow rate Q is smaller than the target flow rate, a compressed amount of the resin in a molten resin storage chamber becomes larger than expected and an internal pressure rises, and thus the actually measured pressure $P_r$ becomes higher than the target pressure $P_t$.

When ΔP satisfies the reference ST4 (step S81: YES), it is determined that a modeling defect has occurred because the discharging nozzle 18a is clogged, and modeling is automatically stopped (step S82). The stop refers to a stop of the discharging nozzle 18a (a stop of an actuator (here, the motor 16a or 17a)) and a stop of the gantry device 51. In this case (step S81: YES), the abnormality notification unit 70 may display on the display or may output by voice the indication that the discharging nozzle 18a is clogged.

On the other hand, as a result of the determination in step S81, when ΔP does not satisfy the reference ST4 (step S81: NO), a determination is made as to whether ΔK satisfies a reference ST5 determined in advance (step S83). The reference ST5 may be, for example, ΔK<the threshold value Kmin. The threshold Kmin is a negative value and, for example, a relatively low value that can be determined in advance by experiments. The reference ST5 (the threshold value Kmin and the like) is stored in, for example, the storage unit 20.

On the other hand, when ΔK satisfies the reference ST5 (step S83: YES), it is determined that a modeling defect has occurred because air is excessively entrained in the molten resin, and the modeling is automatically stopped (step S84). In this case (step S83: YES), the abnormality notification unit 70 may display on the display or may output by voice the indication that air is excessively entrained in the molten resin.

On the other hand, as a result of the determination in step S83, when ΔK does not satisfy the reference ST5 (step S83: NO), a determination is made as to whether ΔK satisfies a reference DF2 determined in advance (step S85). The reference DF2 may be, for example, ΔK<the threshold value Kur. The threshold value $K_{DF}$ is a negative value and is higher than the threshold Kmin. The threshold value $K_{DF}$ can be determined in advance by, for example, experiments. The reference DF2 (the threshold value $K_{DF}$ and the like) is stored in, for example, the storage unit 20.

When ΔK satisfies the reference DF2 (step S85: YES), it is considered that a little air is entrained in the molten resin (a pore defect) (here, a laminated modeled object can be adopted as a product), and the nozzle position (the operating position of the 3D printer that shows the position of the nozzle 18a at a time when the abnormality (defect) is detected) is recorded in the position storage unit 25 (step S86) such that the position of the pore defect can be confirmed thereafter. In this case, the abnormality notification unit 70 may display on the display or may output by voice the indication that a little air is entrained in the molten resin (and the nozzle position).

On the other hand, as a result of the determination in step S85, when ΔK does not satisfy the reference DF2 (step S85: NO), a determination is made as to whether the number of occurrences of the DF2 satisfies a reference ST6 (step S87). The reference ST6 is, for example, the number of occurrences of the DF2 (the number in which ΔP exceeds the threshold value $K_{DF}$)>the predetermined number. The predetermined number can be determined in advance as the total accumulated number or the accumulated number within the predetermined period. The reference ST6 (the predetermined number and the like) is stored in, for example, the storage unit 20.

When the number of occurrences of the DF2 satisfies the reference ST6 (step S87: YES), it is determined that a modeling defect has occurred (pore defects frequently occur) and the modeling is automatically stopped (step S88). In this case, the abnormality notification unit 70 may display on the display or may output by voice the indication of an occurrence of the modeling defect (pore defects frequently occur).

On the other hand, as a result of the determination in step S87, when the number of occurrences of the DF2 does not satisfy the reference ST6 (step S87: NO), the process returns to step S74 and processes of step S74 and steps thereafter are repeatedly executed.

Example of Recording Method of Modeling Defect Prediction Position when Used in 3D Printer Next, an example (hereinafter, also referred to as a third example) of a recording method of a modeling defect prediction position when used in a 3D printer will be described.

Figure 33:
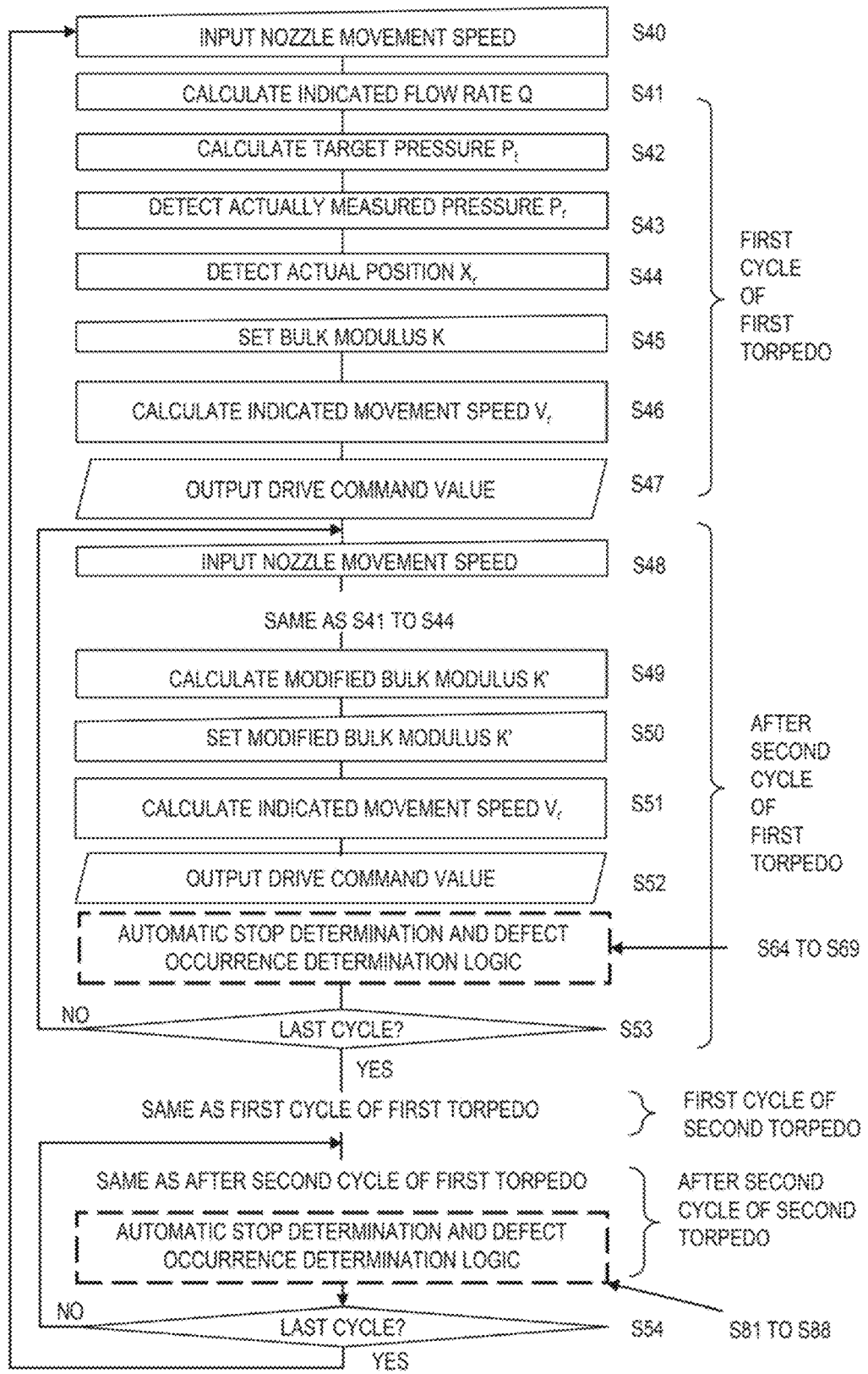
FIG. 33 is a flowchart of an example of a recording method of a modeling defect prediction position when used in a 3D printer.

FIG. 33 is a flowchart of an example of the recording method of the modeling defect prediction position when used in a 3D printer.

FIG. 33 corresponds to what "the automatic stop determination and the defect occurrence determination logic (steps S64 to S69, see inside the dotted line in FIG. 31)", and "the automatic stop determination and the defect occurrence determination logic (steps S81 to S88, see inside the dotted line in FIG. 32)" is added to the flowchart of FIG. 27. Since the process of each step in FIG. 33 has already been described, description thereof will be omitted.

FIG. 34 is a table summarizing results (first to sixth cycles) of the third example. Specifically, FIG. 34 is the table summarizing the results when the processes of steps S40 to S47 in FIG. 33 are executed once and the processes of steps S48 to S52 in FIG. 33 are repeated 5 times.

FIG. 34 displays a fact that, after a fourth cycle, ΔK (=K'−K)<a threshold value KDF (=−500), that is, the reference DF2, is satisfied. This is because it is considered that a little air is entrained in the molten resin (a pore defect), and the nozzle position (the operating position of the 3D printer that shows the position of the nozzle 18a at the time when the abnormality (defect) is detected) is recorded in the position storage unit 25 (step S86) such that a position of the pore defect is confirmed thereafter. For example, the nozzle position is recorded as illustrated in FIG. 35. FIG. 35 is an example of the modeling defect prediction position stored in the position storage unit 25 (the nozzle position at the time when the abnormality detection unit 35A detects an abnormality (a defect)).

Example of Modeling Stop Due to Nozzle Clogging

Next, an example (hereinafter also referred to as a fourth example) of a modeling stop due to nozzle clogging will be described.

FIG. 36 is a table summarizing results (the first to fifth cycles) of the fourth example. Specifically, FIG. 36 is the table summarizing the results when the processes of steps S40 to S47 in FIG. 33 are executed once and the processes of steps S48 to S52 in FIG. 33 are repeated 4 times.

FIG. 36 displays a fact that, in the fifth cycle, ΔP>the threshold value Pmax (=2.0 MPa), that is, the reference ST4, is satisfied. It is considered that the flow rate is decreased because the discharging nozzle 18a (the discharging hole) is clogged with unmelted resin pieces or dust and the compressed volume is increased, and thus the pressure sharply rises. When the modeling is continued as it is, the nozzle 18a may be damaged. Thus, for example, a stop signal ST1 is output to automatically stop the modeling (step S65).

As described above, with the third embodiment, it is possible to provide an injection molding machine 2B that can detect an occurrence of an abnormality, such as when the discharging nozzle 18a (the discharging hole) is clogged with an unmelted resin piece or when the discharged resin contains air.

This is because the abnormality detection unit 35A that detects an abnormality based on the target pressure and the actually measured pressure is included.

Further, with the third embodiment, since an abnormality can be sensed as described above, it is possible to restrict continuous production of a laminated modeled object having many defects while there is no human monitoring, such as during autonomous driving.

Further, when the state where the nozzle 18a is clogged is not noticed and the nozzle 18a is continuously operated to discharge the resin, the internal pressure rises, and the cylinders 11, 12 or the actuators (here, the motors 16a, 17a) may be damaged. However, with the third embodiment, when the pressure difference ΔP exceeds the threshold value, or when the bulk modulus difference in exceeds the threshold value, the modeling is stopped (steps S65, S82, S84). Therefore, it is possible to restrict the cylinders 11, 12 or the actuator (here, the motors 16a, 17a) from being damaged.

Further, with the third embodiment, when the abnormality detection unit 35A detects an abnormality, the abnormality notification unit 70 that notifies the abnormality is included. Therefore, it is possible to easily grasp an occurrence of an abnormality.

Further, with the third embodiment, when the abnormality detection unit 35A detects an abnormality, the position storage unit 25 that stores coordinates of the discharging nozzle 18a at the time when the abnormality is detected is included. Therefore, by referring to the coordinates, it is possible to easily determine whether the abnormality (the defect position) is at a permissible level in an inspection of the laminated modeled body (the three-dimensionally modeled object) after completion.

Further, with the third embodiment, when the difference (ΔP) between the target pressure and the actually measured pressure satisfies a first reference determined in advance (for example, the reference ST2: ΔP<the threshold value Pmin), the abnormality detection unit 35A detects a first abnormality (air is excessively entrained in the molten resin), and stops the discharging nozzle 18a (step S65). On the other hand, when the difference (ΔP) between the target pressure and the actually measured pressure satisfies a second reference determined in advance (for example, the reference DF1: ΔP<the threshold value $P_{DF}$), the abnormality detection unit 35A detects the second abnormality (a little air is entrained in the molten resin) (the pore defect), and stores, in the position storage unit 25, the coordinates of the discharging nozzle 18a at the time when the second abnormality is detected (step S67).

As such, for example, in a case where the difference (ΔP) is large, the discharging nozzle 18a is stopped since equipment fails when it is not stopped, and in a case where the difference (ΔP) is not that large, the molding can be continued and whether a defect occurs can be inspected afterwards.

Further, with the third embodiment, the abnormality detected by the abnormality detection unit 35A when the target pressure is higher than the actually measured pressure and the abnormality detected by the abnormality detection unit 35A when the target pressure is lower than the actually measured pressure may be different from each other.

In this manner, it is possible to specify, for example, whether the abnormality is caused by mixing of air or clogging of the resin piece.

Fourth Embodiment

Next, as a fourth embodiment, the 3D printer 300 will be described.

System Configuration of 3D Printer (Overview)

FIG. 37 is a system configuration diagram of the 3D printer 300 of the fourth embodiment.

As illustrated in FIG. 37, the 3D printer 300 of the fourth embodiment is a three-dimensionally modeled object modeling apparatus that models a three-dimensionally modeled object (for example, in FIG. 37, a three-dimensionally modeled object represented by a reference sign Ob1) by laminating the resin bead RB that is the molten resin discharged from the discharging nozzle 18 on a base plate 4 (an example of a table of the present disclosure). The 3D printer 300 includes the cylinders 11, 12 that store the molten resin, the discharging nozzle 18 that is communicated with the cylinders 11, 12, and the first piston unit 14 (and the second piston unit 15). Although not shown, a robot that moves in the Z-axis direction in addition to the XY-axis direction, and a fixed base plate may be used.

Hereinafter, the first piston unit 14 and the second piston unit 15 are also referred to as the first piston 14 and the second piston 15. The first piston 14 and the second piston 15 are examples of pistons of the present disclosure. The first piston 14 and the second piston 15 are pistons that linearly reciprocate in the cylinders 11, 12, and discharge the molten resin from the discharging nozzle 18 by moving in the direction of approaching the discharging nozzle 18 (in FIG. 37, the downward direction) and by pressurizing the molten resin in the cylinders 11, 12.

System Configuration of 3D Printer (Hardware Configuration)

As illustrated in FIG. 37, the 3D printer 300 includes the injection molding machine 2A, the control device 7A, the XY-axis drive device 50 (the gantry drive device), and the Z-axis drive device 60 of the second embodiment. The XY-axis drive device 50 is an example of a movement unit of the present disclosure. Since these have already been described in the second embodiment and the like, description thereof will be omitted.

The first pressure detection unit 65 and the second pressure detection unit 66 are tools (for example, pressure sensors) that can measure or estimate the pressure of the molten resin somewhere between the plasticization chambers S2, S4 and the discharging nozzle 18 (the resin discharging hole). Further, the temperature detection unit 63 is a tool that can measure or estimate the temperature of the molten resin somewhere between the plasticization chambers S2, S4 and the discharging nozzle 18 (the resin discharging hole) (for example, a thermocouple).

In FIG. 37, the "constant according to the resin" corresponds to each data table 21 to 23 in FIG. 15, and the "nozzle diameter, nozzle length" corresponds to the nozzle size 24 in FIG. 15.

Further, the 3D printer 300 includes a modeling track generation unit 80 and a piston straight-ahead actuator drive device 81.

The modeling track generation unit 80 generates a modeling track (hereinafter, also referred to as a 3D print track) by executing a predetermined process on a modeling model MD (for example, 3D data in which a targeted three-dimensionally modeled object is described by a Standard Triangulated Language (STL)). The modeling track generation unit 80 is implemented by, for example, executing well-known software (a program) called a slicer using an information processing device (not shown), such as a personal computer.

The 3D print track is data used for controlling the 3D printer 300 such that the targeted three-dimensionally modeled object is modeled (laminated). Examples thereof include a G code. The G code is data for controlling the 3D printer 300 to model a targeted three-dimensionally modeled object for each layer divided (sliced) in the laminating direction (Z-axis direction) and includes, for example, the movement target position (the XY coordinates) of the discharging nozzle 18.

Figure 38:
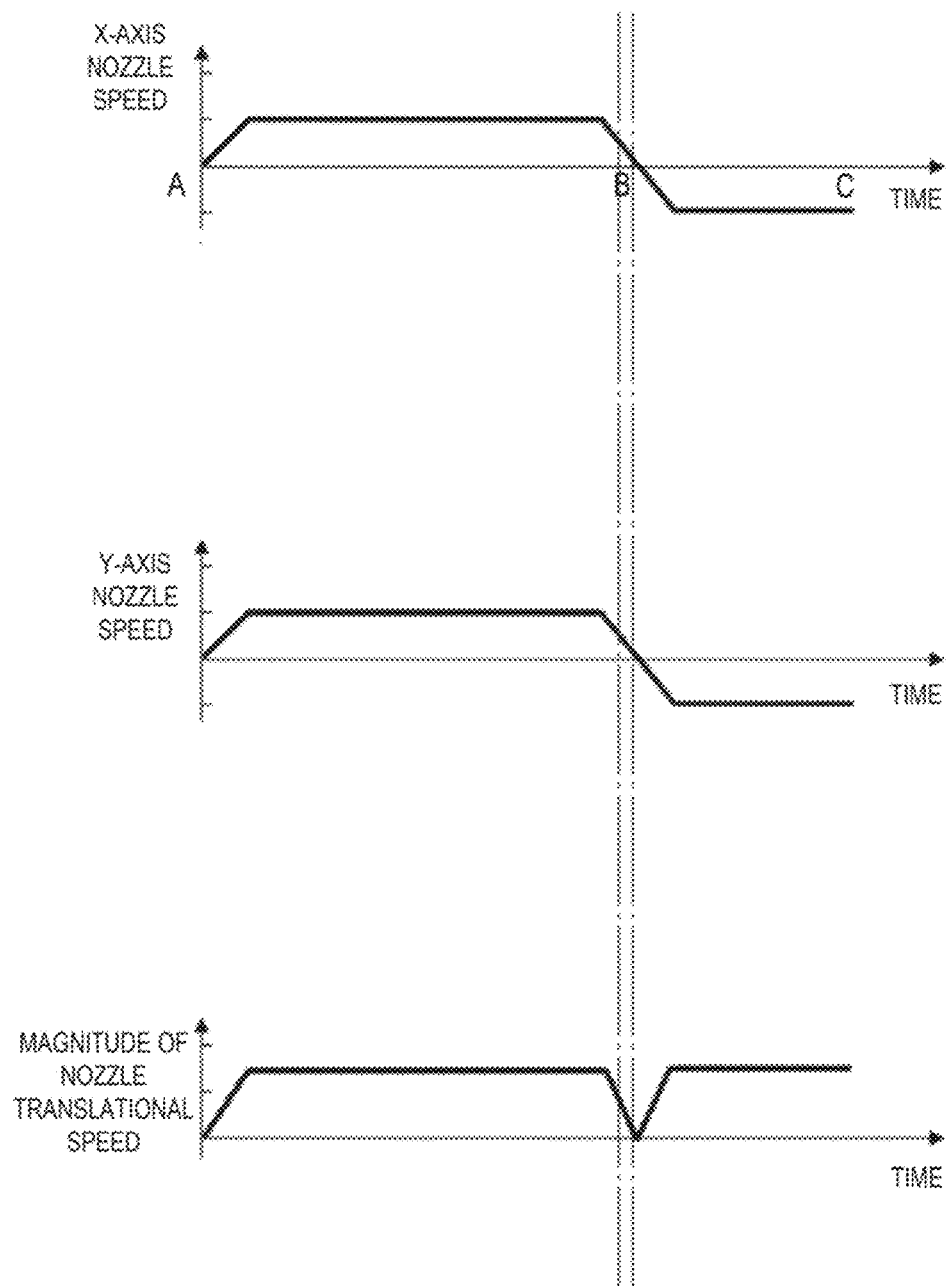
FIG. 38 is a graph displaying a relationship between a nozzle speed and a time.

For example, as illustrated in FIG. 37, it is assumed that a three-dimensionally modeled object Ob1 (a laminated modeled body) that passes through a start point A, an inversion point B, and an intermediate point C is modeled. In this case, a 3D print track that has a relationship between a speed and a time as illustrated in FIG. 38 is generated. An upper graph in FIG. 38 is a graph displaying a relationship between a nozzle speed in the X-axis direction and a time, a middle graph in FIG. 38 is a graph displaying a relationship between a nozzle speed in the Y-axis direction and a time, and a lower graph in FIG. 38 is a graph displaying a relationship between a magnitude of a nozzle translational speed and a time. A, B, C of FIG. 38 correspond to A, B, C of FIG. 37. In the lower graph in FIG. 38, the "magnitude of the nozzle translational speed" refers to a magnitude of a velocity vector calculated as a combination of movement speed of each XY axis (or each XYZ axis).

The modeling track generation unit 80 may generate all movement target positions between a start point and an end point as a 3D print track, or may generate only at least one movement target position from a current position (a current position of the discharging nozzle 18). In the fourth embodiment, the latter will be described as an example. The piston straight-ahead actuator drive device 81 controls the motors 16a, 17a according to control from the control device 7A (based on the drive command value output from the control device 7A).

Functional Configuration of 3D Printer

Figure 39:
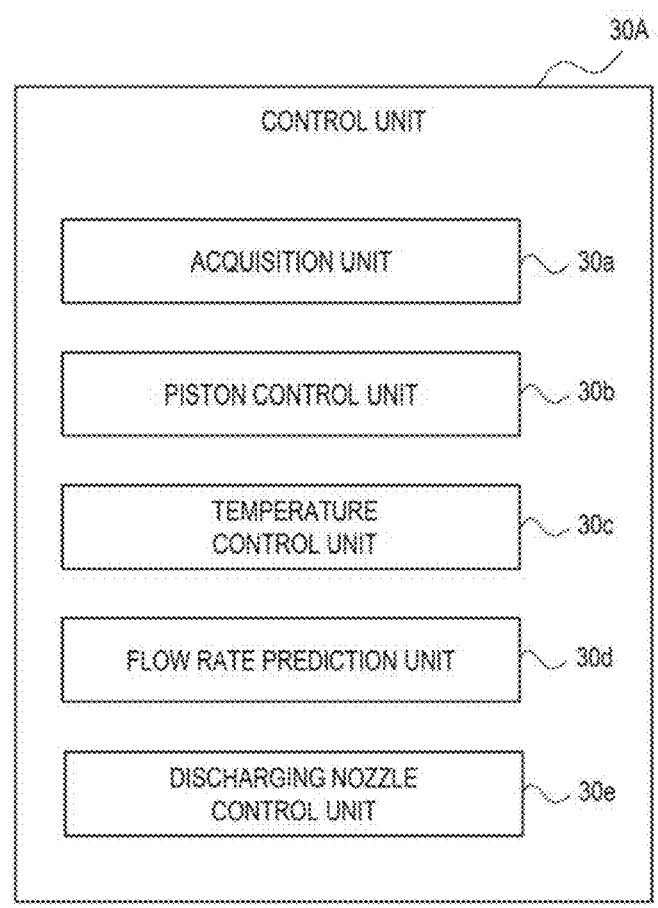
FIG. 39 is a functional block diagram of the 3D printer.

FIG. 39 is a functional block diagram of the 3D printer 300. The control unit 30A (the processor) of the control device 7A mainly functions as an acquisition unit 30a, a piston control unit 30b, a temperature control unit 30c, a flow rate prediction unit 30d, and a discharging nozzle control unit 30e, as illustrated in FIG. 39, by executing a predetermined program read from the storage unit 20 using the memory 40 (for example, a RAM). Some or all of these may be implemented in hardware.

The acquisition unit 30a acquires the movement speed (the translational speed) of the discharging nozzle 18.

The piston control unit 30b controls the movement (a movement direction, the movement speed) of the first piston 14 (or the second piston 15). Specifically, the piston control unit 30b controls the movement of the first piston 14 (or the second piston 15) based on the movement speed (the translational speed) of the discharging nozzle 18. In more detail, the piston control unit 30b controls the movement speed of the first piston 14 (or the second piston 15) by controlling the piston straight-ahead actuator drive device 81 such that the dimension of the resin bead RB is constant.

The temperature control unit 30c controls the temperature of the molten resin stored in the cylinders 11, 12 (the plasticization chambers S2, S4). The flow rate prediction unit 30d predicts the discharged flow rate of the molten resin discharged from the discharging nozzle 18. The discharging nozzle control unit 30e controls the movement of the discharging nozzle 18. For example, the discharging nozzle control unit 30e controls, based on the predicted discharged flow rate, the movement speed (the translational speed) of the nozzle 18 by controlling the XY-axis drive device 50 (an example of the movement unit of the present disclosure) such that the dimension of the resin bead RB is constant.

Overview of Operation of 3D Printer

Figure 40:
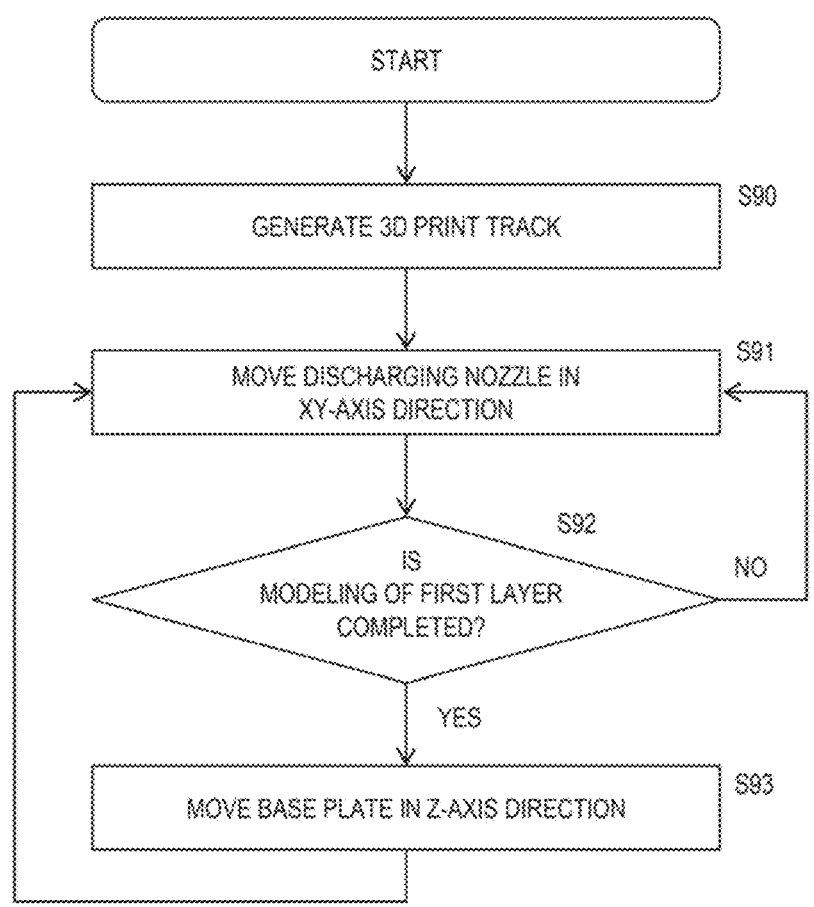
FIG. 40 is a schematic flowchart of an operation of the 3D printer.

Next, an overview of the operation of the 3D printer 300 of a fourth embodiment will be described. FIG. 40 is a schematic flowchart of an operation of the 3D printer 300. The following processes are implemented when the control unit 30A (the processor) executes a predetermined program read from the storage unit 20 using the memory 40 (for example, a RAM).

First, a 3D print track is generated (step S90). The 3D print track is generated when the modeling track generation unit 80 executes a predetermined process on the modeling model MD.

Next, the discharging nozzle 18 moves in the XY-axis direction (step S91). This is implemented when the control device 7A (the discharging nozzle control unit 30e) outputs the drive command value for moving the injection molding machine 2A (the discharging nozzle 18) according to the 3D print track (the modeling track) to the XY-axis drive device 50 (the gantry drive device), and the XY-axis drive device 50 moves the injection molding machine 2A (the discharging nozzle 18) in the XY-axis direction according to the control from the control device 7A (based on the drive command value output from the control device 7A).

The process of step S91 is executed until the modeling of the 3D print track (the modeling track) of one layer is completed (step S92: YES).

Next, when the modeling of the 3D print track (the modeling track) of one layer is completed (step S92: YES), the base plate 4 is moved in the Z-axis direction (the upward direction in FIG. 37) by a predetermined amount to model the 3D print track of the next layer (step S93). This is implemented when the control device 7A outputs the drive command value for moving the base plate 4 in the Z-axis direction by the predetermined amount to the Z-axis drive device 60, and the Z-axis drive device 60 moves the base plate 4 in the Z-axis direction (the upward direction in FIG. 37) by a predetermined amount according to the control from the control device 7A (based on the drive command value output from the device 7A).

The processes of steps S91 to S93 are repeatedly executed until the targeted three-dimensionally modeled object is completed.

In steps S91 to S93, the resin raw material M (the resin pellets (plural)) supplied to a resin raw material supply chamber S1 (the first space S1 in the cylinder 11) is plasticized when the first piston 14 moves in the direction (in FIG. 14, the upward direction) away from the discharging nozzle 18, and the molten resin, which is the plasticized resin raw material M, is stored in the plasticization chamber S2 (the second space S2 in the cylinder 11). The resin raw material supply chamber S1 is provided on the side (the upper side in FIG. 14) opposite to the discharging nozzle 18 side with respect to the first piston 14, and the plasticization chamber S2 is provided on the discharging nozzle 18 side (the lower side in FIG. 14) with respect to the first piston 14.

In other words, a plurality of groove portions 14f (hereinafter, referred to as torpedo grooves 14f) linearly extending in the Z-axis direction is formed on an outer circumferential surface of the first piston 14 (see FIG. 7), and the resin raw material M (the resin pellets (plural)) is melted due to friction at the time of passing through the torpedo grooves 14f when the first piston 14 on which the torpedo grooves 14f (plural) are formed moves in a direction away from the discharging nozzle 18, and is stored as a molten resin in the plasticization chamber S2 below the first piston 14. The molten resin stored in the plasticization chamber S2 is controlled such that the temperature becomes a temperature suitable for the molten resin stored in the plasticization chamber S2 (a temperature at which a molten state is maintained without overheating) by controlling the first heating unit 61 using the temperature control unit 30c.

Similarly, in steps S91 to S93, the resin raw material M (the resin pellets (plural)) supplied to a resin raw material supply chamber S3 (the first space S3 in the cylinder 12) is plasticized when the second piston 15 moves in the direction (in FIG. 14, the upward direction) away from the discharging nozzle 18, and the molten resin, which is the plasticized resin raw material M, is stored in a plasticization chamber S4 (the second space S4 in the cylinder 12). The resin raw material supply chamber S3 is provided on the side (the upper side in FIG. 14) opposite to the discharging nozzle 18 side with respect to the second piston 15, and the plasticization chamber S4 is provided on the discharging nozzle 18 side (the lower side in FIG. 14) with respect to the second piston 15.

In other words, a plurality of groove portions 15f (hereinafter, referred to as torpedo grooves 15f) linearly extending in the Z-axis direction is formed on an outer circumferential surface of the second piston 15 (see FIG. 7), and the resin raw material M (the resin pellets (plural)) is melted due to friction at the time of passing through the torpedo grooves 15f when the second piston 15 on which the torpedo grooves 15f (plural) are formed moves in a direction away from the discharging nozzle 18, and is stored as a molten resin in the plasticization chamber S4 in the downward direction of the second piston 15. The molten resin stored in the plasticization chamber S4 is controlled such that the temperature becomes a temperature suitable for the molten resin stored in the plasticization chamber S4 (a temperature at which a molten state is maintained without overheating) by controlling the second heating unit 62 using the temperature control unit 30c.

Further, in steps S91 to S93, when the first piston 14 moves in the direction (the downward direction in FIG. 14) of approaching the discharging nozzle 18 and pressurizes the molten resin stored in the plasticization chamber S2, the molten resin stored in the plasticization chamber S2 is discharged from the discharging nozzle 18.

At that time, the first piston 14 has a reverse flow prevention function (a check ring 14b, see FIGS. 7, 14, and the like), and thus it is possible to pressurize the molten resin stored in the plasticization chamber S2 without a reverse flow of the molten resin in the plasticization chamber S2 into the resin raw material supply chamber S1.

Similarly, in steps S91 to S93, when the second piston 15 moves in the direction (the downward direction in FIG. 14) of approaching the discharging nozzle 18 and pressurizes the molten resin stored in the plasticization chamber S4, the molten resin stored in the plasticization chamber S4 is discharged from the discharging nozzle 18.

At that time, the second piston 15 has a reverse flow prevention function (the check ring 15b, see FIGS. 7, 14, and the like), and thus it is possible to pressurize the molten resin stored in the plasticization chamber S4 without a reverse flow of the molten resin in the plasticization chamber S4 into the resin raw material supply chamber S3.

The first piston 14 and the second piston 15 alternately move in the direction (that is, in an opposite phase) of approaching the discharging nozzle 18 to pressurize the molten resin stored in the plasticization chambers S2, S4. At that time, discharging periods partially lies over each other (overlaps). For this reason, it is possible to continuously discharge the molten resin stored in the plasticization chambers S2, S4 from the discharging nozzle 18a without interruption.

Details of Operation of 3D Printer

Next, details of the operation of the 3D printer 300 of the fourth embodiment will be described.

Figure 41:
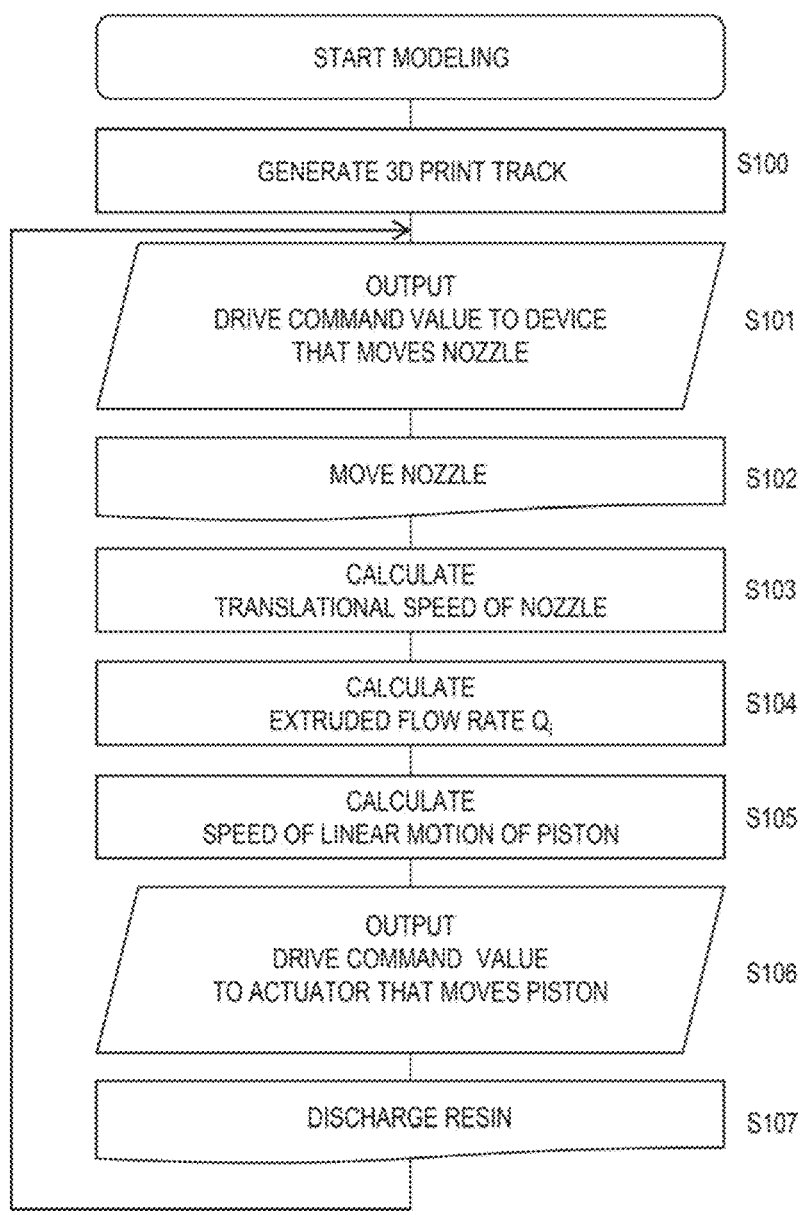
FIG. 41 is a detailed flowchart of the operation of the 3D printer.

FIG. 41 is a detailed flowchart of the operation of the 3D printer 300. The following processes are implemented when the control unit 30A (the processor) executes a predetermined program read from the storage unit 20 using the memory 40 (for example, a RAM).

First, a 3D print track is generated (step S100). The 3D print track is generated when the modeling track generation unit 80 executes a predetermined process on the modeling model MD. Next, the drive command value is output to the device (the XY-axis drive device 50) that moves the discharging nozzle (step S101). Specifically, the control device 7A (the discharging nozzle control unit 30e) outputs the drive command value for moving the injection molding machine 2A (the discharging nozzle 18) according to the 3D print track (the modeling track) to the XY-axis drive device 50 (the gantry the drive device). The movement speed of the discharging nozzle 18 is input according to, for example, the flowchart of FIG. 27 (step S40) and calculated (step S46). As the movement speed of the discharging nozzle 18 (the movement speed at the start of movement), a value that is input as an initial value may be used, or a value stored in a storage unit, such as a data table, may be used.

As such, the discharging nozzle 18 moves (step S102). Specifically, the XY-axis drive device 50 moves the injection molding machine 2A (the discharging nozzle 18) in the XY-axis direction according to the control from the control device 7A (based on the drive command value output from the control device 7A).

Next, a translational speed $V_R$ of the discharging nozzle 18 is calculated (step S103). The translational speed $V_R$ of the discharging nozzle 18 may be calculated (measured) using a laser measuring device and the like, or may be calculated using another method. For example, it may be calculated by the discharging nozzle movement distance/a discharging nozzle movement time between two different points. The acquisition unit 30a acquires the movement speed (the translational speed $V_R$) of the discharging nozzle 18 that is calculated as above. The movement speed of the discharging nozzle 18 (the translational speed $V_R$) may be acquired from a controller (not shown) of the XY-axis drive device 50 (the gantry drive device).

Next, an extruded flow rate $Q_i$ is calculated (step S104). The extruded flow rate $Q_i$ refers to a flow rate (an indicated flow rate) at which the dimension (for example, the diameter) of the resin bead RB discharged from the discharging nozzle 18 is constant. The extruded flow rate $Q_i$ can be calculated by, for example, the following equation 22:

$$Q_i = V_R \times S \quad \text{(Equation 22)}$$

Figure 42:
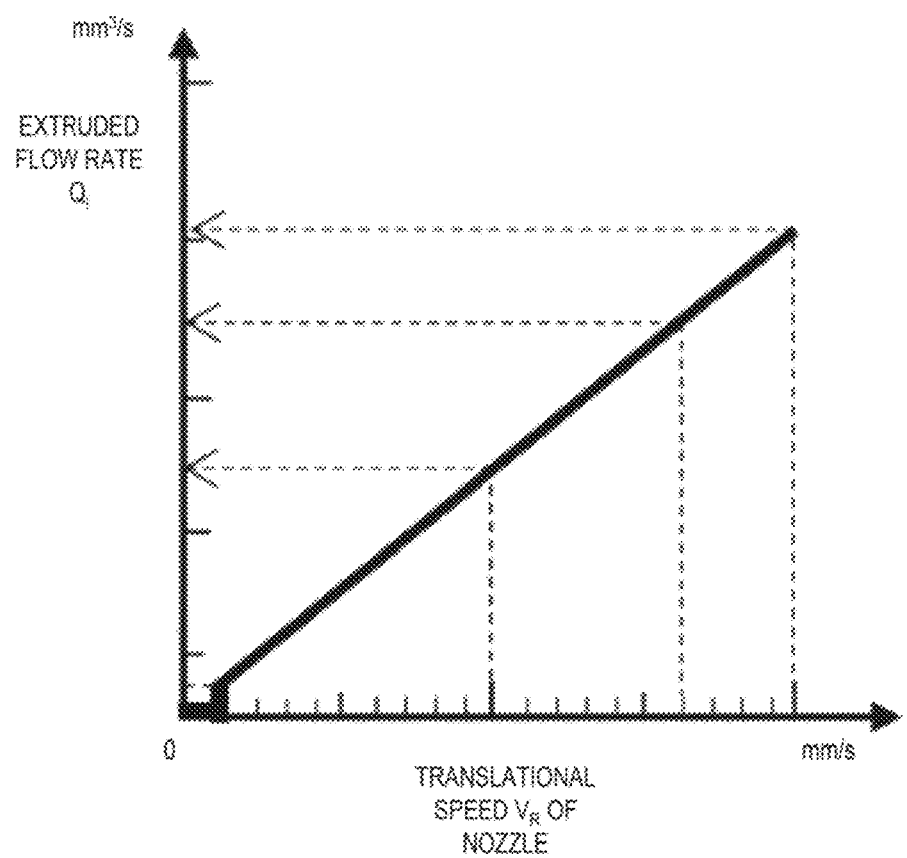
FIG. 42 is a graph displaying a relationship between an extruded flow rate and a translational speed of the discharging nozzle.

Here, $V_R$ is the translational speed of the discharging nozzle 18 calculated and acquired in step S103, and S is the size of the cross-sectional area of the resin bead RB discharged from the discharging nozzle 18. FIG. 42 is a graph displaying a relationship between the extruded flow rate $Q_i$ and the translational speed $V_R$ of the discharging nozzle 18.

Next, the speed $V_r$ of a linear motion of the first piston 14 (or the second piston 15) is calculated (step S105). The speed $V_r$ of the linear motion of first piston 14 (or the second piston 15) refers to a speed of the first piston 14 (or the second piston 15) used for setting the flow rate of the molten resin discharged from the discharging nozzle 18 to the flow rate $Q_i$ (the indicated flow rate), that is, the indicated movement speed. The speed $V_r$ (the indicated movement speed) of the linear motion of the first piston 14 (or the second piston 15) can be calculated by the equation 17.

Next, a drive command value is output to an actuator that moves the first piston 14 (or the second piston 15) (step S106). Specifically, the control device 7A (the piston control unit 30b) outputs, to the piston straight-ahead actuator drive device 81, the drive command value for setting the movement speed of the first piston 14 (or the second piston 15) to the indicated movement speed $V_r$ calculated in step S105, and the piston straight-ahead actuator drive device 81 controls the motor 16a (or the motor 17a) according to the control from the control device 7A (based on the drive command value output from the control device 7A).

Next, the molten resin is discharged from the discharging nozzle 18 (step S107). Specifically, when the piston straight-ahead actuator drive device 81 controls the motor 16a (or the motor 17a) according to the control from the control device 7A (based on the drive command value output from the control device 7A), the first piston 14 (or the second piston 15) moves in the direction (the downward direction in FIG. 14) of approaching the discharging nozzle 18 and pressurizes the molten resin stored in the plasticization chamber S2 (or the plasticization chamber S4). As such, the molten resin (a molten resin of a portion of the extruded flow rate $Q_i$) is discharged from the discharging nozzle 18.

The processes of steps S101 to S107 are repeatedly executed until the targeted three-dimensionally modeled object is completed. For example, it is executed every predetermined time (for example, 0.1 second). As a result, the dimension of the resin bead RB discharged from the discharging nozzle 18 is controlled such that the dimension is constant.

As described above, by controlling, based on the movement speed (the translational speed $V_R$) of the discharging nozzle 18, the speed $V_r$ of the linear motion of the first piston 14 (or the second piston 15) that linearly reciprocates in the cylinder 11 (or the cylinder 12) that stores the molten resin, it is possible to control the dimension of the resin bead RB such that the dimension is constant (substantially constant).

Specific Examples of Modeling

Figure 43:
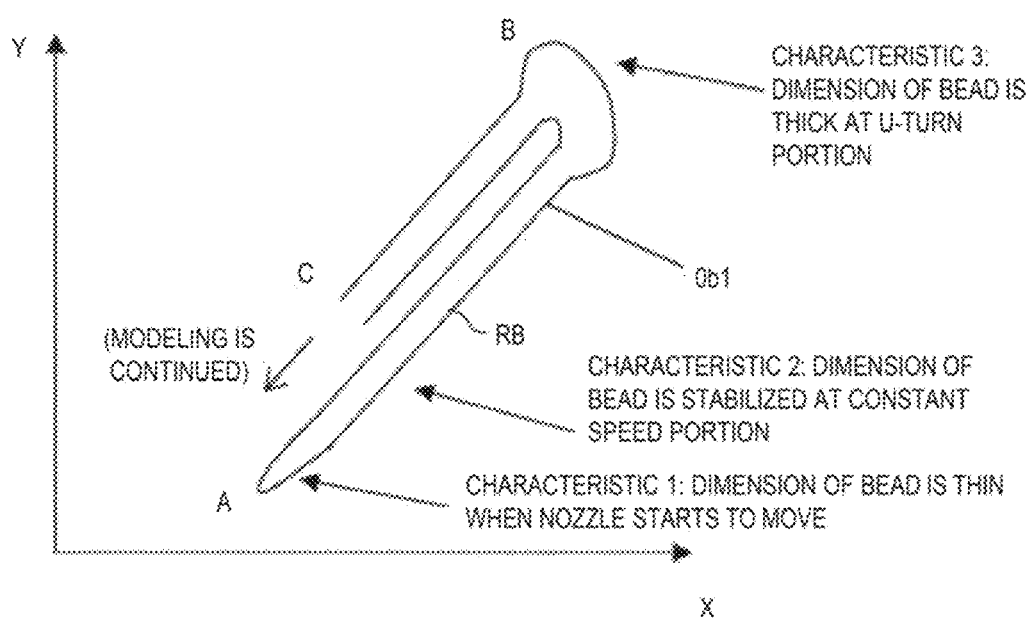
FIG. 43 is an example of a three-dimensionally modeled object (a laminated modeled body) modeled according to the flowchart of FIG. 41.

Next, specific examples of modeling will be described. FIG. 43 is an example of the three-dimensionally modeled object Ob1 (a laminated modeled body) modeled according to the flowchart of FIG. 41. A, B, C of FIG. 43 correspond to A, B, C of FIGS. 37 and 38.

Referring to FIG. 43, the dimension of the resin bead RB becomes thinner than a target thickness at a portion at which the discharging nozzle 18 starts to move and accelerates (see a characteristic 1 in FIG. 43) and becomes thicker than the target thickness at a U-turn portion at which the discharging nozzle 18 decelerates and then accelerates (see a characteristic 3 FIG. 43), but becomes the target thickness at a portion at which the discharging nozzle 18 moves at a constant speed (see a characteristic 2 in FIG. 43).

Next, advantages of the fourth embodiment will be further described in comparison with comparative examples 4, 5.

Comparative Example 4

The comparative example 4 (US 2018-0056602 A) has the following issues.

Issue 1

To stabilize the dimension of the resin bead, both a rotational speed of an extruder screw and a rotational speed of a gear of a gear pump should be adjusted based on an increase or decrease of a translational speed of an applicator head. Since there are two parts to be controlled destinations, it is complicated and requires man-hours and costs for adjustment. Further, there may be a region where there is an adjustment limit for keeping the dimension of the resin bead constant.

The reason why the issue 1 occurs is as follows. It is caused by characteristics of the following two structures. First, the plasticization by the screw and the flow rate adjustment by the gear pump are executed at the same time. Second, the screw and the gear pump are connected in series by one flow path.

Since the gear pump and the screw are connected by one flow path, the molten resin coming out of the screw should be immediately adjusted by the gear pump, and there may be an adjustment limit even when trying to control flow rates at both rotational speeds. For example, when the translational speed of the applicator head is very low, the rotational speed of the gear pump is adjusted to a low value and the rotational speed of the screw positioned on the upstream of the gear pump is also set to a low value. When it is too low, "since most of the melting energy is generated by the rotation of the screw of an extruder" (see paragraph 5 of detailed description of the comparative example 4), and thus the resin material is insufficiently melted, the outflow rate is insufficient. Therefore there is an issue that the resin bead becomes thinner.

Issue 2

There is an issue that the temperature of the molten resin rises. (In a region in which the flow rate is extremely large), the resin is denatured and a modeling defect occurs, or a time until the resin bead hardens becomes longer, and thus it is necessary to extend a time until a next layer is modeled. Therefore, there is an issue that a modeling time is extended.

The reason why the issue 2 occurs is as follows. When the translational speed of the applicator head is high, a large flow rate is also required, but "since most of the melting energy is generated by the rotation of the screw of an extruder" (see paragraph 5 of detailed description of the comparative example 4), "an amount of thermal energy generated to melt a fluid material, such as a thermoplastic resin, is also changed. As a result, the temperature rises . . . " (see paragraph 5 of detailed description of the comparative example 4).

Issue 3

In a region in which a change rate of translational speed of the nozzle is large (acceleration is high), the increase of the flow rate is delayed, and it is necessary to compensate using a pressure sensor to keep the dimensions of the resin bead constant, which complicates control (see claims 14 to 16 of the comparative example 4).

The reason why the issue 3 occurs is as follows. A rapid change in the rotational speed of the extruder screw does not immediately occur in a rapid change in a flow speed of a molten fluid material. There is a substantial delay between the change in the speed of the screw of the extruder and the change in the flow speed of the molten material as a result of the change (see paragraph 5 of detailed description of the comparative example 4).

Advantages of the fourth embodiment over the comparative example 4 are as follows. In the fourth embodiment, control is executed to shift the timing of plasticization and flow rate adjustment, and in order to implement this, the structure is set such that the gear pump and the screw are not connected in series by one flow path. Using a method that does not use the gear pump and the screw, it is possible to form a molten resin from the resin raw material M (the resin pellet) and to adjust and discharge the flow rate thereof. Further, it is possible to temporarily store the molten resin and adjust the temperature. As such, the issue 1 and the issue 2 are solved.

Further, in the fourth embodiment, the movement speed (the translational speed) of the discharging nozzle 18 is controlled based on the actual discharged flow rate of the molten resin. As such, the issue 3 is solved.

Comparative Example 5

The comparative example 5 (Japanese Unexamined Patent Application Publication No. 2020-82558) has the following issues.

Issue 1

There are many components used for executing a suction operation, which complicates control. As a result, a cost of the apparatus is increased.

The reason why the issue 1 occurs is as follows. To execute the suction operation, the following two operations are required. First, a butterfly valve 72 is turned to a closed state. Second, a suction unit 75 is controlled and pulled.

Issue 2

Three actuators are required, which complicates control. As a result, the cost of the apparatus is increased.

The reason why the issue 2 occurs is as follows. It is because actuators for screw drive, butterfly valve drive, and suction unit 75 drive are required.

Issue 3

When the screw is continuously turned while the butterfly valve 72 is closed, the resin may overflow, or when the pressure rises too much and the butterfly valve 72 is opened the next time, more resin than necessary may come out of the discharging hole.

Issue 4

When the screw is stopped to avoid the issue 3, the resin does not immediately come out next time the resin is required to come out.

The reason why the issues 3, 4 occur is as follows. It is because the extruder (a plasticization unit) and the gear pump (a flow rate control unit) are arranged in series.

Advantages of the fourth embodiment over the comparative example 5 are as follows. In the fourth embodiment, the plasticization unit and the flow rate control unit are composed of the same members (the first piston 14, the second piston 15), and the molten resin is discharged by a forward movement of the pistons 14, 15, the flow rate is controlled at that speed, and the molten resin is sucked by a backward operation. As such, the issues 1, 2 are solved. Further, in the fourth embodiment, the plasticization unit and the flow rate control unit are composed of the same members (the first piston 14, the second piston 15), and the plasticization and the discharging are timely delayed (the plasticization is executed first and the temporarily stored molten resin is discharged afterwards). As such, the issues 3, 4 are solved.

As described above, with the fourth embodiment, it is possible to improve the controllability of the flow rate of the molten resin discharged from the discharging nozzle 18.

This is because the flow rate of the molten resin is controlled (simplification of the flow control) by controlling the movement of the first piston 14 (or the second piston 15) that linearly reciprocates in the cylinder 11 (or the cylinder 12) that stores the molten resin, not by controlling the rotations of both the extruder (the screw) and the gear pump.

Further, with the fourth embodiment, by controlling, based on the movement speed (the translational speed) of the discharging nozzle 18, the speed $V_r$ of the linear motion of the first piston 14 (or the second piston 15) that linearly reciprocates in the cylinder 11 (or the cylinder 12) that stores the molten resin, it is possible to control the dimension of the resin bead RB such that the dimension is constant (substantially constant).

Further, with the fourth embodiment, after the resin raw material M is temporarily plasticized and stored, it is possible to discharge the molten resin from the discharging nozzle 18 by pressurizing the stored molten resin using the first piston 14 (or the second piston 15) that linearly reciprocates. As such, the controllability is improved, as compared with US 2018-0056602 A in which the rotations of both the extruder (screw) and the gear pump are controlled at the same time. Further, it is possible to execute the plasticization of the resin raw material M (the generation and the storage of the molten resin) and the control of the flow rate of the stored molten resin using the first piston 14 (or the second piston 15) that linearly reciprocates. Further, since it is possible to execute the plasticization of the resin raw material M and the control of the flow rate of the stored molten resin using the first piston 14 (or the second piston 15), it is not necessary to separately provide a mechanism used for plasticizing the resin raw material M.

Further, with the fourth embodiment, it is possible to control the temperature of the molten resin stored in the cylinder 11 (or the cylinder 12) such that the temperature becomes a temperature suitable for the molten resin (a temperature at which a molten state is maintained without overheating).

Further, with the fourth embodiment, since a plurality of combinations of cylinders and pistons (for example, a combination of the cylinder 11 and the first piston 14 and a combination of the cylinder 12 and the second piston 15) is provided, the molten resin can be continuously discharged without interruption. Further, with the fourth embodiment, it is possible to provide a 3D printer 300 in which a stabilized dimension of the resin bead RB is obtained with a simpler nozzle structure and a simpler control method within a range in which the change rate of the movement speed (the translational speed) of the discharging nozzle 18 is not excessively large.

Fifth Embodiment

Next, as a fifth embodiment, another operation example 1 of the 3D printer 300 of the fourth embodiment will be described.

Another Operation Example 1 of 3D Printer

Figure 44:
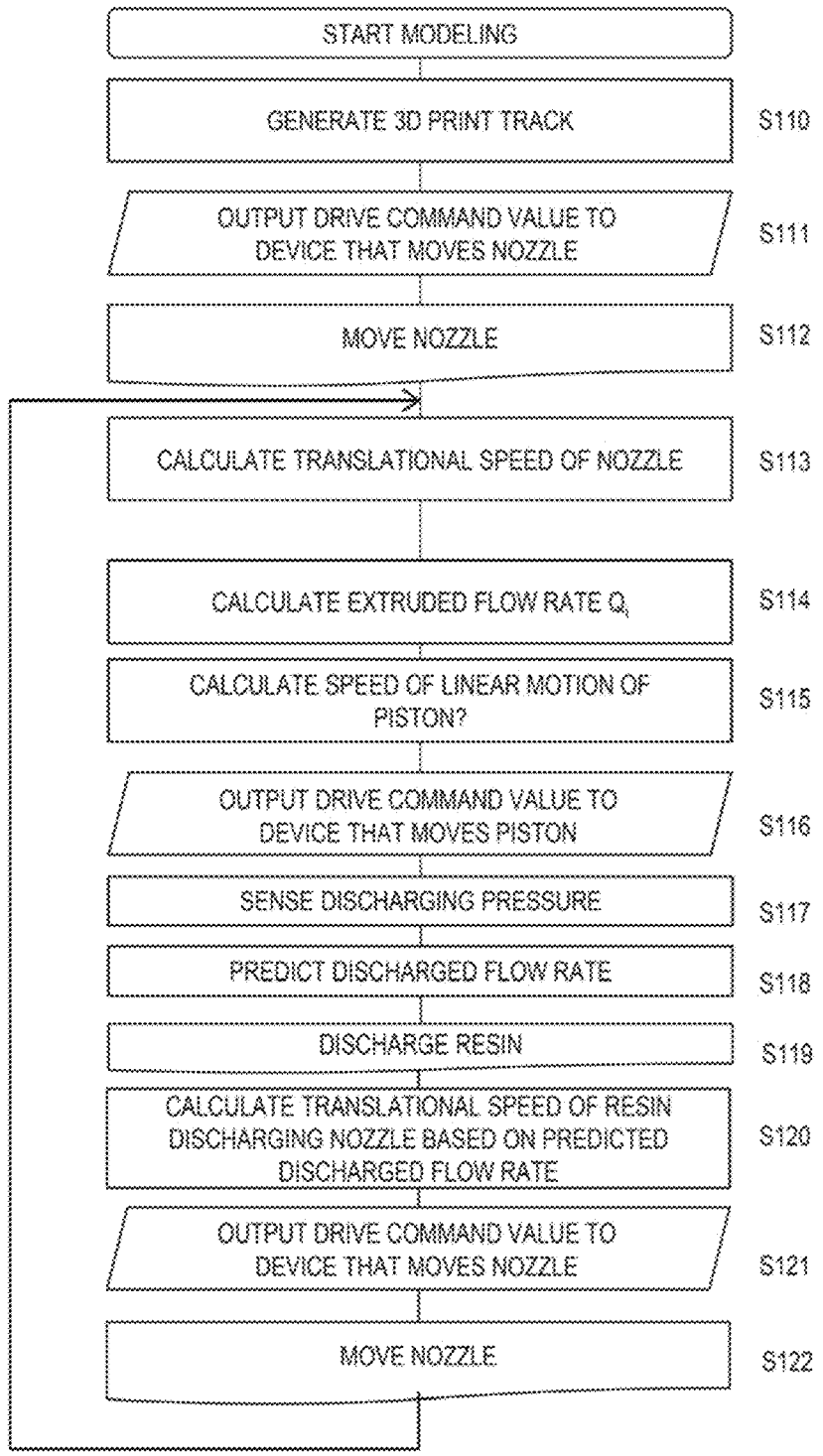
FIG. 44 is a detailed flowchart of another operation example 1 of the 3D printer.

FIG. 44 is a detailed flowchart of another operation example 1 of the 3D printer 300. The following processes are implemented when the control unit 30A (the processor) executes a predetermined program read from the storage unit 20 using the memory 40 (for example, a RAM).

First, a 3D print track is generated (step S110). The 3D print track is generated when the modeling track generation unit 80 executes a predetermined process on the modeling model MD. Next, the drive command value is output to the device (the XY-axis drive device 50) that moves the discharging nozzle 18 (step S111). Specifically, the control device 7A (the discharging nozzle control unit 30e) outputs the drive command value for moving the injection molding machine 2A (the discharging nozzle 18) according to the 3D print track (the modeling track) to the XY-axis drive device 50 (the gantry the drive device).

As such, the discharging nozzle 18 moves (step S112). Specifically, the XY-axis drive device 50 moves the injection molding machine 2A (the discharging nozzle 18) in the XY-axis direction according to the control from the control device 7A (based on the drive command value output from the control device 7A).

Next, a translational speed $V_R$ of the discharging nozzle 18 is calculated (step S113). The translational speed $V_R$ of the discharging nozzle 18 may be calculated (measured) using a laser measuring device and the like, or may be calculated using another method. For example, it may be calculated by the discharging nozzle movement distance/the discharging nozzle movement time between two different points. The acquisition unit 30a acquires the movement speed (the translational speed $V_R$) of the discharging nozzle 18 that is calculated as above. The movement speed (the translational speed $V_R$) of the discharging nozzle 18 may be acquired from a controller (not shown) of the XY-axis drive device 50 (the gantry drive device).

Next, the extruded flow rate $Q_i$ is calculated (step S114). The extruded flow rate $Q_i$ refers to a flow rate (an indicated flow rate) at which the dimension (for example, the diameter) of the resin bead RB discharged from the discharging nozzle 18 is constant. The extruded flow rate $Q_i$ can be calculated by, for example, the following equation 22:

$$Q_i = V_R \times S \qquad \text{(Equation 22)}$$

Here, $V_R$ is the translational speed of the discharging nozzle 18 calculated and acquired in step S113, and S is the size of the cross-sectional area of the resin bead RB discharged from the discharging nozzle 18. FIG. 42 is a graph displaying a relationship between the extruded flow rate $Q_i$ and the translational speed $V_R$ of the discharging nozzle 18.

Next, the speed $V_r$ of a linear motion of the first piston 14 (or the second piston 15) is calculated (step S115). The speed $V_r$ of the linear motion of first piston 14 (or the second piston 15) refers to a speed of the first piston 14 (or the second piston 15) used for setting the flow rate of the molten resin discharged from the discharging nozzle 18 to the flow rate $Q_i$ (the indicated flow rate), that is, the indicated movement speed. The speed $V_r$ of the linear motion of the first piston 14 (or the second piston 15) (the indicated movement speed) can be calculated by the equation 17.

Next, a drive command value is output to an actuator that moves the first piston 14 (or the second piston 15) (step S116). Specifically, the control device 7A (the piston control unit 30b) outputs, to the piston straight-ahead actuator drive device 81, the drive command value for setting the movement speed of the first piston 14 (or the second piston 15) to the indicated movement speed $V_r$ calculated in step S115, and the piston straight-ahead actuator drive device 81 controls the motor 16a (or the motor 17a) according to the control from the control device 7A (based on the drive command value output from the control device 7A).

Next, the actually measured pressure $P_r$ is sensed (step S117). The actually measured pressure $P_r$ is sensed (detected) by the first pressure detection unit 65, the second pressure detection unit 66.

Next, the discharged flow rate (the predicted outflow rate $Q_P$) is predicted (step S118). The discharged flow rate (the predicted outflow rate $Q_P$) is predicted (calculated) by the flow rate prediction unit 30d. The predicted outflow rate $Q_P$ can be calculated by, for example, the equation 11.

Next, the molten resin is discharged from the discharging nozzle 18 (step S119). Specifically, when the piston straight-ahead actuator drive device 81 controls the motor 16a (or the motor 17a) according to the control from the control device 7A (based on the drive command value output from the control device 7A), the first piston 14 (or the second piston 15) moves in the direction (the downward direction in FIG. 14) of approaching the discharging nozzle 18 and pressurizes the molten resin stored in the plasticization chamber S2 (or the plasticization chamber S4). As such, the molten resin (a molten resin of a portion of the extruded flow rate $Q_i$) is discharged from the discharging nozzle 18.

Next, the translational speed $V_R$ of the discharging nozzle 18 is calculated based on the predicted discharged flow rate (the predicted outflow rate $Q_P$) (step S120). The translational speed $V_i$ of the discharging nozzle 18 refers to the movement speed (the translational speed) of the discharging nozzle 18 in which the dimension (for example, the diameter) of the resin bead RB discharged from the discharging nozzle 18 is constant. The translational speed $V_R$ of the discharging nozzle 18 can be calculated by, for example, the following equation 23:

$$V_R = Q_P/S \quad \text{(Equation 23)}$$

Figure 45:
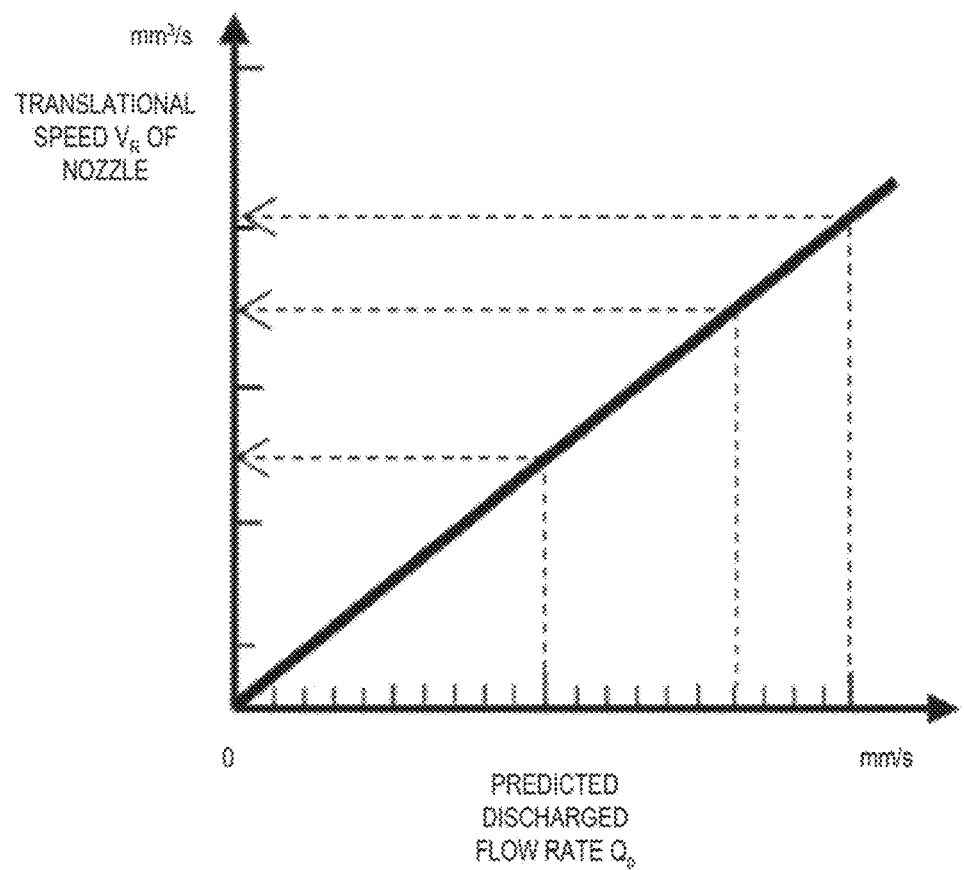
FIG. 45 is a graph displaying a relationship between a translational speed of the discharging nozzle and the predicted discharged flow rate (the predicted flow rate)

Here, $Q_N$ is the discharged flow rate (the predicted outflow rate) predicted in step S118, and S is the size of the cross-sectional area of the resin bead RB discharged from the discharging nozzle 18. FIG. 45 is a graph displaying a relationship between the translational speed $V_R$ of the discharging nozzle 18 and the predicted discharged flow rate $Q_P$ (the predicted outflow rate).

Next, the drive command value is output to the device (the XY-axis drive device 50) that moves the discharging nozzle 18 (step S121). Specifically, the control device 7A (the discharging nozzle control unit 30e) outputs, to the XY-axis drive device 50 (the gantry drive device), the drive command value for moving the injection molding machine 2A (the discharging nozzle 18) at the translational speed $V_R$ calculated in step S120.

As such, the discharging nozzle 18 moves (step S122). Specifically, the XY-axis drive device 50 moves the injection molding machine 2A (the discharging nozzle 18) in the XY-axis direction according to the control from the control device 7A (based on the drive command value output from the control device 7A).

The processes of steps S113 to S122 are repeatedly executed until the targeted three-dimensionally modeled object is completed. For example, it is executed every predetermined time (for example, 0.1 second). As a result, the dimension of the resin bead RB discharged from the discharging nozzle 18 is controlled such that the dimension is constant.

As described above, the movement speed (the translational speed) of the discharging nozzle 18 on the 3D printer 300 is controlled. At that time, after the flow rate $Q_i$ extruded from the discharging nozzle 18 is determined based on the target movement speed (the translational speed) of the discharging nozzle 18, the speed $V_r$ of the linear motion of the first piston 14 (or the second piston 15) is controlled, the pressure $P_r$ of the molten resin immediately before coming out of the discharging nozzle 18 (the discharging hole), which is generated as a result is sensed, the actually discharged flow rate $Q_P$ is predicted from the pressure $P_r$, the temperature of the molten resin, and other constants, and the movement speed (the translational speed) of the discharging nozzle 18 on the 3D printer 300 is controlled based on the predicted discharged flow rate $Q_P$ such that the dimension of the resin bead RB is constant. In this manner, it is possible to control the dimension of the resin bead RB by controlling the movement speed (the translational speed) of the discharging nozzle 18 based on the predicted discharged flow rate $Q_P$ (the predicted outflow rate) such that the dimension is constant (substantially constant).

Specific Examples of Modeling

Figure 46:
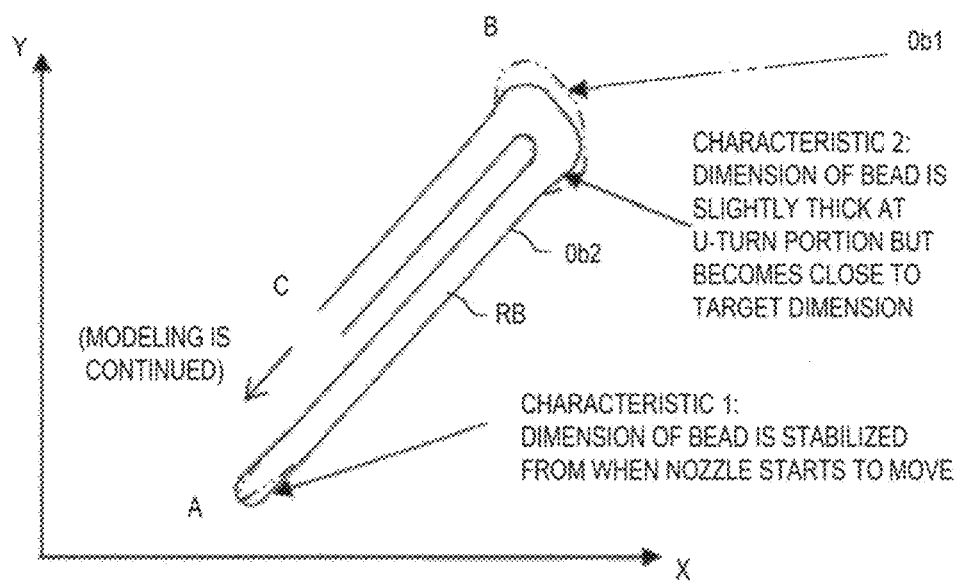
FIG. 46 is an example of a three-dimensionally modeled object (a laminated modeled body) modeled according to the flowchart of FIG. 44.

Next, specific examples of modeling will be described. FIG. 46 is an example of the three-dimensionally modeled object Ob2 (a laminated modeled body) modeled according to the flowchart of FIG. 44. A, B, C of FIG. 46 correspond to A, B, C of FIGS. 37, 38.

Referring to FIG. 46, it can be seen that the dimension of the resin bead RB is slightly thicker than the target thickness at the U-turn portion (see characteristic 2 in FIG. 46) at which the discharging nozzle 18 decelerates and then accelerates, but becomes the target thickness at a portion at which the discharging nozzle 18 starts to move and accelerates (see characteristic 1 in FIG. 46), and that the dimension of the resin at the U-turn portion (see characteristic 2 in FIG. 46) at which the discharging nozzle 18 decelerates and then accelerates becomes thinner than that at the U-turn portion of the fourth embodiment (a reference sign Ob1 in FIG. 43).

As described above, with the fifth embodiment, it is possible to improve the controllability of the flow rate of the molten resin discharged from the discharging nozzle 18. Further, a difference between the indicated flow rate and the actually discharged flow rate may be generated during, for example, acceleration/deceleration of the nozzle. However, even in this case, the movement speed (the translational speed) of the discharging nozzle 18 is controlled based on the actually discharged flow rate, and thus it is possible to provide a 3D printer 300 that can always obtain a stabilized dimension of the resin bead RB. In addition, with the fifth embodiment, the same advantageous effect as that of the fourth embodiment can be obtained.

Further, with the fifth embodiment, it is possible to control the dimension of the resin bead RB by controlling the movement speed of the discharging nozzle 18 based on the predicted discharged flow rate such that the dimension is constant (substantially constant).

Sixth Embodiment

Next, as a sixth embodiment, another operation example 2 of the 3D printer 300 of the fourth embodiment will be described.

Another Operation Example 2 of 3D Printer

Figure 47:
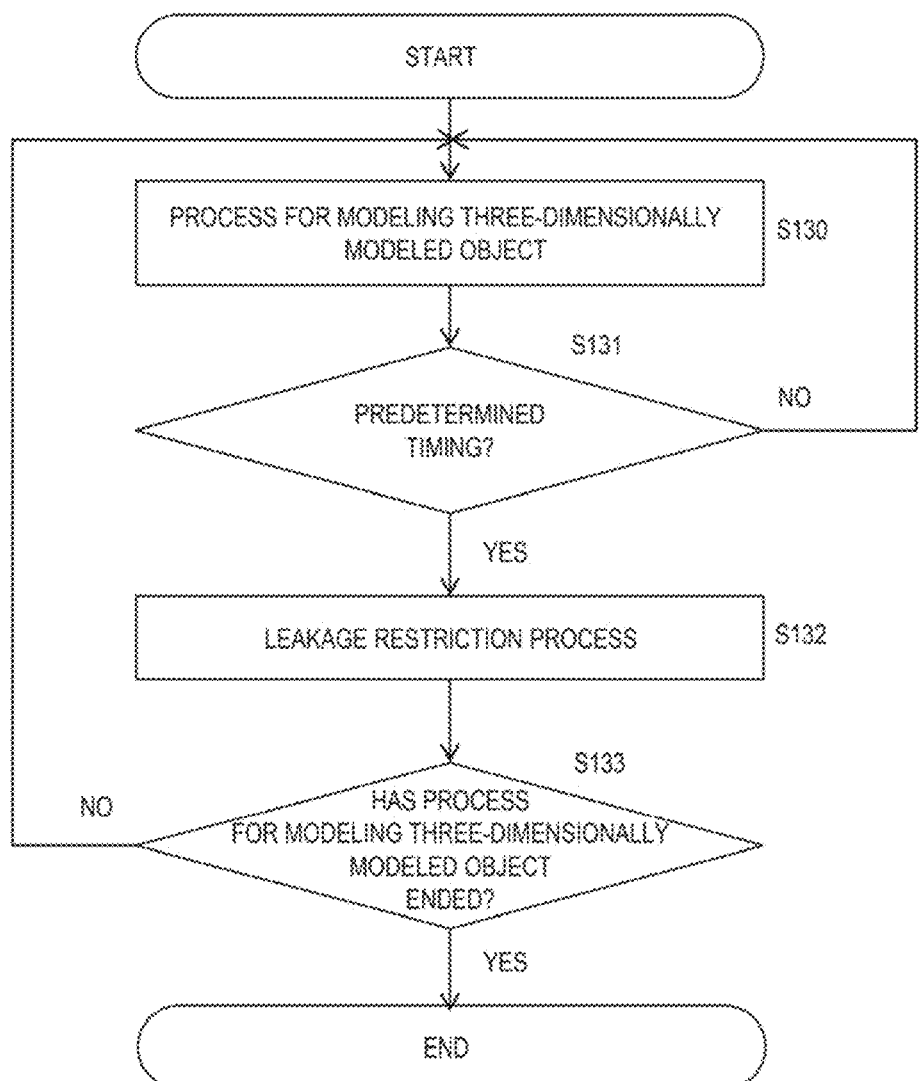
FIG. 47 is a detailed flowchart of another operation example 2 of the 3D printer.

FIG. 47 is a detailed flowchart of another operation example 2 of the 3D printer 300. The following processes are implemented when the control unit 30A (the processor) executes a predetermined program read from the storage unit 20 using the memory 40 (for example, a RAM).

First, a process for modeling a three-dimensionally modeled object is executed (step S130). The process for modeling a three-dimensionally modeled object is a process for modeling a targeted three-dimensionally modeled object using a 3D printer 300 and, for example, the process of the flowchart of FIG. 27, the process of a flowchart of FIG. 41, and the process of the flowchart of FIG. 44.

Continuing from the process for modeling a three-dimensionally modeled object, a determination is made as to whether the timing is a predetermined timing (step S131). The predetermined timing will be described below in specific examples 1, 2 of predetermined timings. As a result of the determination in step S131, when the timing is the predetermined timing (step S131: YES), a leakage restriction process is executed (step S132).

Leakage Restriction Process

The leakage restriction process is a process for moving the first piston 14 (or the second piston 15) in a direction of pulling-back (the direction in which the first piston 14 (or the second piston 15) moves away from the discharging nozzle 18) by a predetermined amount. A pulling-back movement amount (a predetermined amount) will be described below in the specific examples 1, 2 of the predetermined timings.

The processes of steps S130 to S132 are repeatedly executed until the process for modeling three-dimensionally modeled object ends (step S133: YES).

Specific Example 1 of Predetermined Timing

The specific example 1 of the predetermined timing is a timing when the movement speed (the translational speed) of the discharging nozzle 18 that is moving in the XY-axis direction while discharging the molten resin is changed from the numerical value other than zero to zero (the timing when discharging nozzle 18 that is moving is stopped).

Specific Example of Pulling-back Movement Amount

The pulling-back movement amount X (mm) of the first piston 14 (or the second piston 15) may be a value satisfying the following equation 24:

$$P_t \times V_0/K/S < X \leq (P_t+0.1) \times V_0/K/S \quad \text{(Equation 24)}$$

Here, $P_t$ (a relative pressure to the atmospheric pressure, and the unit is MPa) is the pressure of the molten resin immediately before the pulling-back, $V_0$ (mm$^3$) is the volume of the plasticization chamber, K (MPa) is the bulk modulus of the molten resin, S (mm$^2$) is the size of the cross-sectional area of the first piston 14 (or the second piston 15), and 0.1 (MPa) is the atmospheric pressure.

The equation 24 is derived by the following two equations 25, 26:

$$\Delta V = X \times S \quad \text{(Equation 25)}$$

$$P_t + 0.1 = \Delta V/V_0 \times K \quad \text{(Equation 26)}$$

With the specific example 1 of the predetermined timing, when the movement amount X (an example of the predetermined amount of the present disclosure) of the first piston 14 (or the second piston 15) in the pulling-back direction in step S132 satisfies $P_t \times V_0/K/S < X$ of the equation 24, the pressure of the molten resin in the discharging nozzle 18 (the discharging hole) becomes lower than the pressure outside the discharging nozzle 18 (the resin pressure, the atmospheric pressure), and thus the molten resin is pushed by the atmospheric pressure and retracted into the discharging nozzle 18 (the discharging hole), and thus the molten resin is restricted from leaking from the discharging nozzle 18 (the discharging hole). As such, it is possible to restrict (leakage restriction) the molten resin from being continuously discharged due to a residual pressure, gravity, or the like. As a result, it is possible to control the dimension of the resin bead RB such that the dimension is constant (substantially constant).

On the other hand, when the movement amount X of the first piston 14 (or the second piston 15) in the pulling-back direction in step S132 satisfies "$X \leq (P_t+0.1) \times V_0/K/S$" of the equation 24, the pressure of the molten resin in the discharging nozzle 18 (the discharging hole) or the plasticization chamber S2 (or the plasticization chamber S4) cannot be the absolute vacuum (the atmospheric pressure—0.1 MPa) or less. Therefore, it is possible to restrict defects from occurring at a timing of the next modeling due to the entrainment of air in the plasticization chamber S2 (or the plasticization chamber S4) or generation of air bubbles. In other words, by setting a differential pressure (the pressure outside the discharging nozzle 18—the pressure inside the discharging nozzle 18) generated when the first piston 14 (or the second piston 15) moves by the movement amount X in the pulling-back direction not to exceed the atmospheric pressure (for example, 0.1 MPa), it is possible to restrict the entrainment of air in the plasticization chamber S2 (or the plasticization chamber S4) and the generation of air bubbles. This is a condition that the present inventors have empirically found to restrict the entrainment of air in the plasticization chamber S2 (or the plasticization chamber S4) or the generation of air bubbles.

When obtaining the movement amount X (mm), the pressure $P_t$ of the molten resin immediately before pulling-back may be a value obtained by the pressure detection units 65, 66 (the pressure sensors), an approximate value of the target pressure for obtaining the flow rate, or a target pressure calculated each time.

Further, the volume of the plasticization chamber S2 (or the plasticization chamber S4) can be calculated a value obtained from a position detection tool, such as a potentiometer attached to an actuator that drives the first piston 14 (or the second piston 15), a dead volume, and the size of the cross-sectional area of the first piston 14 (or the second piston 15).

Further, the bulk modulus of the molten resin may have a value of a corresponding resin in the data table, or an approximate value representing a general resin. The atmospheric pressure may be 0.1 MPa regardless of the weather. With the specific example 1 of the movement amount of the pulling-back, it is possible to restrict the molten resin from being continuously discharged due to a residual pressure, gravity, or the like. As a result, it is possible to control the dimension of the resin bead RB such that the dimension is constant (substantially constant).

Specific Example 2 of Predetermined Timing

The specific example 2 of the predetermined timing is a timing that is a predetermined time before the timing when the movement speed (the translational speed) of the discharging nozzle 18 that is moving in the XY-axis direction while discharging the molten resin is predicted to be changed from the numerical value other than zero to zero (the timing when the discharging nozzle 18 that is moving is stopped).

The timing at which the movement speed of the discharging nozzle 18 is predicted to be changed from the numerical value other than zero to zero may be, for example, a timing when the movement speed (the translational speed) of the discharging nozzle 18 acquired in advance from the modeling track generation unit 80 and the like becomes zero. Before the predetermined time from that timing, the first piston 14 (or the second piston 15) is started to be pulled back. The predetermined time is a time required to move by the pulling-back movement amount X (mm), which is obtained by the equation 24. With the specific example 2 of the predetermined timing, it is possible to restrict the molten resin from being continuously discharged due to the residual pressure, gravity, or the like at the same timing as the timing when the movement speed (the translational speed) of the discharging nozzle 18 is changed from the numerical value other than zero to zero (the timing when the discharging nozzle 18 that is moving is stopped) (the flow rate of the molten resin discharged from the discharging nozzle 18 can be set to zero). As a result, for example, it is possible to restrict the resin bead RB from becoming larger than the target dimension at an end point.

Speed of Pulling-Back Operation of First Piston (or Second Piston)

In the specific examples 1, 2 of the predetermined timings, the speed of the pulling-back operation of the first piston 14 (or the second piston 15) may be sufficiently high. Here, "sufficient" means an extent in which air does not enter the plasticization chamber S2 (or the plasticization chamber S4) from the resin raw material supply chamber S1 (or the resin raw material supply chamber S3) during the pulling-back operation through a portion of the molten resin reverse flow prevention function (the check ring 14b, 15b, see FIGS. 7, 14, and the like) provided on the first piston 14 (or the second piston 15). The "extent" may be calculated from the viscosity of the molten resin, a gap or a moment of inertia of a part composing the reverse flow prevention function, and the like, or may be obtained by plasticization experiments and the like. In this manner, the occurrence of defects at the timing of the next modeling due to the entrainment of air in the plasticization chamber S2 (or the plasticization chamber S4) or the generation of air bubbles is restricted.

Check Valve

Figure 48:
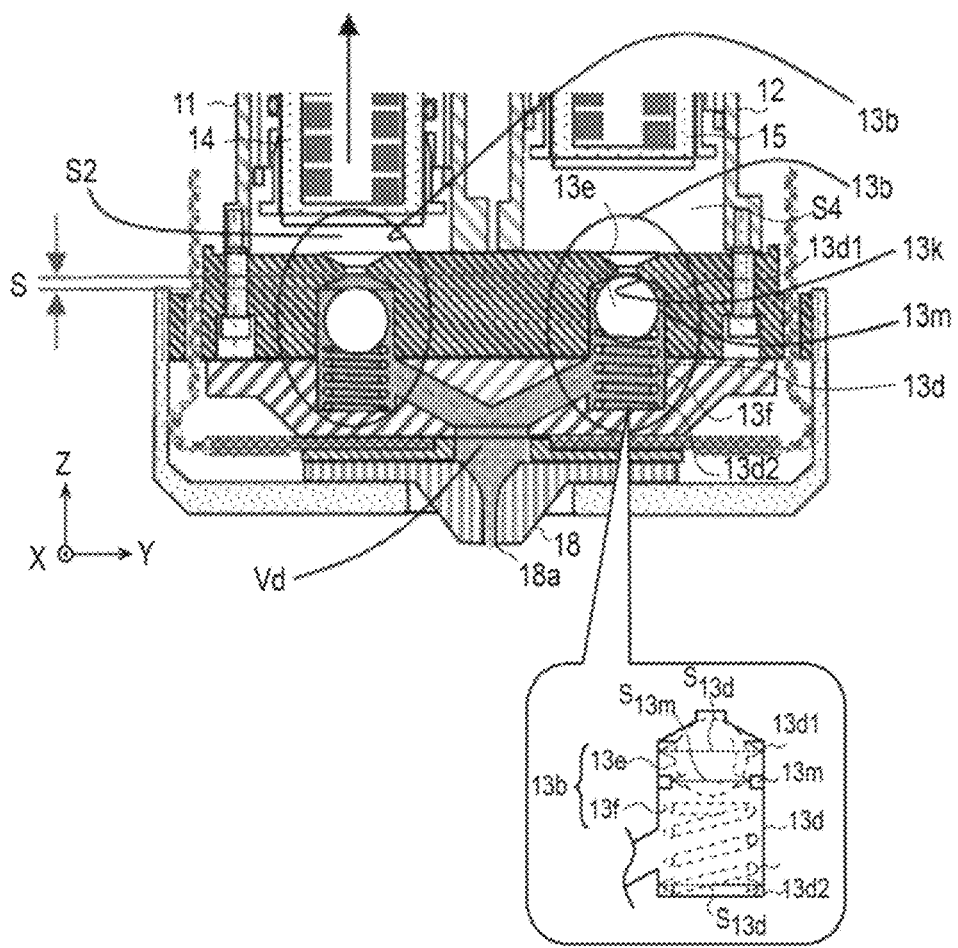
FIG. 48 is an enlarged cross-sectional view in a vicinity of the discharging nozzle.

FIG. 48 is an enlarged cross-sectional view in a vicinity of the discharging nozzle 18. As illustrated in FIG. 48, in a resin discharging unit (the first piston 14 or the second piston 15), a check valve 13b is provided between the plasticization chambers S2, S4 and the discharging nozzle 18 (the discharging hole).

The check valve 13b is composed of a sealing surface 13k, a check ball 13e that is in close contact with the sealing surface 13k and closes the flow path of the molten resin, and a spring 13f (an example of the elastic member of the present disclosure) that presses the check ball 13e against the sealing surface 13k. When the difference between the pressure in the plasticization chamber S2 (or the plasticization chamber S4) and the pressure in front of the discharging nozzle 18 (the discharging hole) exceeds a valve opening pressure, the check ball 13e is pushed toward the spring 13f side and strokes (see a reference sign S in FIG. 48), and is positioned at an open position at which the flow path of the molten resin is opened (see the position of the check ball 13e on the left side in FIG. 48).

When the pressure at which the first piston 14 (or the second piston 15) moves in the direction of approaching the discharging nozzle 18 and pressurizes the molten resin in the cylinder 11 (or the cylinder 12) exceeds a predetermined pressure, the check ball 13e moves from the closed position at which the flow path of the molten resin is closed to the open position at which the flow path of the molten resin is opened (see the position of the check ball 13e on the left side in FIG. 48) while elastically deforming the spring 13f. When the first piston 14 (or the second piston 15) moves in the direction away from the discharging nozzle 18, the check ball 13e moves from the open position to the closed position (see the position of the check ball 13e on the right side in FIG. 48) using a restoring force by which a shape of the spring 13f is returned to a shape before the elastic deformation force.

The stroke S of the check ball 13e is determined to satisfy the following equation 27:

$$(S \times \pi/4 \times Dc^2)/Vd \times K > P_t \quad \text{(Equation 27)}$$

Here, Dc is the diameter of the check ball 13e, Vd is the dead volume, and K is the bulk modulus of the molten resin.

To function more effectively, a throttle 13m is provided between the upstream and the downstream of the check ball 13e (see FIG. 48). The throttle 13m refers to a portion between an upper portion 13d1 and a lower portion 13d2 of the upstream and the downstream (an accommodation portion 13d in which the check valve 13b is accommodated). The portion has a cross-sectional area size $S_{13m}$ (the size of the cross-sectional area on a plane parallel to the XY plane) is small, as compared with a cross-sectional area size $S_{13d}$ of the upper portion 13d1 (and a cross-sectional area size $S_{13d}$ of a lower portion 13d2).

With the check valve 13b having the above configuration, the following actions and advantageous effects are obtained. At the time of the pulling-back operation of the first piston 14 (or the second piston 15), when the pressure in the plasticization chamber S2 (or the plasticization chamber S4) drops, by a differential pressure between the pressure in the plasticization chamber S2 (or the plasticization chamber S4) and the pressure on the discharging nozzle 18 (the discharging hole) side, the check ball 13e moves upward and hits a sealing surface 13k, that is, the check ball 13e is positioned at the closed position (see the check ball 13e on the right side in FIG. 48) at which the flow path of the molten resin is closed, and the molten resin is not sucked out from the closed position. Thus, thereafter, the pressure in the vicinity immediately before the outlet of the discharging nozzle 18 (the discharging hole) is not changed. When the stroke S of the check ball 13e is excessively small, the check ball 13e is immediately closed, a pressure in the vicinity of the discharging nozzle 18 (the discharging hole) does not drop as targeted, and the molten resin may leak due to a residual pressure.

Here, considering a mechanism of determining the pressure in the vicinity immediately before the outlet of the discharging nozzle 18 (the discharging hole) at the time of the pulling-back operation of the first piston 14 (or the second piston 15), the pressure drop amount ΔP is determined by each of the increase in volume ΔV by a sucked-out amount Q that moves to the plasticization chamber S2 (or the plasticization chamber S4) side until the check ball 13e is closed, and movement of the check ball 13e in the upward direction by the stroke S. The relationship is expressed in the following equation 28:

$$\Delta P = (Q + \Delta V)/Vd \times K \quad \text{(Equation 28)}$$

$$\Delta V = S \times \pi/4 \times Dc^2 \quad \text{(Equation 29)}$$

Here, Q is an amount determined in an instant until the check ball 3e operates. Since it is difficult to calculate the value, assuming that the worst is zero, when ΔP is obtained by the equation 29, the following equation 30 is obtained:

$$\Delta P = (S \times \pi/4 \times Dc^2)/Vd \times K \quad \text{(Equation 30)}$$

Unless the pressure drop amount ΔP is made larger than the pressure $P_t$ in the vicinity immediately before the outlet of the discharging hole, the residual pressure remains, and thus a relationship of the following equation 31 is obtained:

$$\Delta P > P_t \qquad \text{(Equation 31)}$$

The equation 27 can be obtained from the equations 30, 31.

Next, advantages of the sixth embodiment will be further described in comparison with a comparative example 6.

Comparative Example 6

The comparative example 6 (US 2019-033204 A) has the following issues.

Issue 1

Figure 51:
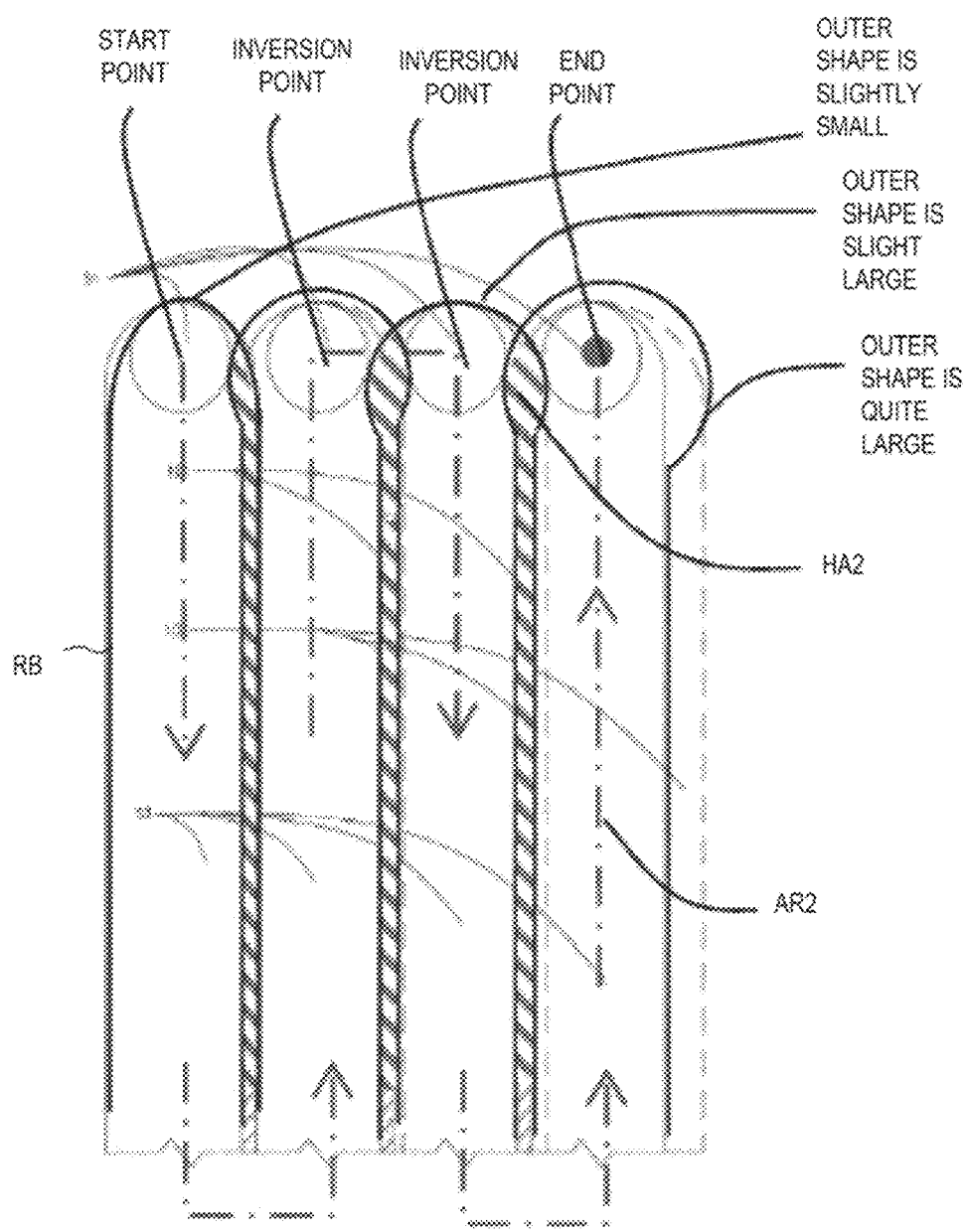
FIG. 51 is a diagram illustrating an issue 1 of a comparative example 6.

A modeled body with a portion that protrudes from a target outer shape is created. The speeds of the screw and gear pump are adjusted according to the translational speed of the nozzle, the dimension of the resin bead is stabilized, and a desired overlapping amount can be obtained within a range represented by a reference sign 101 of FIG. 6 of the comparative example 6 (see paragraph [0066] of detailed description in the comparative example 6). However, since the resin beads excessively overlap at an end point and an inversion point of the resin bead (always present in 3D printing), the overlapped portion becomes a protruding portion. FIG. 51 is a diagram illustrating the issue 1 of the comparative example 6. In FIG. 51, an arrow AR2 of a dash dot line represents the track of the discharging nozzle. Further, a hatched region HA2 represents a portion at which the resin beads RB overlap.

The reason why the issue 1 occurs is as follows. When the nozzle speed becomes zero at the inversion point and the end point, it is desired to set the discharged flow rate of the molten resin to zero at the moment when the nozzle stops. However, this is not possible with a nozzle structure of the comparative example 6, and the discharging flow continues for a while. This is because, as illustrated in FIG. 2 of the comparative example 6, the molten resin sent from a screw 60 is adjusted by a gear pump 74 and sent to the applicator head 43 through a conduit 52 to become a resin bead. In other words, the nozzle speed corresponds to zero, and even when the rotation of the gear pump is stopped, a considerable amount continues to be discharged due to the residual pressure remaining in the conduit and the own weight of the molten resin itself.

Advantages of the sixth embodiment over the comparative example 6 are as follows. In the sixth embodiment, the discharging nozzle 18 has a structure that can extrude the molten resin using the first piston 14 (or the second piston 15) to discharge it and adjust the flow rate thereof (see FIG. 48), and when the movement speed (the translational speed) of the discharging nozzle 18 is zero, in order to set the flow rate immediately to zero, the first piston 14 (or the second piston 15) is pulled back such that the discharging pressure becomes a negative pressure (a pressure lower than the outside air pressure). As such, the issue 1 is solved.

Figure 52:
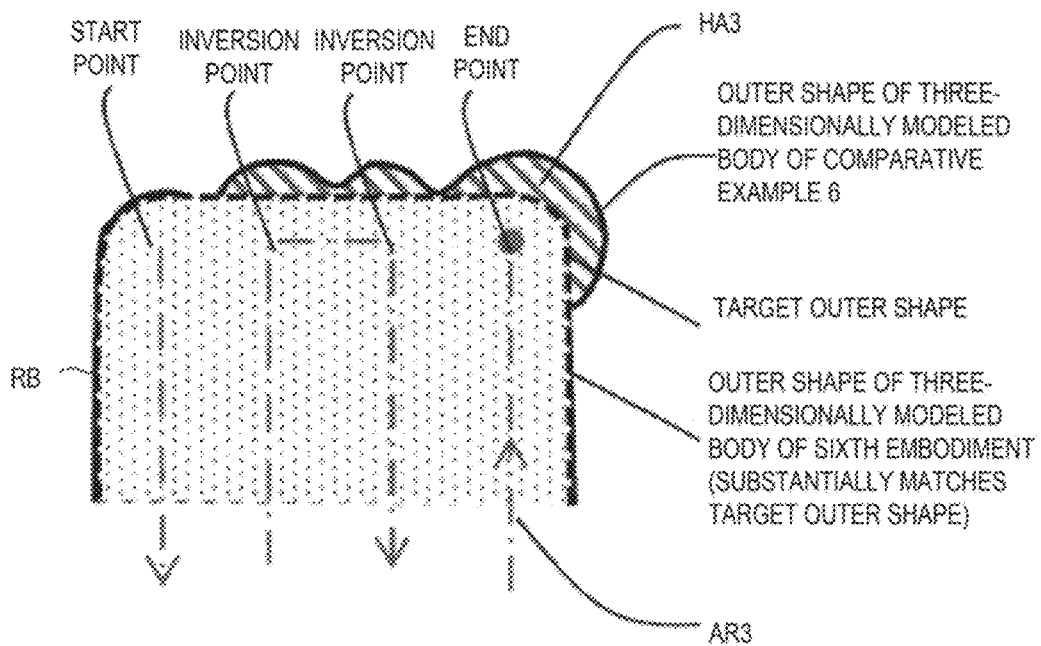
FIG. 52 is a diagram illustrating an advantage of a sixth embodiment and the issue 1 of the comparative example 6.

FIG. 52 is a diagram illustrating an advantage of the sixth embodiment and the issue 1 of the comparative example 6. In the sixth embodiment, from the front of the portion where the movement speed (the translational speed) becomes zero, such as the inversion point or the end point as illustrated in FIG. 52, the piston (the first piston 14 or the second piston 15) that is executing the discharging operation is controlled to be pulled back, and the pulling-back movement amount is such that the pressure of the molten resin immediately before the discharging nozzle (the discharging hole) is lower than the pressure outside the discharging nozzle and does not fall below the atmospheric pressure, and thus the molten resin is pushed by the atmospheric pressure and retracted. Therefore, the molten resin does not leak, and defects does not occur at the timing of the next modeling due to the air entrainment in the plasticization chambers S2, S4, or the generation of air bubbles. Further, an overlapping portion of a geometric resin bead RB does not protrude by sucking the temporarily laminated resin bead RB. Referring to FIG. 52, it can be seen that an outer shape of the three-dimensionally modeled body of the sixth embodiment substantially matches a target outer shape.

On the other hand, in the comparative example 6, as illustrated in FIG. 52, the resin beads excessively overlap at the end point and the inversion point of the resin bead, and a portion that protrudes from the target outer shape (a hatched region represented by a reference sign HA3 in FIG. 52) is formed.

As described above, with the sixth embodiment, it is possible to improve the controllability of the flow rate of the molten resin discharged from the discharging nozzle 18. In addition, with the sixth embodiment, it is possible to obtain the same advantageous effect as those of the fourth and the fifth embodiments.

Further, with the sixth embodiment, it is possible to set the discharging pressure to a negative pressure (for example, a pressure lower than the outside air pressure) by controlling the first piston 14 (or the second piston 15) by the predetermined amount in the direction away from the discharging nozzle 18 at the predetermined timing such that the first piston 14 (or the second piston 15) moves. As such, it is possible to restrict the molten resin from being continuously discharged due to a residual pressure, gravity, or the like. As a result, it is possible to control the dimension of the resin bead RB such that the dimension is constant (substantially constant).

Further, with the sixth embodiment, it is possible to set the discharging pressure to the negative pressure (for example, a pressure lower than the outside air pressure) at the timing at which the movement speed (the translational speed) of the discharging nozzle 18 is changed from the numerical value other than zero to zero (the timing at which the discharging nozzle that is moving is stopped).

Further, with the sixth embodiment, it is possible to restrict the molten resin from being continuously discharged due to a residual pressure, gravity, or the like by setting the resin pressure in the discharging nozzle 18 lower than the resin pressure outside the discharging nozzle 18. Further, by setting the differential pressure (the pressure outside the discharging nozzle 18—the pressure inside the discharging nozzle 18) generated when the first piston 14 (or the second piston 15) moves by the movement amount X in the pulling-back direction not to exceed the atmospheric pressure (for example, 0.1 MPa), it is possible to restrict the entrainment of air in the plasticization chamber S2 (or the plasticization chamber S4) and the generation of air bubbles.

Further, with the sixth embodiment, it is possible to set the discharging pressure to the negative pressure (for example, a pressure lower than the outside air pressure) during the predetermined time before the timing at which the movement speed (the translational speed) of the discharging nozzle 18 is predicted to be changed from the numerical value other than zero to zero (the timing at which the discharging nozzle 18 that is moving is stopped).

Further, with the sixth embodiment, it is possible to restrict the molten resin from being continuously discharged due to the residual pressure, gravity, or the like at the same timing as the timing when the movement speed (the translational speed) of the discharging nozzle 18 is changed from the numerical value other than zero to zero (the timing when the discharging nozzle 18 that is moving is stopped) (the flow rate of the molten resin discharged from the discharging nozzle 18 can be set to zero).

Further, with the sixth embodiment, it is possible to prevent air from being mixed in the plasticization chamber S2 (the plasticization chamber S4) by setting the movement speed of the first piston 14 (or the second piston 15) in the direction away from the discharging nozzle 18 to a speed at which air does not enter the plasticization chamber S2 (the plasticization chamber S4) from the resin raw material supply chamber S1 (or the resin raw material supply chamber S3).

Further, with the sixth embodiment (the same applies to the other embodiments), it is possible to control the flow rate of the molten resin discharged from the discharging nozzle 18 when the check ball 13e automatically moves to the open position or the closed position according to the movement of the first piston 14 (or the second piston 15) that linearly reciprocates in the cylinder 11 (or the cylinder 12). With such a configuration as well, it is possible to improve the controllability of the flow rate of the molten resin discharged from the discharging nozzle 18.

Seventh Embodiment

Next, as the seventh embodiment, another operation example 3 of the 3D printer 300 of the fourth embodiment will be described.

Details of Another Operation Example 3 of 3D Printer

Figure 49:
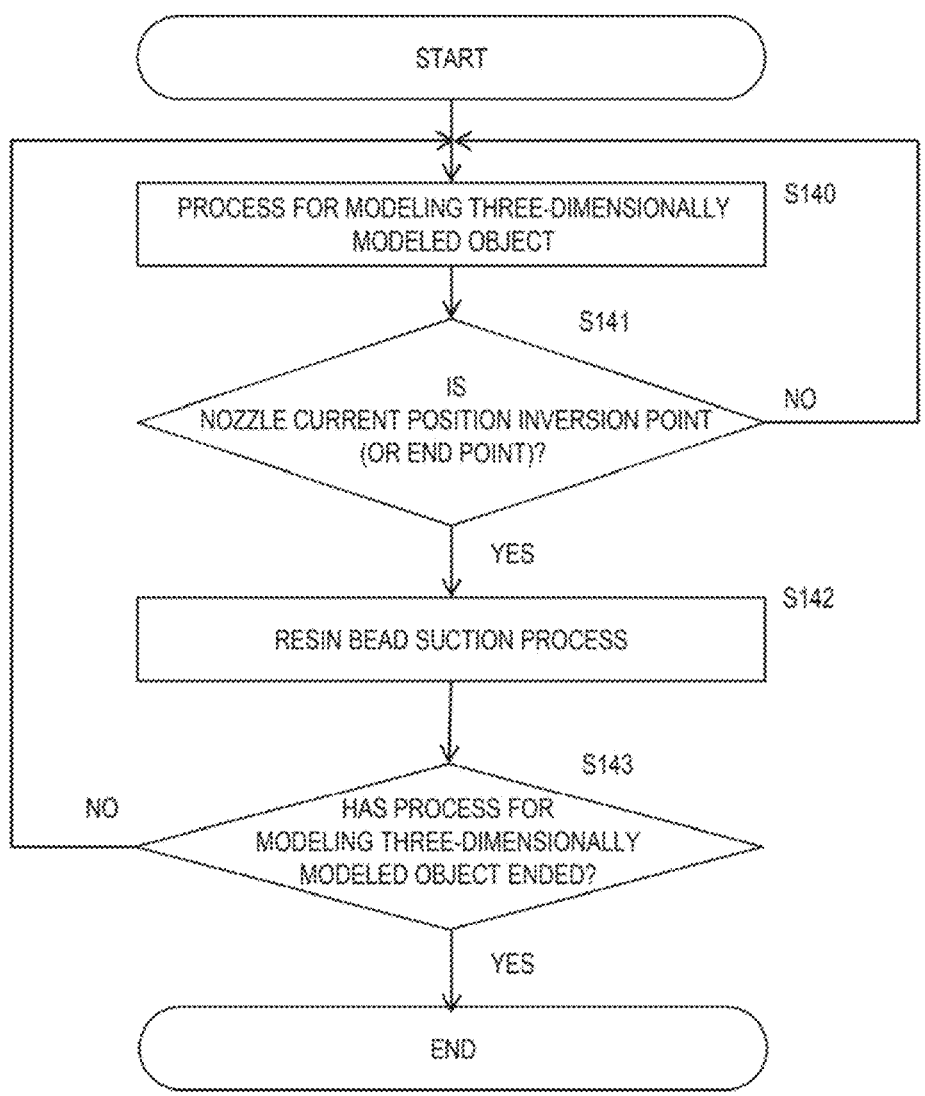
FIG. 49 is a detailed flowchart of another operation example 3 of the 3D printer.

FIG. 49 is a detailed flowchart of another operation example 3 of the 3D printer 300. The following processes are implemented when the control unit 30A (the processor) executes a predetermined program read from the storage unit 20 using the memory 40 (for example, a RAM).

Figure 50:
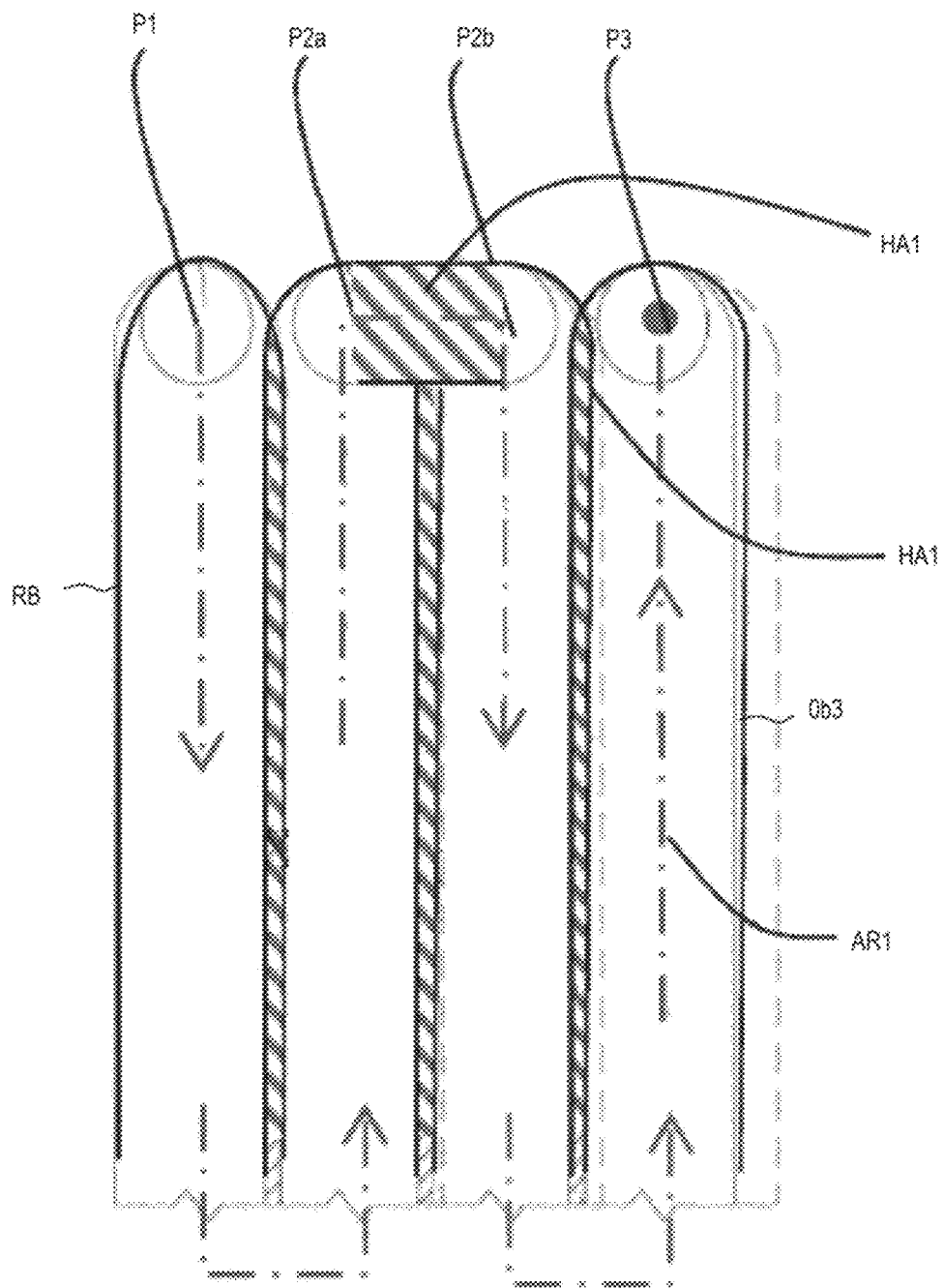
FIG. 50 is an example of a three-dimensionally modeled object (a laminated modeled body) modeled according to the flowchart of FIG. 49.

First, a process for modeling a three-dimensionally modeled object is executed (step S140). The process for modeling a three-dimensionally modeled object is a process for modeling a targeted three-dimensionally modeled object using a 3D printer 300 and, for example, the process of the flowchart of FIG. 27, the process of a flowchart of FIG. 41, and the process of the flowchart of FIG. 44. Here, as illustrated in FIG. 50, it is assumed that a three-dimensionally modeled object Ob3 (a laminated modeled body) is modeled by the resin bead RB passing through a start point P1, inversion points P2a, P2b, and an end point P3. FIG. 50 is an example of the three-dimensionally modeled object Ob3 (a laminated modeled object) modeled according to the flowchart of FIG. 49. In FIG. 50, an arrow AR1 of a dash dot line represents the track of the discharging nozzle 18. Further, a hatched region HA1 represents a portion at which the resin beads RB overlap.

Continuing from the process for modeling the three-dimensionally modeled object, a determination is made on whether the current position of the discharging nozzle 18 that is moving in the XY-axis direction while discharging the molten resin is the inversion point (or the end point) (step S141). As a result of the determination in step S141, when the current position of the discharging nozzle 18 is the inversion point (or the end point) (step S141: YES), a resin bead suction process is executed (step S142).

Resin Bead Suction Process

The resin bead suction process is a process for sucking an uncured resin bead (for example, a resin bead in a portion in which the resin beads overlap) temporarily laminated in the three-dimensionally modeled object. This is implemented when the piston control unit 30b controls the first piston 14 (or the second piston 15) such that the first piston 14 (or the second piston 15) moves by a predetermined amount (a movement amount X that satisfies the following equation 32) in the direction away from the discharging nozzle 18 (the pulling-back direction) in a state where the outlet of the discharging nozzle 18 and the three-dimensionally modeled object are fluidly connected to each other.

Figure 53:
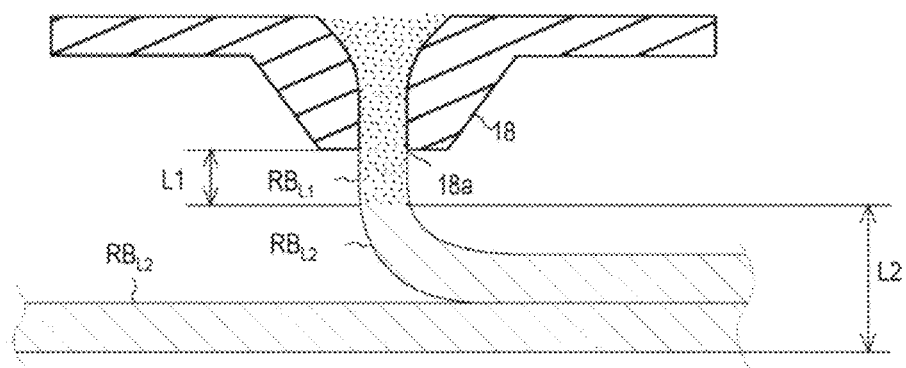
FIG. 53 is a diagram describing a state of being fluidly connected.

As a premise, the outlet of the discharging nozzle 18 (the discharging hole) and the three-dimensionally modeled object (the laminated modeled body) are arranged to be close to each other such that they are fluidly connected. This is implemented when, for example, the discharging nozzle control unit 30c relatively moves the discharging nozzle 18 with respect to the base plate 4 by controlling the XY-axis drive device 50 (the gantry drive device) such that the outlet of the discharging nozzle 18 and the three-dimensionally modeled object are fluidly connected to each other. The fluidly connected state means the state of being connected by the molten resin before solidification. For example, in FIG. 53, a molten resin $RB_{L1}$ within a range close to the discharging nozzle 18 (the discharging hole 18a) (see a range represented by a reference sign L1 in FIG. 53) is not solidified and is in a fluidly connected state. On the other hand, a molten resin $RB_{L2}$ within a range far from the discharging nozzle 18 (the discharging hole 18a) (see a range represented by a reference sign L2 in FIG. 53) is solidified and is not in a fluidly connected state. FIG. 53 is a diagram describing the fluidly connected state.

Specific Example of Pulling-back Movement Amount

The pulling-back movement amount X (mm) of the first piston 14 (or the second piston 15) may be a value satisfying the following equation 32:

$$X \geq (P_t + 0.1) \times V_0 / K / S \quad \text{(Equation 32)}$$

The processes of steps S140 to S142 are repeatedly executed until the process for modeling three-dimensionally modeled object ends (step S143: YES). As such, it is possible to restrict the resin bead RB from protruding or increasing a modeling height at a portion at which overlapping of the resin beads RB is geometrically unavoidable, such as inversion points P2a, P2b.

Further, it is possible to provide a shape thinner at a portion, such as the end point P3 at which the discharging nozzle 18 is stopped than at a normal portion (improvement of the degree of freedom in modeling a shape).

As described above, with the seventh embodiment, it is possible to improve the controllability of the flow rate of the molten resin discharged from the discharging nozzle 18. In addition, with the seventh embodiment, it is possible to obtain the same advantageous effect as those of the fourth and the fifth embodiments.

Further, with the seventh embodiment, it is possible to suck the uncured resin bead (for example, a resin bead in a portion in which the resin bead overlap) temporarily laminated in the three-dimensionally modeled object. As a result, it is possible to control the dimension of the resin bead RB such that the dimension is constant (substantially constant).

Modified Example

Next, a modified example will be described.

In the above-described embodiments 4 to 7, an example of a three-dimensionally laminated object molding apparatus of the present disclosure is described to which the 3D printer including the injection molding machine 2A that includes a plurality of combinations of cylinders and pistons (torpedoes) (the cylinder 11, the first piston 14, the cylinder 12, the second piston 15), but the present disclosure is not limited thereto. For example, the three-dimensionally laminated object molding apparatus of the present disclosure may be applied to a 3D printer (not shown) including an injection molding machine that includes one combination of a cylinder and a piston (a torpedo). In other words, the three-dimensionally laminated modeling apparatus of the present disclosure does not particularly limit the number of combinations of cylinders and pistons (torpedoes).

In the above embodiments, the present disclosure is described as a hardware configuration, but the present disclosure is not limited thereto. In the present disclosure, arbitrary processing can also be implemented by causing a CPU to execute a computer program.

A program can be stored using various types of non-transitory computer-readable media and supplied to a computer. The non-transitory computer-readable medium includes various types of tangible storage media. Examples of the non-transitory computer-readable medium include a magnetic recording medium (for example, a flexible disk, a magnetic tape, and a hard disk drive), a magneto-optical recording medium (for example, a magneto-optical disk), a compact disc read-only memory (CD-ROM), a CD-R, a CD-R/W, a semiconductor memory (for example, a mask ROM, a programmable ROM (PROM), an Erasable PROM (EPROM), a flash ROM, and a random access memory (RAM)). Further, the program may also be supplied to the computer by various types of transitory computer-readable media. Examples of the transitory computer-readable medium include an electrical signal, an optical signal, and an electromagnetic wave. The transitory computer-readable medium can supply the program to the computer via a wired communication path, such as an electric wire and an optical fiber, or a wireless communication path.

What is claimed is:

1. A three-dimensionally laminated object modeling apparatus comprising:
   a cylinder configured to store a molten resin;
   a discharging nozzle that is communicated with the cylinder;
   a piston configured to linearly reciprocate in the cylinder and discharge the molten resin from the discharging nozzle by moving in a direction of approaching the discharging nozzle with a piston drive device and by pressurizing the molten resin in the cylinder;
   a pressure sensor configured to detect an actually-measured pressure that is a pressure applied to the molten resin;
   a nozzle drive device configured to relatively move the discharging nozzle with respect to a table on which a three-dimensionally modeled object is modeled by laminating a resin bead that is the molten resin discharged from the discharging nozzle; and
   at least one processor configured to:
      control movement of the piston by a piston controlling process, which includes
      executing a preparation process including
         acquiring a nozzle movement speed input to the at least one processor,
         determining an indicated flow rate based on the nozzle movement speed, the indicated flow rate being a target value of a flow rate of the molten resin discharged from the discharging nozzle,
         calculating, based on the indicated flow rate, a target pressure applied to the molten resin, and
         acquiring the actually-measured pressure,
      after executing the preparation process, executing a first process including
         calculating an additional pressure by subtracting the actually-measured pressure from the target pressure,
         calculating a first piston movement speed for pressurizing based on the additional pressure and a bulk modulus that is a constant determined by characteristics of the molten resin,
         calculating a predicted outflow rate based on the actually-measured pressure, the predicted outflow rate being an outflow rate of the molten resin predicted to be discharged from the discharging nozzle,
         calculating a second piston movement speed for discharging based on the predicted outflow rate, and
         causing the piston drive device to drive, wherein the piston is driven to move at a speed obtained by adding the first piston movement speed and the second piston movement speed, and
      after executing the first process, repeatedly executing a second process including
         acquiring the actually-measured pressure,
         calculating a corrected value of the bulk modulus based on the actually-measured pressure acquired in the second process, and
         executing the first process using the corrected value as the bulk modulus.

2. The three-dimensionally laminated object modeling apparatus according to claim 1, wherein the at least one processor is configured to control a movement speed of the piston such that a dimension of the resin bead is constant.

3. The three-dimensionally laminated object modeling apparatus according to claim 1, wherein:
   space in the cylinder on a side opposite to a side of the discharging nozzle with respect to the piston is a resin raw material supply chamber to which a resin raw material is supplied;
   space in the cylinder on the side of the discharging nozzle with respect to the piston is a plasticization chamber which stores the molten resin;
   the piston is configured to:
      plasticize, by moving in a direction away from the discharging nozzle, the resin raw material supplied to the resin raw material supply chamber and store the molten resin which is a plasticized resin raw material in the plasticization chamber; and
      discharge, by moving in the direction of approaching the discharging nozzle and by pressurizing the molten resin stored in the plasticization chamber, the molten resin stored in the plasticization chamber from the discharging nozzle.

4. The three-dimensionally laminated object modeling apparatus according to claim 1, wherein the at least one processor is configured to control the movement speed of the piston such that a flow rate of the molten resin discharged from the discharging nozzle becomes the nozzle movement speed×a size of a cross-sectional area of the resin bead.

5. The three-dimensionally laminated object modeling apparatus according to claim 1, wherein the at least one processor is configured to control a temperature of the molten resin stored in the cylinder.

6. The three-dimensionally laminated object modeling apparatus according to claim 1, wherein the at least one processor is configured to:
   predict a discharged flow rate of the molten resin discharged from the discharging nozzle; and control movement of the discharging nozzle by controlling the nozzle drive device based on the predicted discharged flow rate such that a dimension of the resin bead is constant.

7. The three-dimensionally laminated object modeling apparatus according to claim 6, wherein the at least one processor is configured to control the nozzle movement speed by controlling the nozzle drive device such that the nozzle movement speed becomes the predicted discharged flow rate by a size of a cross-sectional area of the resin bead.

8. The three-dimensionally laminated object modeling apparatus according to claim 1, wherein the at least one processor is configured to control the piston such that the piston moves by a predetermined amount in a direction away from the discharging nozzle at a predetermined timing.

9. The three-dimensionally laminated object modeling apparatus according to claim 8, wherein the predetermined timing is a timing at which the nozzle movement speed is changed from a numerical value other than zero to zero.

10. The three-dimensionally laminated object modeling apparatus according to claim 9, wherein the predetermined amount is an amount by which a resin pressure in the discharging nozzle becomes lower than a resin pressure outside the discharging nozzle.

11. The three-dimensionally laminated object modeling apparatus according to claim 8, wherein the predetermined timing is a timing that is a predetermined time before the timing at which the nozzle movement speed is predicted to be changed from a numerical value other than zero to zero.

12. The three-dimensionally laminated object modeling apparatus according to claim 11, wherein the predetermined amount is an amount by which a resin pressure in the discharging nozzle becomes lower than a resin pressure outside the discharging nozzle.

13. The three-dimensionally laminated object modeling apparatus according to claim 11, wherein the predetermined time is a time required for the piston to move by the predetermined amount.

14. The three-dimensionally laminated object modeling apparatus according to claim 8, wherein a movement speed of the piston in the direction away from the discharging nozzle is a speed at which air does not flow into a plasticization chamber from a resin raw material supply chamber.

15. The three-dimensionally laminated object modeling apparatus according to claim 1, further comprising:
a check ball arranged between a plasticization chamber and the discharging nozzle, and positioned at an open position at which a flow path of the molten resin that communicates with the plasticization chamber and the discharging nozzle is opened or a closed position at which the flow path is closed;
an elastic member configured to position the check ball at the closed position using an elastic force, wherein the check ball is configured to:
move, when the piston moves in the direction of approaching the discharging nozzle and a pressure that pressurizes the molten resin in the cylinder exceeds a predetermined pressure, from the closed position to the open position while elastically deforming the elastic member; and
move, when the piston moves in a direction away from the discharging nozzle, from the open position to the closed position using a restoring force by which a shape of the elastic member is returned to a shape before an elastic demonstration.

16. The three-dimensionally laminated object modeling apparatus according to claim 1, wherein the at least one processor is configured to suck, in a state where an outlet of the discharging nozzle and the three-dimensionally modeled object are fluidly connected to each other, an uncured resin bead in the three-dimensionally modeled object by controlling the piston such that the piston moves in a direction away from the discharging nozzle by a predetermined amount.

17. A three-dimensionally laminated object modeling method in a three-dimensionally laminated object modeling apparatus, the three-dimensionally laminated object modeling apparatus including a cylinder configured to store a molten resin, a discharging nozzle that is communicated with the cylinder, a piston configured to linearly reciprocate in the cylinder and discharge the molten resin from the discharging nozzle by moving in a direction of approaching the discharging nozzle with a piston drive device and by pressurizing the molten resin in the cylinder, a pressure sensor configured to detect an actually-measured pressure that is a pressure applied to the molten resin, and a nozzle drive device configured to relatively move the discharging nozzle with respect to a table on which a three-dimensionally is modeled by laminating a resin bead that is the molten resin discharged from the discharging nozzle, the three-dimensionally laminated object modeling method comprising controlling movement of the piston by a piston controlling process which includes:
executing a preparation process including
acquiring a nozzle movement speed input,
determining an indicated flow rate based on the nozzle movement speed, the indicated flow rate being a target value of a flow rate of the molten resin discharged from the discharging nozzle,
calculating, based on the indicated flow rate, a target pressure applied to the molten resin, and
acquiring the actually-measured pressure,
after executing the preparation process, executing a first process including
calculating an additional pressure by subtracting the actually-measured pressure from the target pressure,
calculating a first piston movement speed for pressurizing based on the additional pressure and a bulk modulus that is a constant determined by characteristics of the molten resin,
calculating a predicted outflow rate based on the actually-measured pressure, the predicted outflow rate being an outflow rate of the molten resin predicted to be discharged from the discharging nozzle,
calculating a second piston movement speed for discharging based on the predicted outflow rate, and
causing the piston drive device to drive, wherein the piston is driven to move at a speed obtained by adding the first piston movement speed and the second piston movement speed, and
after executing the first process, repeatedly executing a second process including
acquiring the actually-measured pressure,
calculating a corrected value of the bulk modulus based on the actually-measured pressure acquired in the second process, and
executing the first process using the corrected value as the bulk modulus.

18. The three-dimensionally laminated object modeling method according to claim 17, further comprising:
predicting a discharged flow rate of the molten resin discharged from the discharging nozzle; and controlling movement of the discharging nozzle by controlling the nozzle drive device based on the predicted discharged flow rate such that a diameter of the resin bead is constant.

19. The three-dimensionally laminated object modeling method according to claim 18, wherein the piston is controlled such that the piston moves by a predetermined amount in a direction away from the discharging nozzle at a predetermined timing.

* * * * *